(12) United States Patent
Hu et al.

(10) Patent No.: US 12,524,804 B2
(45) Date of Patent: Jan. 13, 2026

(54) USING MODEL-BASED TREES WITH BOOSTING TO FIT LOW-ORDER FUNCTIONAL ANOVA MODELS

(71) Applicant: Wells Fargo Bank, N.A., San Francisco, CA (US)

(72) Inventors: Linwei Hu, Charlotte, NC (US); Jie Chen, Fremont, CA (US); Vijayan Nair, Matthews, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 19 days.

(21) Appl. No.: 18/194,986

(22) Filed: Apr. 3, 2023

(65) Prior Publication Data

US 2024/0029154 A1 Jan. 25, 2024

Related U.S. Application Data

(60) Provisional application No. 63/368,224, filed on Jul. 12, 2022.

(51) Int. Cl.
G06Q 40/00 (2023.01)
G06Q 40/03 (2023.01)

(52) U.S. Cl.
CPC ............................ *G06Q 40/03* (2023.01)

(58) Field of Classification Search
CPC ........................................... G06Q 40/03
USPC ................................. 705/4, 35–45
See application file for complete search history.

(56) References Cited

U.S. PATENT DOCUMENTS

| | | | | |
|---|---|---|---|---|
| 12,033,179 | B2 * | 7/2024 | Liu | G06Q 30/0243 |
| 2019/0073586 | A1 * | 3/2019 | Chen | G06N 3/084 |
| 2019/0164084 | A1 * | 5/2019 | Gulin | G06N 20/00 |
| 2020/0050968 | A1 * | 2/2020 | Lee | G06N 20/00 |
| 2020/0134364 | A1 * | 4/2020 | Kuruvilla | G06N 20/00 |
| 2021/0232925 | A1 * | 7/2021 | Olabiyi | G06N 20/00 |
| 2021/0303937 | A1 * | 9/2021 | Sakamoto | G06N 20/20 |
| 2021/0334667 | A1 * | 10/2021 | Huu | G06N 20/20 |

(Continued)

OTHER PUBLICATIONS

Agarwal, R. et al. Neural Additive Models: Interpretable Machine Learning with Neural Nets. 35th Conference on Neural Information Processing Systems (NeurIPS 2021). Retrieved from the Internet <arXiv:2004.13912v2> 23 pages.

(Continued)

*Primary Examiner* — Mike Anderson
*Assistant Examiner* — Mohammed H Mustafa
(74) *Attorney, Agent, or Firm* — K&L Gates LLP

(57) ABSTRACT

Systems, apparatuses, methods, and computer program products are disclosed for training a GAMI-Tree model. An example method includes initializing an iterative prediction model and performing a required number of model training iterations. For each model training iteration, the method further includes (i) performing a required number of main-effect gradient boosting iterations of a main-effect gradient boosting routine, (ii) generating a plurality of qualified input feature pairs, and (iii) performing a required number of interaction-effect gradient boosting iterations of a interaction-effect gradient boosting routine. The method further includes generating the GAMI-Tree model based on the iterative prediction model generated by a final interaction-effect gradient boosting iteration of a final model training iteration.

20 Claims, 41 Drawing Sheets

(56) References Cited

U.S. PATENT DOCUMENTS

| | | | | |
|---|---|---|---|---|
| 2021/0374279 | A1* | 12/2021 | Zheng | G06N 20/00 |
| 2022/0237520 | A1* | 7/2022 | Wang | G06N 20/00 |
| 2023/0342351 | A1* | 10/2023 | Wright | G06N 20/10 |
| 2024/0029154 | A1* | 1/2024 | Hu | G06Q 40/03 |
| 2024/0104698 | A1* | 3/2024 | Nie | G06N 3/044 |
| 2024/0119346 | A1* | 4/2024 | Chang | G06Q 40/02 |

OTHER PUBLICATIONS

Apley, D. et al. Visualizing the Effects of Predictor Variables in Black Box Supervised Learning Models. Northwestern University, USA, Aug. 19, 2019. Retrieved from the Internet <arXiv:1612.08468v2> 44 pages.

Breiman, Leo. Bagging Predictors. Machine Learning, 1996 Kluwer Academic Publishers, Boston, pp. 123-140.

Chan, K.-Y. et al. LOTUS: An algorithm for building accurate and comprehensible logistic regression trees. Journal of Computational and Graphical Statistics, 2004. 32 pages.

Friedman, Jerome. Greedy Function Approximation: A Gradient Boosting Machine. IMS 1999 Reitz Lecture, Stanford, CA, USA, Feb. 24, 1999. 39 pages.

Friedman, J. et al. Predictive Learning Via Rule Ensembles. Published by the Institute of Mathematical Statistics, in the Annals of Applied Statistics, 2008, vol. 2, No. 3, 916-954. Retrieved from the Internet <arXiv:0811.1679v1> 41 pages.

Friedman, J. et al. Projection Pursuit Regression. Journal of the American Statistical Association, published by the American Statistical Association, vol. 76, No. 376, Dec. 1981, pp. 817-823. Retrieved from the Internet <URL: http://www.jstor.org/stable/2287576>.

Hooker, G. Generalized Functional ANOVA Diagnostics for High Dimensional Functions of Dependent Variables. Journal of Computational and Graphical Statistics, 2007, McGill University, Montreal, Canada, pp. 709-732.

Hu, L. et al. Surrogate Locally-Interpretable Models with Supervised Machine Learning Algorithms. Corporate Model Risk, Wells Fargo, USA, Jul. 9, 2020. 24 pages. Retrieved from the Internet <arXiv:2007.14528>.

Lengerich, B. et al. Purifying Interaction Effects with the Functional ANOVA: An Efficient Algorithm for Recovering Identifiable Additive Models. Proceedings of the 23rd International Conference on Artificial Intelligence and Statistics, May 5, 2020, 21 pages. Retrieved from the Internet <arXiv:1911.04974v3>.

Lou, Y. et al. Accurate Intelligible Models with Pairwise Interactions. Conference on Knowledge Discovery and Data Mining 2013 (KDD'13), 9 pages.

Quinlan, J. R. Learning with Continuous Classes. In proceedings AI'92 (Adams & Sterling, Eds), Singapore: World Scientific, 1992. 6 pages.

Ribeiro, M. et al. "Why Should I Trust You?" Explaining the Predictions of Any Classifier. Proceedings of the 22nd ACM SIGKDD International Conference on Knowledge Discovery and Data Mining, 2016, 10 pages. Retrieved from the Internet <DOI: 10.1145/2939672.2939778>.

Stone, C. The Use of Polynomial Splines and their Tensor Products in Multivariate Function Estimation. The Annals of Statistics, Technical Report No. 359 from the Department of Statistics, Berkeley, CA, Jun. 1992. 61 pages.

Sudjianto, A. et al. Unwrapping the Black Box of Deep ReLU Networks: Interpretability, Diagnostics, and Simplification. Nov. 8, 2020. Retrieved from the Internet <arXiv:2011.04041v1>.

Vaughan, J. et al. Explainable Neural Networks based on Additive Index Models. The RMA Journal, Corporate Model Risk, Wells Fargo, USA, Jun. 2018. 11 pages. Retrieved from the Internet <arXiv:1806.01933v1>.

Yang, Z. et al. GAMI-Net: An Explainable Neural Network based on Generalized Additive Models with Structured Interactions. Pattern Recognition, Corporate Model Risk, Wells Fargo, USA, 2021. 30 pages. Retrieved from the Internet <arXiv:2003.07132v2>.

Zeileis, A. et al. Model-based Recursive Partitioning. Journal of Computational and Graphical Statistics, American Statistical Association, Institute of Mathematical Statistics, 2008, 19 pages. Retrieved from the Internet <DOI: 10.1198/10618600SX319331>.

\* cited by examiner

Algorithm 4: GAMI-Tree

*Input: train, validation*

Initialize $g(x) = g_0(x)$ to be overall mean (continuous) or overall logit (binary)

for $r = 1$ to $R$ do:

FitMain(train, validation, $g(x)$), record early stopping rounds $M_{main\_stop}$ $Q$=FilterInt(train, $g(x)$)

FitMain(train, validation, $g(x)$, $Q$), record early stopping rounds $M_{int\_stop}$ if $M_{main\_stop} == 0$ and $M_{int\_stop} == 0$:

break # stop if both main and interaction stages stop with 0 iterations

FIG. 4

Algorithm 1: FitMain

Input: train, validation, initial $g_0(x)$ for $m = 1$ to $M$ do:

calculate first and second order derivatives of the loss function: $G_{i,m-1}$ and $H_{i,m-1}$ — 601 calculate pseudo-response $Z_{i,m} = \dfrac{-G_{i,m-1}}{H_{i,m-1}}$ — 602 for $j = 1$ to $p$ do:

fit a main effect tree $T_m^{(1)}(x_j)$ to $Z_{i,m-1}$ using $x_j$, with weights $H_{i,m-1}$ calculate $SSE_j = \sum_{i=1}^{n} H_{i,m-1}\left(Z_{i,m} - T_m^{(1)}(x_{ij})\right)^2$ — 603

$j^* = \arg\min_{j} SSE_j$ $g_m(x) = g_{m-1}(x) + \lambda T_m^{(1)}(x_{j^*})$ — 604 calculate validation loss at $m$-th iteration $L_m = \dfrac{1}{n'}\sum_{i=1}^{n'} \ell(y_i, g(x_i))$, $n'$ is sample size — 605 if $L_{m-d} < \min L_{m-d+1:m}$: # stop if no improvement in last $d$ iterations — 606

$g(x) = g_{m-d}(x)$ # the final $g(x)$ is rolled back to $d$ iteration earlier — 607 break

FIG. 6

Algorithm 3: FilterInt

*Input: train, $g(x)$* calculate first and second order derivatives of the loss function: $G_i$ and $H_i$ calculate pseudo-response $Z_i = \dfrac{-G_i}{H_i}$ for $j=1$ to $p-1$ do:

for $k = j+1$ to $p$ do:

fit an interaction effect tree $T^{(2)}(x_j, x_k)$ to $Z_i$, with weights $H_i$ calculate $SSE_{jk} = \sum_{i=1}^{n} H_i \left( Z_i - T^{(2)}(x_{ij}, x_{ik}) \right)^2$ fit an interaction effect tree $T^{(2)}(x_k, x_j)$ to $Z_i$, with weights $H_i$ calculate $SSE_{kj} = \sum_{i=1}^{n} H_i \left( Z_i - T^{(2)}(x_{ik}, x_{ij}) \right)^2$ rank all pairs by min $(SSE_{jk}, SSE_{kj})$ in ascending order #choose the smaller SSE select top $q$ pairs $\{(j_1, k_1), \ldots, (j_q, k_q)\}$ output $Q = \{(j_1, k_1), \ldots, (j_q, k_q)\} \cup \{(k_1, j_1), \ldots, (k_q, j_q)\}$

FIG. 9

Algorithm 2: FitInt

*Input: train, validation, inital $g_0(x)$, top $q$ interaction pairs $Q$* for $m=1$ to $M$ do:

calculate first and second order derivatives of the loss function: $G_{i,m-1}$ and $H_{i,m-1}$ calculate pseudo-response $Z_{i,m} = \dfrac{-G_{i,m-1}}{H_{i,m-1}}$ for $(x_j, x_k)$ in $Q$ do:

fit an interaction effect tree $T_m^{(2)}(x_j, x_k)$ to $Z_{i,m}$, with weights $H_i$ calculate $SSE_{jk} = \sum_{i=1}^{n} H_{i,m-1} \left( Z_{i,m} - T_m^{(2)}(x_{ij}, x_{ik}) \right)^2$ $j^*, k^* = \arg\min_{j,k} SSE_{jk}$ $g_m(x) = g_m(x) + \lambda T_m^{(2)}(x_{j^*}, x_{k^*})$ calculate validation loss at $m$-th iteration $L_m = \dfrac{1}{n'} \sum_{i=1}^{n'} \ell(y_i, g(x_i))$, $n'$ is sample size if $L_{m-d} < \min L_{m-d+1:m}$: # stop if no improvement in last $d$ iterations $g(x) = g_{m-d}(x)$ # the final $g(x)$ is rolled back to $d$ iteration earlier break

FIG. 11

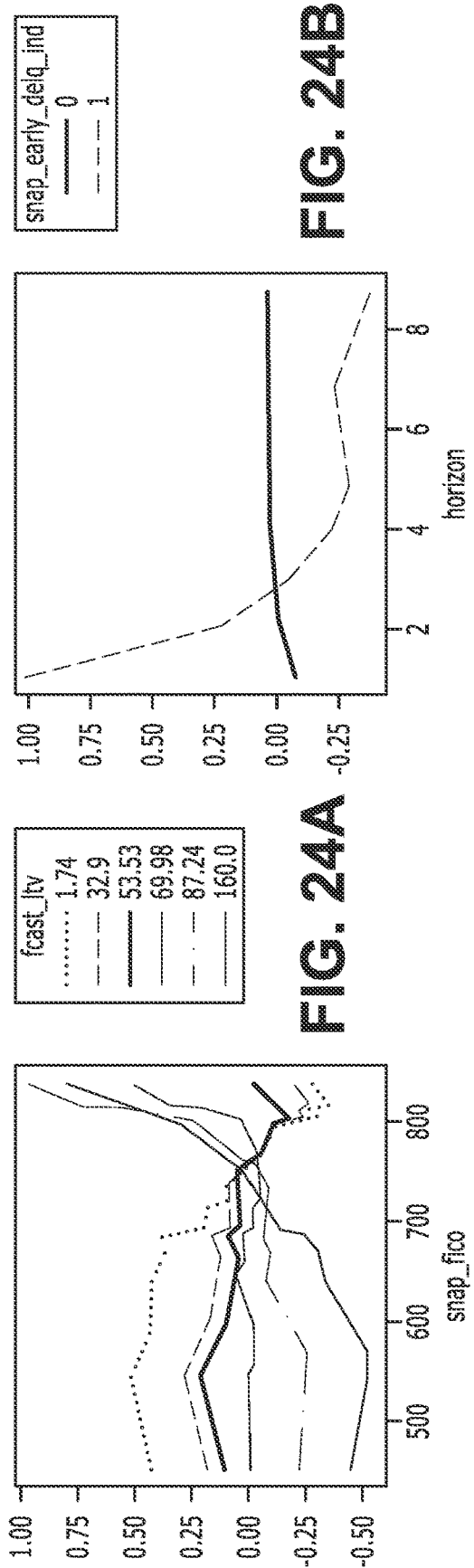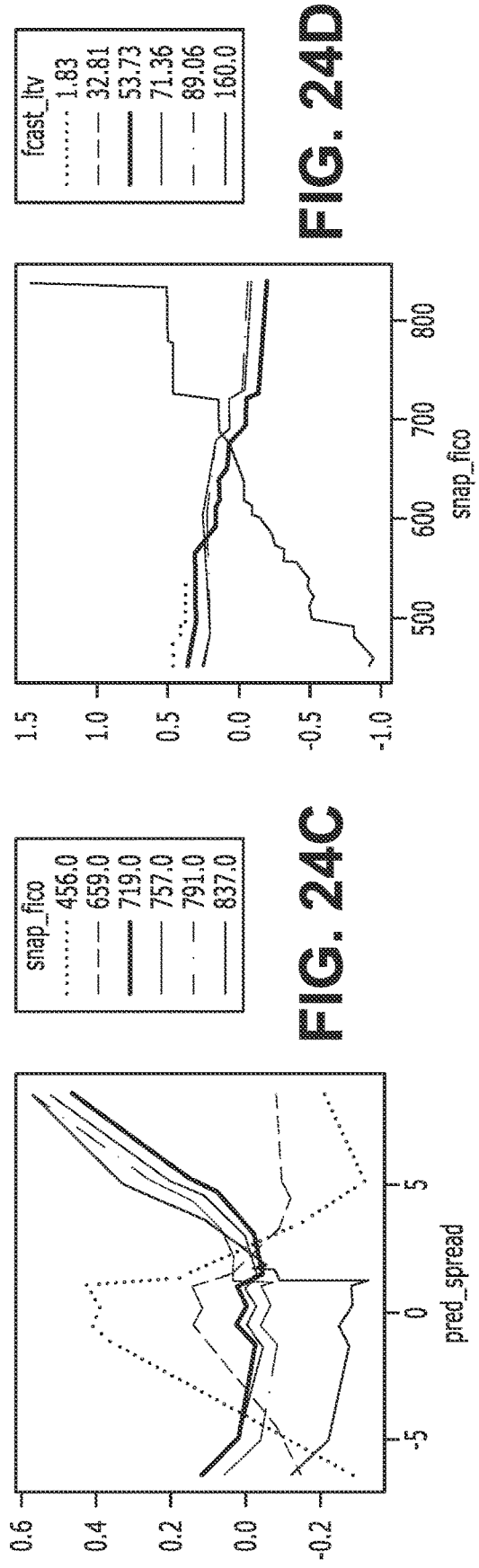
FIG. 24A  FIG. 24B  FIG. 24C  FIG. 24D

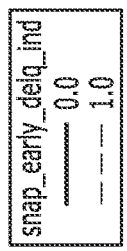
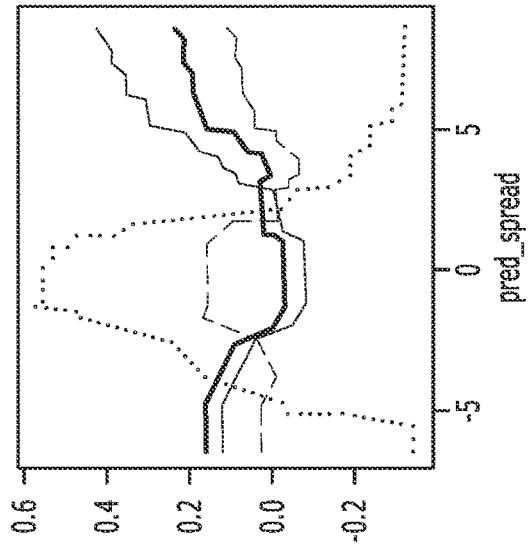
FIG. 24E
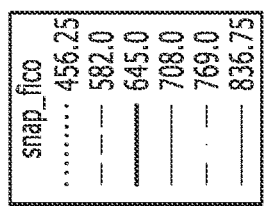
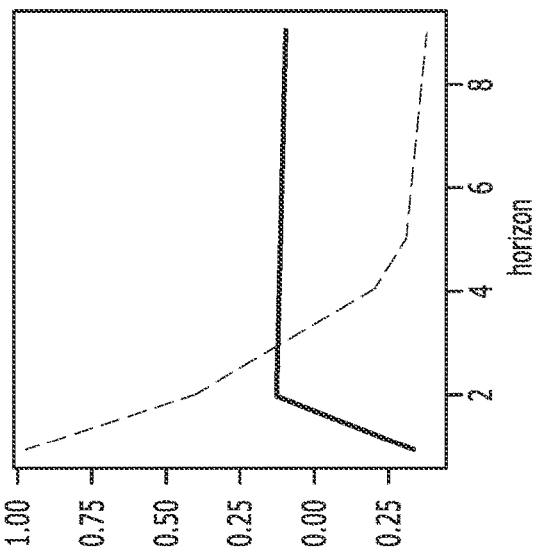
FIG. 24F
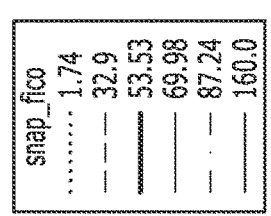
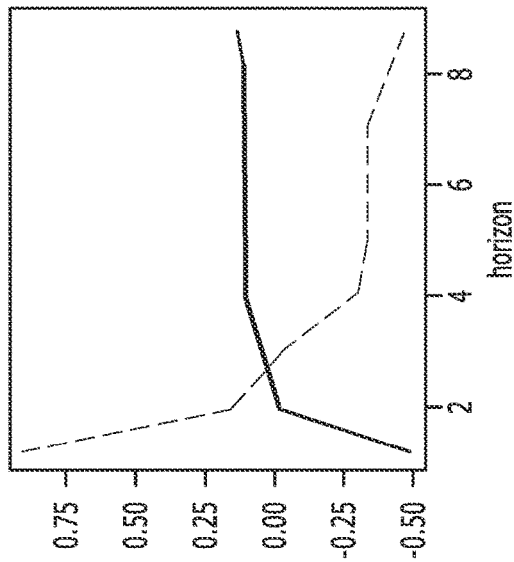
FIG. 24G
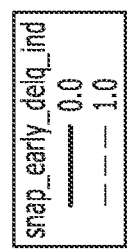
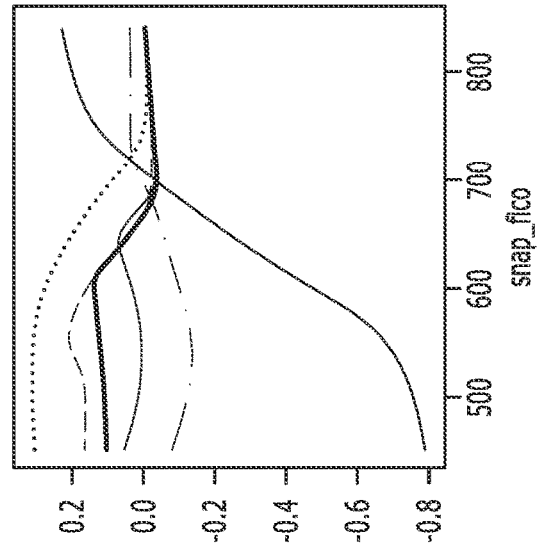
FIG. 24H

USING MODEL-BASED TREES WITH BOOSTING TO FIT LOW-ORDER FUNCTIONAL ANOVA MODELS

CROSS REFERENCE TO RELATED APPLICATIONS

The present application claims the benefit of U.S. Provisional Application No. 63/368,224, filed Jul. 12, 2022, which is hereby incorporated by reference in its entirety.

BACKGROUND

Machine learning models and algorithms have been used extensively in a variety of areas to solve a multitude of problems. However, the interpretability of results from machine learning algorithms has been the subject of considerable debate in recent years.

BRIEF SUMMARY

As discussed above, the interpretability of machine learning (ML) algorithms has been the subject of considerable discussion in recent years. Early approaches relied on post hoc techniques, including variable importance, partial dependence plots or PDPs, and H-statistics. These are low-dimensional summaries of high-dimensional models with complex structure, and hence can be inadequate in capturing the full picture. A second approach for model interpretability is the use of surrogate models (or distillation techniques) that fit simpler models to extract information and explanations from the original complex models. Examples include: i) local interpretable model-agnostic (LIME) models which are based on linear models for local explanations; and ii) locally additive trees for local and global explanation.

A more recent direction is the use of ML algorithms to fit so-called inherently interpretable models that are extensions of the popular generalized additive models (GAMs) to incorporate common types of interactions of features. The rationale is as follows. While there are applications (typically large-scale pattern recognition problems) where the use of very complex algorithms yields new results and insights, in many other areas, nonparametric models with lower-order interactions are sufficient in capturing the structure. This philosophy is a reversal of the trend towards fitting very complex ML models to squeeze out as much predictive performance as possible.

The additive index model (AIM), $g(x)=g_1(\beta_1^T x)+g_2(\beta_2^T x)+ \ldots +g_K(\beta_K^T x)$, is one way to generalize GAM to capture certain types of feature interactions. It was first proposed as an exploratory tool in the early days of nonparametric regression and was called projection pursuit. Later, it was shown that a restricted neural network can be used to fit AIMs using gradient-based training, often referred to as explainable neural networks (xNNs).

Another class of models, based on fANOVA, focuses on just the main effects (GAMs) and interaction-effect interactions:

$$g(x) = \sum_j g_j(x_j) + \sum_{j \neq k} g_{jk}(x_j, x_k) \qquad (1)$$

where $x_j$ and $x_k$ are features from a set of input features.

This class of fANOVA models are referred to as GA2M models. The philosophy of approximating underlying models by low-order fANOVA structure of the form in equation (1) is well known. However, most of the available algorithms, based primarily on polynomial and smoothing splines, do not scale up to high-dimensions or large datasets. This is the gap that is attempted at being filled by recent literature that use ML architecture and their built-in fast algorithms to fit such models. Explainable boosting machine (EBM) models use gradient boosting with piecewise constant trees to fit the GA2M models. generalized additive model with structured interactions (GAMI)-Net uses (restricted) neural network structures and the associated optimization techniques to fit the GA2M models.

EBM is a two-stage algorithm where the main effects and two-way interactions in Eq (1) are fitted in stages. Specifically: i) the main effect of each feature is modeled using small, piecewise-constant trees which split only on that single feature; and ii) the interaction effect of each pair is modeled using small trees (of depth 2) which split only on that same pair of features. Within the main effect (or interaction) stage, the algorithm cycles through all features (or pairs of features) in a round-robin manner and iterates for several rounds. Since the total number of feature pairs can be large, an interaction filtering method, called FAST by the authors of EBM, is used to select the top interactions. Only those interactions are modeled in the second stage. In FAST, EBM fits a simple interaction model to the residuals (after removing the fitted main effects) for each pair of features and ranks all pairs by the reduction in an appropriate metric for model error. The interaction model used in FAST is a simple approximation which divides the two-dimensional input space into four quadrants and fits a constant in each quadrant to estimate the functional interaction. This approximation is justified because fully building the interaction structure for each pair "is a very expensive operation".

GAMI-Net is also a multi-stage algorithm. It first uses GAM-Net, which is a specialized neural network (NN), to estimate the main effects. To impose sparsity, a pruning step is added at the end to remove features/subnetworks with small contributions. Then the top interactions are then selected using the FAST algorithm from EBM and are modeled using another specialized NN to capture interactions in the second stage. A pruning step is again added in the end to remove interactions with small contributions. Finally, all the important effects are collectively tuned in a final stage.

However, each of the above-described model has associated setbacks. In particular, EBM may not accurately identify or may miss feature interactions such that it is not able to identify feature importance as accurately. Thus, the output indicative of model interpretability may be inaccurate or misleading due to the missed feature interaction.

Accordingly, the present disclosure sets forth systems, methods, and apparatuses that train a robust, and accurate generalized additive model with structured interactions (GAMI)-Tree model that is capable of identifying feature interactions more efficiently and accurately, thereby improving model performance and interpretability. In particular, the GAMI-Tree model may be trained by initializing an iterative prediction model and performing a required number of model training iterations. Each model training iteration may include performing a required number of main-effect gradient boosting iterations according to a main-effect gradient boosting routine, generating a plurality of qualified input feature pairs, and then performing a required number of interaction-effect gradient boosting iterations according to an interaction-effect gradient boosting routine. A GAMI-Tree model may then be generated based on the iterative prediction model generated by the final interaction-effect gradient boosting iteration of a final model training iteration.

As such, the GAMI-Tree model may be an inherently-interpretable model that uses effective methodology and fast algorithms to estimate main-effects (e.g., individual feature contributions) and two-way interactions (e.g., interactions between features) nonparametrically. As shown in the examples section, GAMI-Tree performs comparably or better than EBM and GAMI-Net in terms of predictive performance and is able to identify the interactions more accurately. This is due to several novel features including (i) the use of improved base learners for estimating non-linear main effects and interactions of features, (ii) a new interaction filtering method which captures feature interactions more accurately, (iii) a new iterative training method which converges to more accurate models, and (iv) an orthogonalization method to make sure interactions and main effects are hierarchically orthogonal. Thus, the generated GAMI-Tree may be useful in terms of model performance and model interpretation.

In particular, both GAMI-Tree and EBM are tree-based algorithms, and they share several similarities including estimating main effects and interactions in separate stage, interaction filtering, and model-fitting in an additive way using simple base learners. However, there are some key differences as described herein. GAMI-Tree uses model-based trees (MBTS) as base learners in fitting main effects and interaction-effect interactions (e.g., main-effect tree data objects and interaction-effect tree data objects, respectively). MBTs are more flexible and require fewer splits and fewer number of trees to capture a complex function. In general, they lead to less overfitting and hence they have better generalization performance. Additionally, a new interaction filtering method is implemented by using MBTs. Even though the simple 4-quadrant model used in FAST works well in general, model-based tree can capture interaction pattern better and rank the interaction effects more accurately in some cases. Furthermore, GAMI-Tree models use an iterative fitting method to fit the main effects and interactions, instead of the two-stage fitting method used in EBM. This has two advantages which lead to performance improvement if we iterate. The first advantage is when main effects and interaction features are not orthogonal, fitting main effects and interaction features cannot be done in the naïve two-stage way. As an analogy, consider the main effects and interaction features as two correlated predictors $x_1$, $x_2$ (but not perfectly collinear). Feature $x_1$, cannot just be fitted and then $x_2$ be fitted using the residuals. Instead, it is necessary to iteratively fit one predictor (e.g., feature) at a time until convergence (or fit the two simultaneously). Otherwise, bias is found and results in a worse model fit. As the second advantage, some weaker interaction features may be missed in the initial round of filtering. By iterating, GAMI-Tree can capture the missed interaction features in the subsequent iterations. Therefore, it is better at capturing all true interactions.

In some embodiments, once GAMI-Tree is trained, it may be used for one or more predictive operations. For example, in some embodiments, the trained GAMI-Tree may be used to predict a preliminary risk category for an entity associated with entity input data processed by the GAMI-Tree. As such, a real-time registration processing output may be determined for the entity based on the generated preliminary risk category such that the entity may proceed with a registration process in substantially real-time that may not have been possible otherwise.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

FIG. 4 illustrates a flowchart diagram of an example process for a model training pseudocode for training a GAMI-Tree model in accordance with various embodiments of the present invention.

FIG. 6 provides an operational example of a main-effect gradient boosting routine pseudocode for performing operations of a main-effect gradient boosting routine in accordance with various embodiments of the present invention.

FIG. 9 provides an operational example of a qualified input feature pair selection routine pseudocode for performing operations of a qualified input feature pair selection routine in accordance with various embodiments of the present invention.

FIG. 11 provides an operational example of a interaction-effect gradient boosting routine pseudocode for performing operations of a main-effect gradient boosting routine in accordance with various embodiments of the present invention.

FIGS. 24A, 24B, 24C, 24D, 24E, 24F, 24G, and 24H provide operational examples of the interaction plots for home lending data with the GAMI-Tree (top), EBM (middle), and GAMI-Net (Bottom) as detailed in example 2.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

System Architecture

Figure 1:
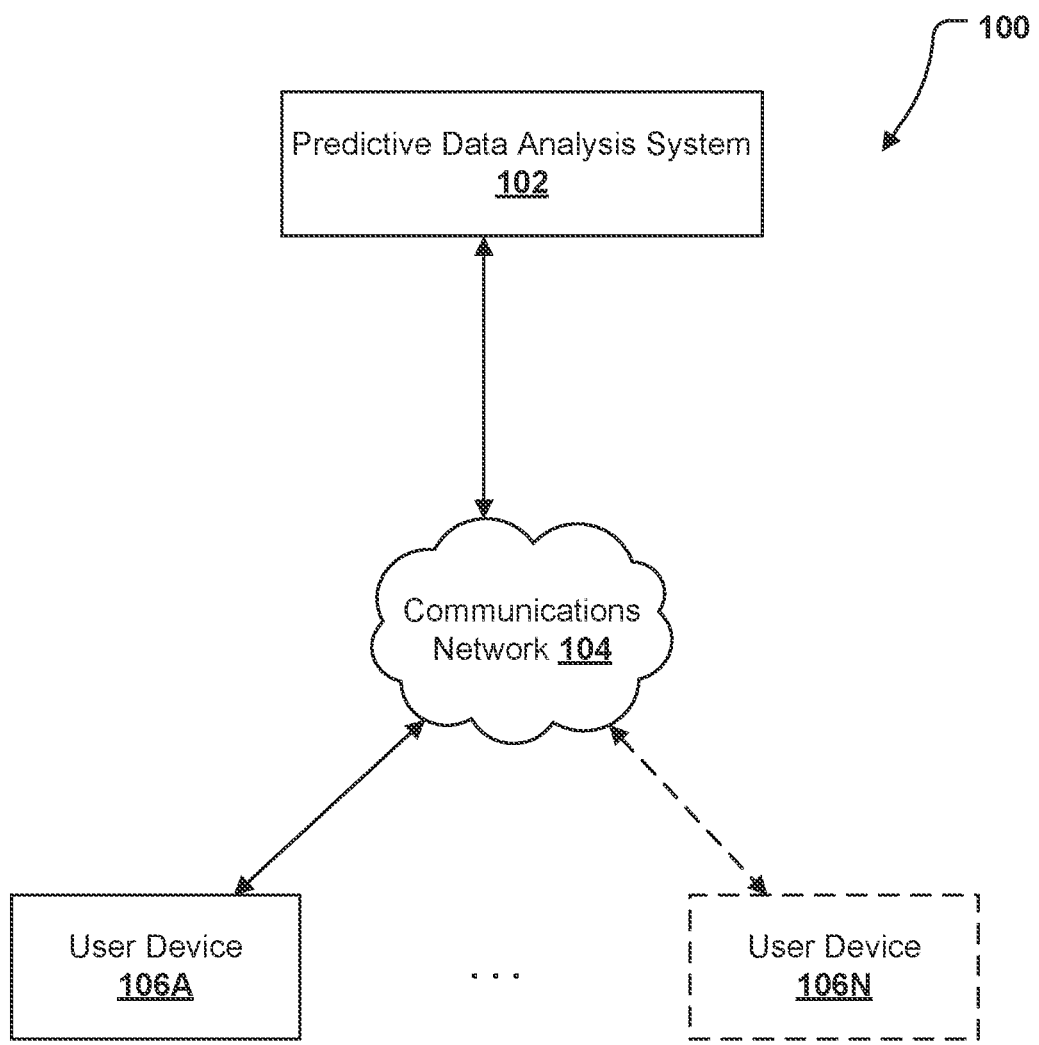
FIG. 1 illustrates a system in which some example embodiments may be used for training and/or using a GAMI-Tree model.

Example embodiments described herein may be implemented using any of a variety of computing devices or servers. To this end, FIG. 1 illustrates an example environment 100 within which various embodiments may operate. As illustrated, a predictive data analysis system 102 may receive and/or transmit information via communications network 104 (e.g., the Internet) with any number of other devices, such as one or more of user device 106A-106N.

The predictive data analysis system 102 may be implemented as one or more computing devices or servers, which may be composed of a series of components. Particular components of the predictive data analysis system 102 are described in greater detail below with reference to apparatus 200 in connection with FIG. 2.

In some embodiments, the predictive data analysis system 102 further includes a storage device (not shown) that comprises a distinct component from other components of the predictive data analysis system 102. The storage device may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 104). The storage device may host the software executed to operate the predictive data analysis system 102. The storage device may store information relied upon during operation of the predictive data analysis system 102, such as an iterative prediction model, main-effect tree data object, candidate iterative prediction model, qualified pair selection routine, first split-constrained tree data object, second split-constrained tree data object, optimal qualified input feature pair, interaction-effect tree data object, GAMI-Tree model, and/or the like that may be used by the predictive data analysis system 102, data and documents to be analyzed using the predictive data analysis system 102, or the like. In addition, a storage device (not shown) may store control signals, device characteristics, and access credentials enabling interaction between the predictive data analysis system 102 and one or more of the user devices 106A-106N.

The one or more user devices 106A-106N may be embodied by any computing devices known in the art. The one or more user devices 106A-106N need not themselves be independent devices, but may be peripheral devices communicatively coupled to other computing devices.

Although FIG. 1 illustrates an environment and implementation in which the predictive data analysis system 102 interacts indirectly with a user via one or more of user devices 106A-106N, in some embodiments users may directly interact with the predictive data analysis system 102 (e.g., via communications hardware of the predictive data analysis system 102), in which case a separate user device 106A-106N may not be utilized. Whether by way of direct interaction or indirect interaction via another device, a user may communicate with, operate, control, modify, or otherwise interact with the predictive data analysis system 102 to perform the various functions and achieve the various benefits described herein.

Example Implementing Apparatuses

Figure 2:
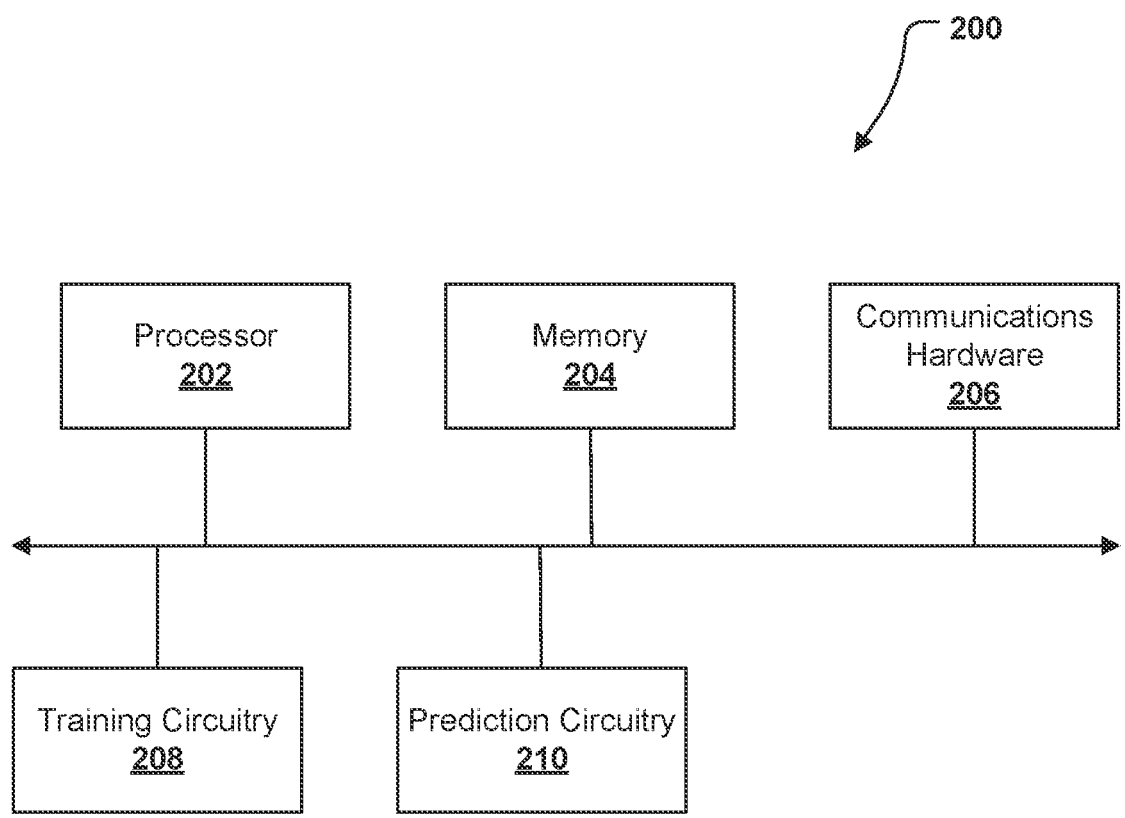
FIG. 2 illustrates a schematic block diagram of example circuitry embodying a system device that may perform various operations in accordance with some example embodiments described herein.

The predictive data analysis system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3-26. As illustrated in FIG. 2, the apparatus 200 may include processor 202, memory 204, communications hardware 206, training circuitry 208, and prediction circuitry 210, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a training circuitry 208 that may be configured to perform one or more training operations, such as training a GAMI-Tree model. In particular, the training circuitry 208 may be configured to initialize an iterative prediction model and perform a required number of iterations to generate a GAMI-Tree model. At each training iteration, the training circuitry 208 may be configured to perform a required number of main-effect gradient boosting iterations, generate a plurality of qualified input feature pairs, perform a required number of interaction-effect gradient boosting iterations of a interaction-effect gradient boosting routine, and the one or more sub-operations required for each operation. The training circuitry 208 may utilize processor 202, memory 204, or any other hardware component included in the apparatus 200 to perform these operations, as described in connection with FIGS. 3-26 below. The training circuitry 208 may further utilize communications hardware 206 to gather data from a variety of sources (e.g., user device 110A through user device 110N or as shown in FIG. 1 or a storage device), and/or exchange data with a user, and in some embodiments may utilize processor 202 and/or memory 204 to training circuitry 208.

In addition, the apparatus 200 further comprises prediction circuitry 210 that is configured to generate a preliminary risk category and/or a registration processing output for an entity based on received entity input data and using the trained GAMI-Tree model. The prediction circuitry 210 may utilize processor 202, memory 204, or any other hardware component included in the apparatus 200 to perform these operations, as described in connection with FIGS. 3-26 below. The prediction circuitry 210 may further utilize communications hardware 206 to gather data from a variety of sources (e.g., user device 110A through user device 110N or as shown in FIG. 1 or a storage device), and/or exchange data with a user, and in some embodiments may utilize processor 202 and/or memory 204 to prediction circuitry 210.

Although components 202-210 are described in part using functional language, it will be understood that the particular implementations necessarily include the use of particular hardware. It should also be understood that certain of these components 202-212 may include similar or common hardware. For example, the training circuitry 208 and prediction circuitry 210 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the training circuitry 208 and prediction circuitry 210 may leverage processor 202, memory 204, or communications hardware 206 as described above, it will be understood that any of training circuitry 208 and prediction circuitry 210 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that training circuitry 208 and prediction circuitry 210 comprise particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of graphical user interfaces and flowcharts.

Example Operations

FIGS. 3, 5, 8, 10, and 13 are example flowcharts that contain example operations implemented by example embodiments described herein. The operations illustrated in any of FIG. 3, 5, 8, 10, or 13 may, for example, be performed by system device of the predictive data analysis system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, training circuitry 208, prediction circuitry 210, and/or any combination thereof. It will be understood that user interaction with the predictive data analysis system 102 may occur directly via communications hardware 206, or may instead be facilitated by a separate device, such as any one of user devices 106A-106N, as shown in FIG. 1, and which may have similar or equivalent physical componentry facilitating such user interaction.

Figure 3:
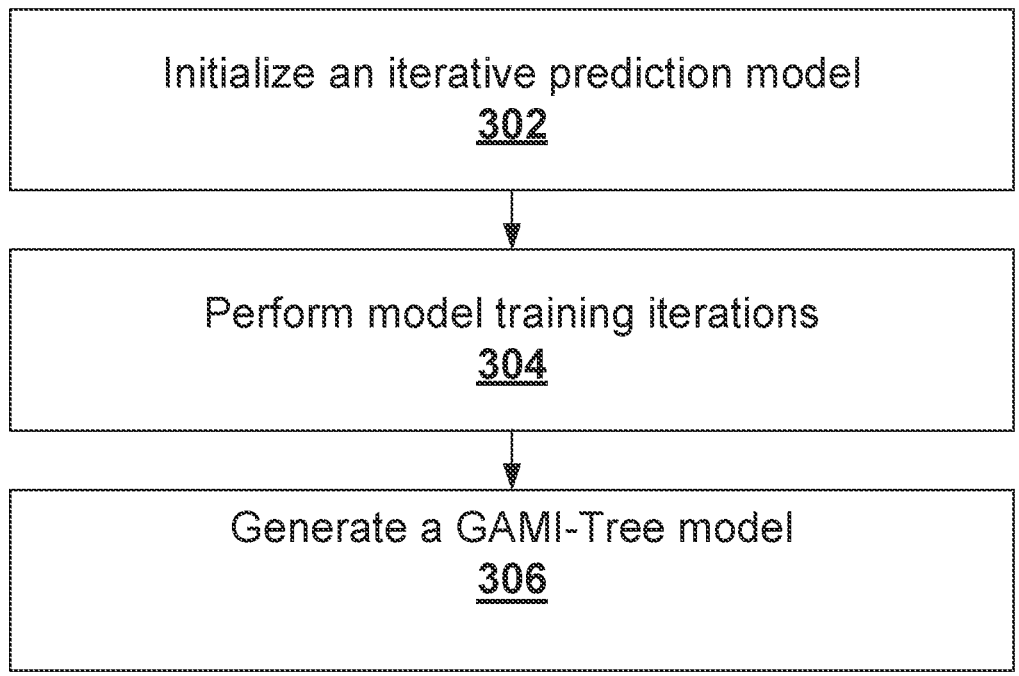
FIG. 3 illustrates an example flowchart for training a GAMI-Tree model in accordance with various embodiments of the present invention.
Figure 5:
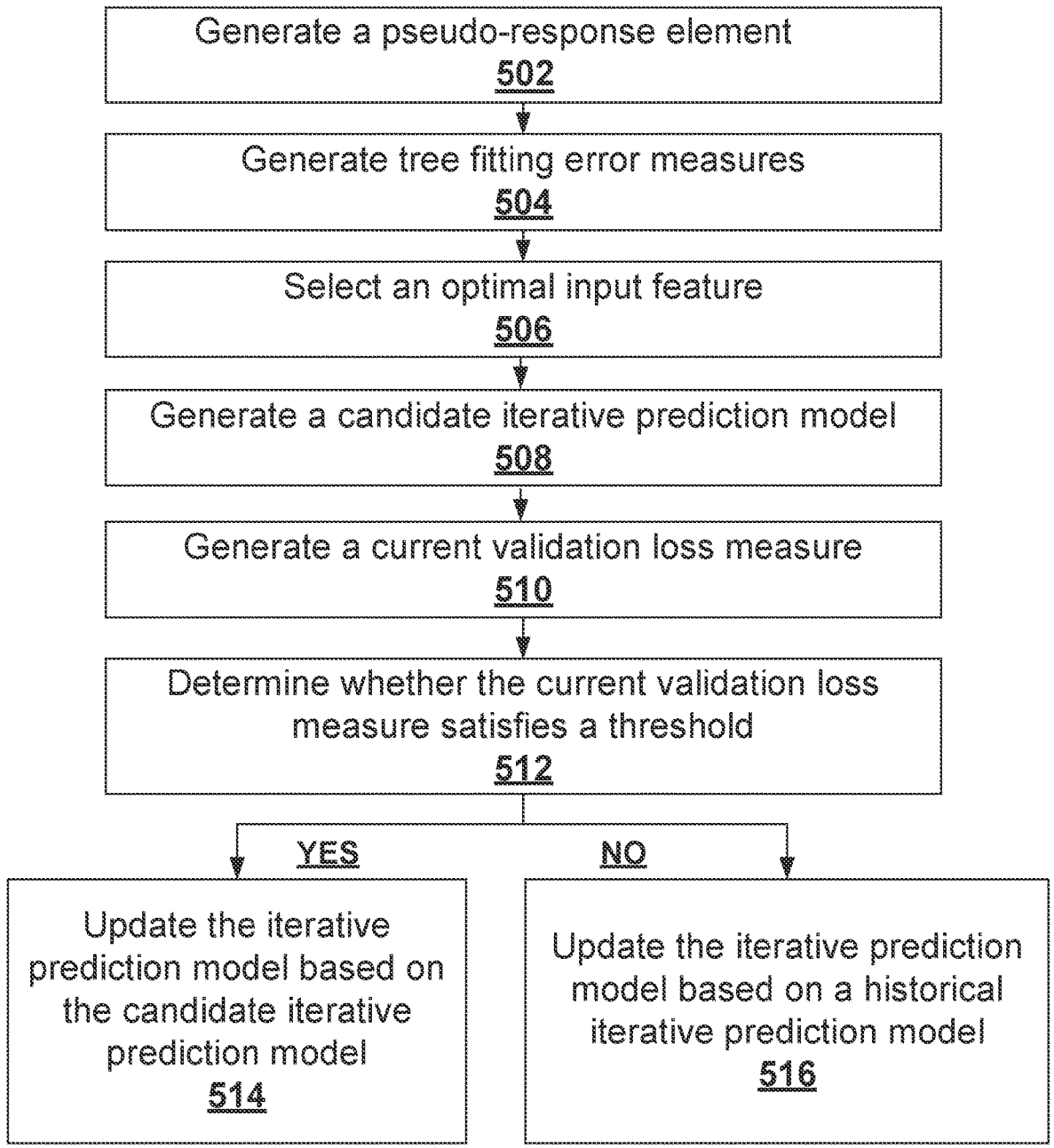
FIG. 5 is a flowchart diagram of an example process for performing operations of a main-effect gradient boosting routine during a current model training iteration for training a GAMI-Tree model in accordance with various embodiments of the present invention.

Turning first to FIG. 3, example operations are shown for training a GAMI-Tree model. Via the various steps/operations of the process depicted in FIG. 3, the training circuitry 208 can generate a GAMI-Tree model that integrates both main-effect feature effects and interaction-effect feature-interaction effects on predictive outcomes in a computationally efficient yet explainable/interpretable manner.

As shown by operation 302, the apparatus 200 includes means, such as processor 202, memory 204, communications hardware 206, training circuitry 208, or the like, for initializing an iterative prediction model. In some embodiments, an iterative prediction model may be a base model which is to be updated based on fitted main effects and fitted interactions effects to generate the GAMI-Tree model as further described in operation 304. The iterative prediction model may be trained using R iterations, where R corresponds to a number of required iterations. The particular parameters, functions, code segments, and/or the like for the iterative prediction model may be stored in by an associated storage device (e.g., memory 204 or separate storage device) and accessible to the training circuitry 208. In some embodiments, the training circuitry 208 may access the iterative prediction model for training operations in response to a received user training request. In some embodiments, the training circuitry 208 may receive an iterative prediction model from an external device, such as any one of user devices 106A-106N.

In some embodiments, the received user training request may include an input training data set. The input training data set may include response features and corresponding values that may be used to train the iterative prediction model and generate the GAMI-Tree model. The training circuitry 208 may partition the input training data set into multiple groups of data. For example, the training circuitry 208 may partition a fraction of the input training data set as training data, which may be used to train the iterative prediction model and another fraction of the input training data set as validation data, which may be used validate the trained iterative prediction model.

In some embodiments, if the response features of the input training data used to generate GAMI-Tree model are continuous features, the initialized the iterative prediction model may be a model that assigns, to each training prediction input data object in the training data, an inferred prediction that is determined based on a mean of all of the continuous response feature values in the training data. Alternatively, in some embodiments, if the response features of the training data used to generate GAMI-Tree model is a binary value, the initialized iterative prediction model may be a model that assigns, to each training prediction input data object in the training data, an inferred prediction that is determined based on a logit measure of all of the binary response feature values in the training data.

FIG. 4 depicts an example process for a model training pseudocode 400 for training a GAMI-Tree model. As shown in FIG. 4, the model training pseudocode 400 includes a pseudocode segment 401 for initializing an iterative prediction model. As seen in pseudocode segment 401, an initial value of $g_0(x)$ is set for the iterative prediction model. Here, x is the p-dimensional predictor vector of the form $$x=(x_1,\ldots,x_p\ldots,x_p)^T.$$

Additionally, g(x) is the model (to be fitted).

As described above, both continuous and binary response features. For a continuous response feature, a squared error loss function of the form:

$$\ell(y,g(x))=(y-g(x))^2$$

is used, where y is the response feature. Similarly, for a binary response feature, a log loss of the form:

$$\ell(y,g(x))=\log(1+\exp(g(x))-yg(x)$$

is used, where g(x) is the log-odds. The goal is to minimize the mean loss $$L=\frac{1}{n}\sum_{i=1}^{n}\ell(y_i,g(x_i))$$

by boosting it using model-based trees.

As shown by operation 304, the apparatus 200 includes means, such as processor 202, memory 204, communications hardware 206, training circuitry 208, or the like, for performing a required number of model training iterations. The number of model training iterations performed may correspond to a R required model training iterations. In some embodiments, R is a main-effect gradient boosting iteration count hyperparameter that defines the required number of model training iterations. In some embodiments, each model training iteration may include (i) performing a required number of main-effect gradient boosting iteration of a main-effect gradient boosting route, (ii) generating a plurality of qualified input feature pairs, and (iii) perform a required number of interaction-effect gradient boosting iterations of a interaction-effect gradient boosting routine. Additional details for each of the operations may be further described in FIGS. 5, 8, and 10.

Returning to FIG. 4, the model training pseudocode 400 includes a pseudocode segment 402 for performing R model training iterations required to generate the GAMI-Tree model. As further depicted in FIG. 4, the pseudocode segment 402 is performed R times (e.g., a value corresponding to the number of required model training iterations) and comprises: (i) a FitMain routine, (ii) a FilterInt routine, and (iii) a FitInt routine.

Here, the FitMain routine may correspond to the main-effect gradient boosting routine that is performed once during each model training iteration and updates the iterative predictive model by integrating an optimal main-effect tree data object into the iterative predictive model. The FilterInt routine may correspond to a qualified input feature pair selection routine that is performed once during each model training iteration and selects a qualified subset of the defined input feature pairs for the GAMI-Tree model. The FitInt may correspond to the interaction-effect gradient boosting routine that is performed once during each model training iteration and updates the iterative predictive model by integrating an optimal interaction-effect tree data object into the iterative predictive model. Accordingly, in some embodiments, the GAMI-Tree model is generated based on the updated iterative prediction model that is generated by a final interaction-effect gradient boosting iteration of a final model training iteration.

In some embodiments, at least one of the main-effect gradient boosting routine and the interaction-effect gradient boosting routine are itself iterative processes. For example, in some embodiments, the main-effect gradient boosting routine comprises a required number of the main-effect gradient boosting iterations and the interaction-effect gradient boosting routine comprises a required number of the interaction-effect gradient boosting iterations. In some of the noted embodiments, two features (e.g., features $M_{main\_stop}$ for the main-effect gradient boosting routine and $M_{int\_stop}$ for the interaction-effect gradient boosting routine in the operational example of FIG. 4) are decremented during each main-effect gradient boosting iteration and each interaction-effect order gradient boosting iteration respectively to ensure that, when both of the features reach zero, a current mode training iteration is exited. In some embodiments, at the beginning of each model training iteration, the two noted features (which may have different initial values for different model training iterations) are initialized to a main-effect gradient boosting iteration count hyperparameter and a interaction-effect gradient boosting iteration count hyperparameter for the noted model training iteration respectively.

As shown by operation 502, the apparatus 200 includes means, such as processor 202, memory 204, communications hardware 206, training circuitry 208, or the like, for generating a pseudo-response element. As further depicted in pseudocode segment 601 of the main-effect gradient boosting routine pseudocode 600 of FIG. 6. As depicted in FIG. 6, the pseudocode segment 601 comprises generating the pseudo-response element $z_{i,m}$ as a ratio of a negation of a main-effect derivative loss element $G_{i,m-1}$ and a interaction-effect derivative loss element $H_{i,m-1}$. In some embodiments, the main-effect derivative loss element and the interaction-effect derivative loss element are respective main-effect and interaction-effect derivatives of an underlying loss model that is determined based on a distance measure between inferred predictions for training input data objects as generated based on a latest-updated iterative prediction model and response values for the training input data objects as indicated by the response features values of the training data for the GAMI-Tree model.

As shown by operation 504, the apparatus 200 includes means, such as processor 202, memory 204, communications hardware 206, training circuitry 208, or the like, for generating tree fitting error measures. As further depicted in FIG. 6, the pseudocode segment 602 comprises fitting a tree to the pseudo-response element $z_{i,m}$—using jth input feature $x_j$, generating a sum of squared error (SSE) measure while using the interaction-effect derivative loss element $H_{i,m-1}$ as the weights of the SSE measure, and then using the optimal SSE measure for the optimal tree data object for the jth input feature as the tree fitting error measure for the jth input feature.

As shown by operation 506, the apparatus 200 includes means, such as processor 202, memory 204, communications hardware 206, training circuitry 208, or the like, for selecting an optimal input feature of the set of input features in the input space tree-based machine learning model. In some embodiments, the training circuitry 208 selects the input feature that has the minimal tree fitting error measure as the optimal input feature.

In some embodiments, performing operation 506 comprises performing operations of the pseudocode segment 603 of the main-effect gradient boosting routine pseudocode 600 of FIG. 6. As depicted in FIG. 6, the pseudocode segment 603 comprises selecting the jth input feature that minimizes the SSE measure as the optimal input feature or j*.

As shown by operation 508, the apparatus 200 includes means, such as processor 202, memory 204, communications hardware 206, training circuitry 208, or the like, for generating a candidate iterative prediction model. The training circuitry may generate a candidate iterative prediction model based on the latest-updated iterative prediction model and the main-effect tree data object for the optimal input feature.

In some embodiments, performing operation 508 comprises performing operations of the pseudocode segment 604 of the main-effect gradient boosting routine pseudocode 600 of FIG. 6. As depicted in FIG. 6, the pseudocode segment 604 comprises generating the candidate iterative prediction model $g_m(x)$ based on the output of the addition of the latest-updated iterative prediction model $g_{m-1}(x)$ and the application of a learning rate hyperparameter $\lambda$ to the main-effect tree data object for the optimal input feature j*, i.e., to $T^1_m(x_{j*})$.

As described above, in some embodiments, during each current model training iteration, a main-effect gradient boosting routine is performed that comprises a required number of main-effect gradient boosting iterations. In some embodiments, performing the operations of an mth main-effect gradient boosting routine comprises performing the operations of the process described by FIG. 5.

Figure 7:
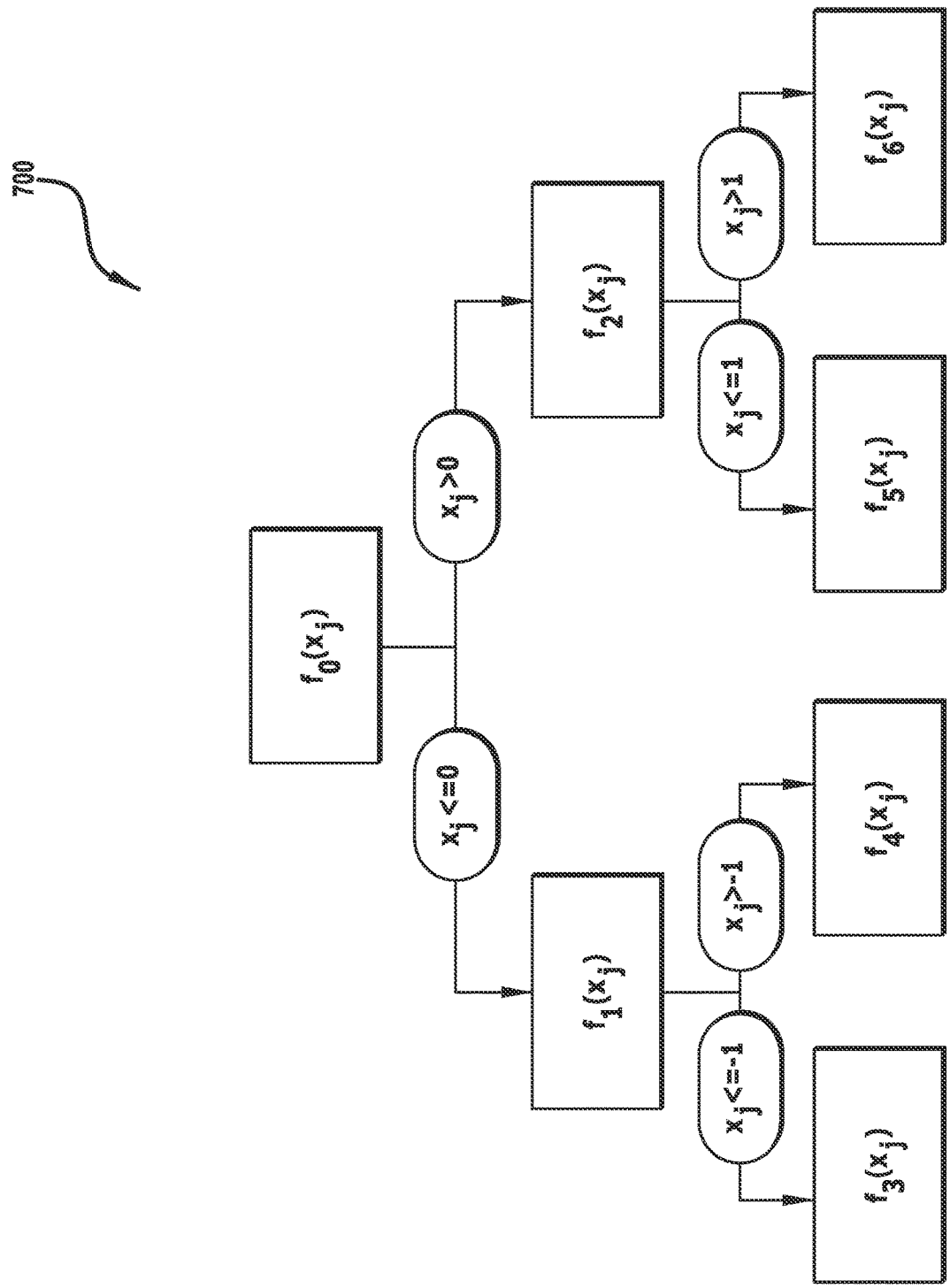
FIG. 7 provides an operational example of a main-effect tree data object in accordance with various embodiments of the present invention.

In some embodiments, a main-effect tree data object is a tree data object whose splits correspond to subranges of a particular splitting feature and whose nodes correspond to linear functions, where the inputs of each linear function include an input feature corresponding to the particular splitting feature. In some embodiments, each linear function of the main-effect tree data object is a function that generates a value that corresponds to a predicted output of the pseudo-response element for a particular input data object given a set of inputs for the particular input data object that comprise the splitting feature value for the particular input data object. For example, if the splitting feature for a main-effect tree data object is an age feature, then branches of the main-effect tree data object may correspond to age splits, and the nodes of the main-effect tree data object may generate predicted pseudo-response element output values for prediction input data objects based on age values associated with the prediction input data objects. An operational example of a main-effect tree data object 700 that is associated with the splitting feature $x_j$ is depicted in FIG. 7.

Returning now to FIG. 5, as shown by operation 510, the apparatus 200 includes means, such as processor 202, memory 204, communications hardware 206, training circuitry 208, or the like, for generating a current validation loss measure for the candidate iterative prediction model.

In some embodiments, performing operation 510 comprises performing operations of the pseudocode segment 605 of the main-effect gradient boosting routine pseudocode 600 of FIG. 6. As depicted in FIG. 6, the pseudocode segment 605 comprises generating the current validation loss measure $L_m$. In some embodiments, the current validation loss measure for the candidate iterative prediction model is generated based on distance measure between inferred predictions for a selected sample of training input data objects as generated based on the candidate iterative prediction model and response values for the sampled training input data objects as indicated by the response features values of the training data for the GAMI-Tree model.

As shown by operation 512, the apparatus 200 includes means, such as processor 202, memory 204, communications hardware 206, training circuitry 208, or the like, for determining whether the current validation loss measure satisfies a threshold. In particular, the training circuitry 208 determines whether the current validation loss measure satisfies (e.g., exceeds or is equal) a threshold validation loss measure that is determined based on (e.g., is equal to) a historical validation loss measure. In some embodiments, the historical validation loss measure is the validation loss measure for a candidate iterative predictive iteration model that was generated by a particular prior main-effect gradient boosting iteration and/or a mean of the validation loss measures for candidate iterative predictive iteration models that were generated by a set of particular prior main-effect gradient boosting iterations.

In some embodiments, performing operation 512 comprises performing operations of the pseudocode segment 606 of the main-effect gradient boosting routine pseudocode 600 of FIG. 6. As depicted in FIG. 6, the pseudocode segment 606 comprises determining whether there has been an improvement in the current validation loss measure across the last d iterations.

In an instance the current validation loss measure satisfies the threshold, the operation flow proceeds to operation 512. As shown by operation 512, the apparatus 200 includes means, such as processor 202, memory 204, communications hardware 206, training circuitry 208, or the like, for updating the iterative prediction model based on the candidate iterative prediction model. In particular, the training circuitry 208 updates the iterative prediction model based on (e.g., to reflect) the candidate iterative prediction model.

In an instance the current validation loss measure fails to satisfy the thresholds, the operation flow proceeds to operation 512. As shown by operation 512, the apparatus 200 includes means, such as processor 202, memory 204, communications hardware 206, training circuitry 208, or the like, for updating the iterative prediction model based on a historical iterative prediction model. In particular, the training circuitry 208 updates the iterative prediction model based on (e.g., to reflect) the historical iterative prediction model.

In some embodiments, performing operations 514-516 comprise performing operations of the pseudocode segment 607 of the main-effect gradient boosting routine pseudocode 600 of FIG. 6.

To elaborate more clearly on the operations described in FIG. 6 and the operations described above with reference to FIG. 5, consider that M is indicative of the maximum number of boosting iterations, $g_0(x)$ is the initial value of $g(x)$. For each main-effect gradient boosting iteration m, $1 \leq m \leq M$, a new model based candidate main-effect tree data object (multiplied by a learning rate hyperparameter A) is added to the current model $g_{m-1}(x)$. Following the approach in xgboost, an interaction-effect Taylor series expansion may be applied to the loss function at each iteration to get:

$$\ell\left(y, g_{m-1} + T_m^{(1)}\right) \approx \ell(y, g_{m-1}) + \frac{\delta \ell(y, g_{m-1})}{\delta g_{m-1}} T_m^{(1)} + \frac{1}{2} \frac{\delta^2 \ell(y, g_{m-1})}{\delta g_{m-1}^2} \left[T_m^{(1)}\right]^2$$

where $T_m^{(1)}$ is the main-effect tree data object.

For the i-th response, a main-effect derivative loss element $G_{i,m-1}$ and interaction-effect derivative loss element $H_{i,m-1}$ may be defined as:

$$G_{i,m-1} = \frac{\delta \ell(y_i, g_{m-1})}{\delta g_{m-1}}$$

and $$H_{i,m-1} = \frac{\delta^2 \ell(y_i, g_{m-1})}{\delta g_{m-1}^2}.$$

The total loss L may then be approximated as $$L \approx \frac{1}{n}\sum_{i=1}^n \ell(y_i, g_{m-1}(x_i)) + \frac{1}{n}\sum_{i=1}^n G_{i,m-1} T_m^{(1)}(x_i) + \frac{1}{2n}\sum_{i=1}^n H_{i,m-1}\left[T_m^{(1)}(x_i)\right]^2.$$

Here, $T_m^{(1)}(x_i)$ is the main-effect tree data object for the given i-th input. Minimizing the approximate loss is equivalent to solving a least square problem $$\min_{T_m} \sum_{i=1}^n H_{i,m-1}\left(T_m^{(1)}(x_i) + \frac{G_{i,m-1}}{H_{i,m-1}}\right)^2.$$

As described above, the pseudo-response element $z_{i,m}$ is defined as $$z_{i,m} = \frac{-G_{i,m-1}}{H_{i,m-1}}$$

and $H_{i,m-1}$ as the weights, allows the SSE to be expressed as $$SSE(T_m^{(1)}) = \sum_{i=1}^n H_{i,m-1}(z_{i,m} - T_m^{(1)}(x_i))^2.$$

This process is repeated M times by fitting a next candidate prediction model iteration of the main-effect tree data object to the pseudo-response element $z_{i,m}$ and determining a loss validation measure. In an instance an iterative prediction model satisfies a threshold (e.g., performs better than a previous best historical validation loss measure), the training circuitry 208 updates the iterative prediction model to reflect the current candidate iterative prediction model. As such, the top performing candidate iterative prediction model is selected.

Figure 8:
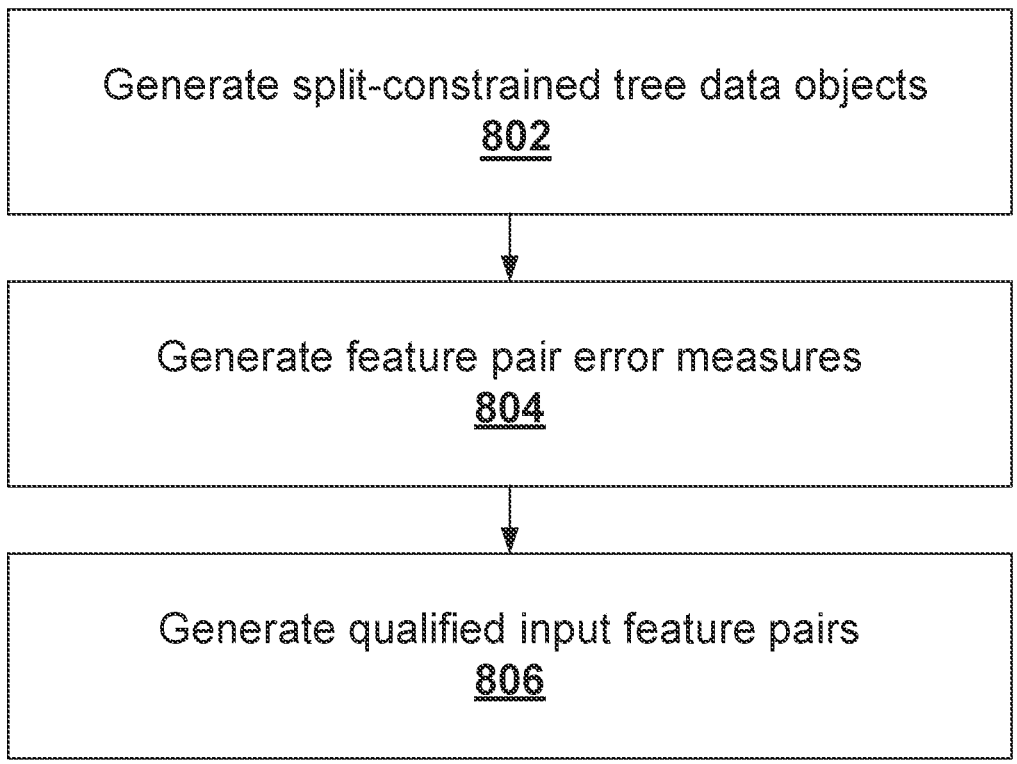
FIG. 8 is a flowchart diagram of an example process for performing operations of a qualified input feature pair selection routine during a current model training iteration for training a GAMI-Tree model in accordance with various embodiments of the present invention.

As described above in FIG. 3, in some embodiments, performing the model training iterations at operation 302 comprises, during each current model training iteration, performing the qualified input feature pair selection routine to select a qualified subset of the defined input feature pairs for the two-order tree-based machine learning model. In some embodiments, performing operations of the qualified input feature pair selection routine during the current mode training iteration is performed in accordance with the process that is depicted in FIG. 8.

As shown by operation 802, the apparatus 200 includes means, such as processor 202, memory 204, communications hardware 206, training circuitry 208, or the like, for generating split-constrained tree data objects. In particular, the training circuitry 208 may be configured to generate, for each defined input feature pair that comprises two input features of the feature space of the GAMI-Tree model: (i) a first split-constrained tree data object that has the first input feature in the defined input feature pair as the splitting feature and the second input feature in the defined input feature pair as the modeling feature, and (ii) a second split-constrained tree data object that has the second input feature in the defined input feature pair as the splitting feature and the first input feature in the defined input feature pair as the modeling feature.

In some embodiments, performing operation 802 comprises performing operations of the pseudocode segment 901 of the qualified input feature pair selection routine pseudocode 900 of FIG. 9. As depicted in FIG. 9, the pseudocode segment 901 comprises generating a first split-constrained tree data object $T^{(2)}(x_j, x_k)$ and a second split-constrained tree data object $T^{(2)}(x_k, x_j)$. In some embodiments, the tree depths of the two split-constrained tree data object is constrained by a maximum depth value, such as a maximum depth value of two. In some embodiments, each split-constrained tree data object has a maximum depth of two and uses linear B-splines with five knots including two boundary knots to transform modeling features.

As shown by operation 804, the apparatus 200 includes means, such as processor 202, memory 204, communications hardware 206, training circuitry 208, or the like, for generating feature pair error measures. In particular, the training circuitry 208 may be configured to generate, for each defined input feature pair, a feature pair error measure based on the lesser of: (i) a first tree-wise error measure for the first split-constrained tree data object that is associated with the particular input feature pair, and (ii) a second tree-wise error measure for the second split-constrained tree data object that is associated with the particular input feature pair In some embodiments, performing operation 804 comprises performing operations of the pseudocode segment 902 of the qualified input feature pair selection routine pseudocode 900 of FIG. 9. As depicted in FIG. 9, the pseudocode segment 902 comprises generating, for a defined input feature pair $(x_j, x_k)$, the minimum of the first tree-wise error measure for the first split-constrained tree data object that is associated with the particular input feature pair (i.e., the first tree-wise error measure $SSE_{jk}$) and the second tree-wise error measure for the second split-constrained tree data object that is associated with the particular input feature pair (i.e., the second tree-wise error measure $SSE_{kj}$).

As shown by operation 806, the apparatus 200 includes means, such as processor 202, memory 204, communications hardware 206, training circuitry 208, or the like, for generating qualified input feature pairs. In particular, the training circuitry 208 may select the qualified input feature pairs based on each feature pair error measure. In some embodiments, to generate the qualified input feature pairs, the training circuitry 208 selects the top q of the defined input feature pairs that have the lowest q of the feature pair error measures, and then includes both orderings of each selected defined input feature pair among the qualified input feature pairs.

In some embodiments, performing operation 806 comprises performing operations of the pseudocode segment 903 of the qualified input feature pair selection routine pseudocode 900 of FIG. 9. As depicted in FIG. 9, the pseudocode segment 903 comprises selecting the top q defined input feature pairs based on a list of defined input feature pairs as ranked in a descending manner based on respective feature pair error measures, and then including both orderings of each selected input feature pair among the set of qualified input feature pairs, or the set Q.

As described above, in some embodiments, performing the model training iterations at operation 302 comprises, during each current model training iteration, generating a required number of interaction-effect gradient boosting iterations. In some embodiments, performing the operations of an mth interaction-effect gradient boosting routine comprises performing the operations of the process of FIG. 10.

Figure 10:
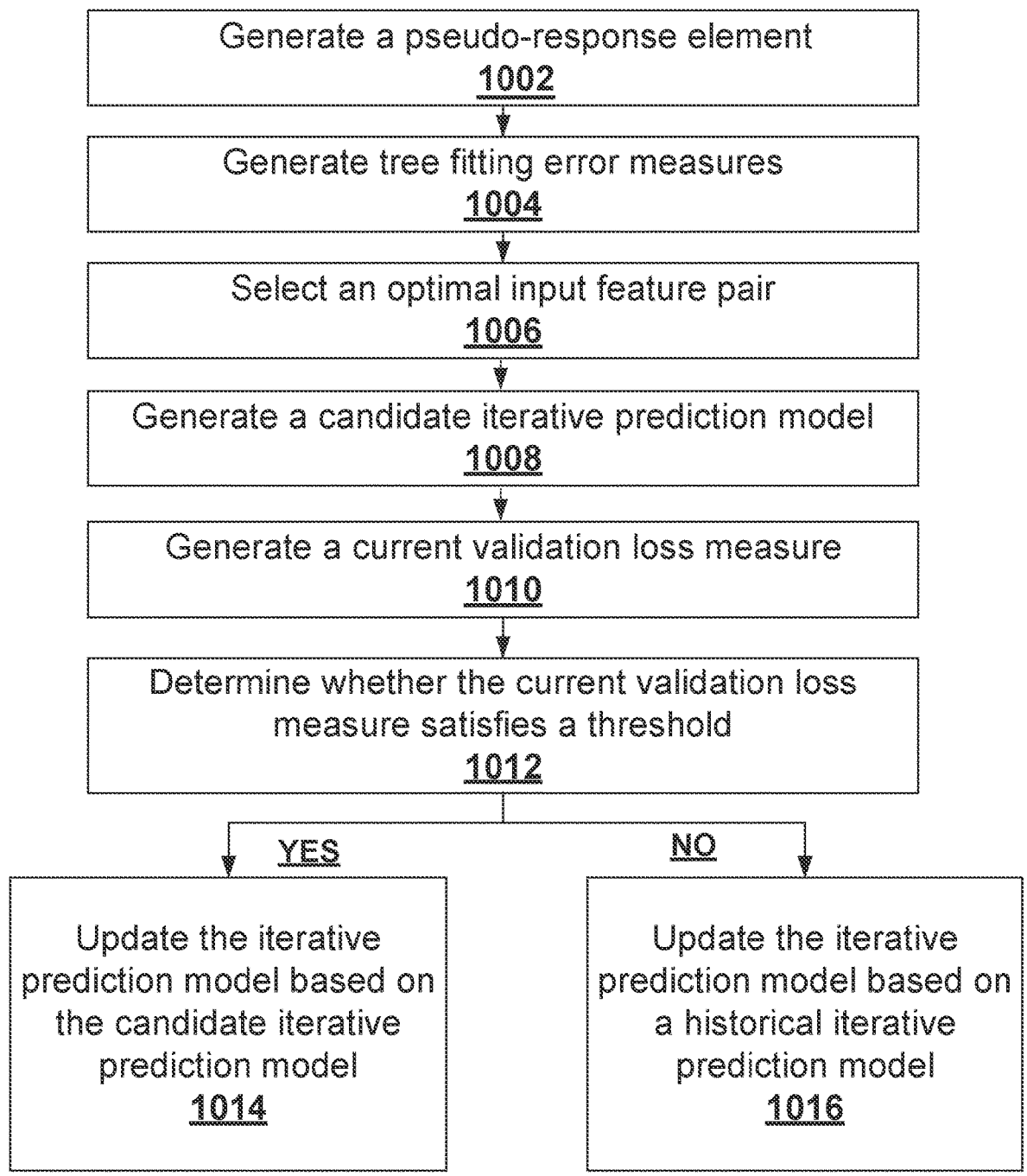
FIG. 10 is a flowchart diagram of an example process for performing operations of a interaction-effect gradient boosting routine during a current model training iteration for training a GAMI-Tree model in accordance with various embodiments of the present invention.

As shown by operation 1002 of FIG. 10, the apparatus 200 includes means, such as processor 202, memory 204, communications hardware 206, training circuitry 208, or the like, for generating a pseudo-response element.

In some embodiments, performing the operation 1002 comprises performing operations of the pseudocode segment 1101 of the interaction-effect gradient boosting routine pseudocode 1100 of FIG. 11. As depicted in FIG. 11, the pseudocode segment 1101 comprises generating the pseudo-response element $z_{i,m}$ as a ratio of a negation of a main-effect derivative loss element $G_{i,m-1}$ and a interaction-effect derivative loss element $H_{i,m-1}$. In some embodiments, the main-effect derivative loss element and the interaction-effect derivative loss element are respective main-effect and interaction-effect derivatives of an underlying loss model that is determined based on a distance measure between inferred predictions for training input data objects as generated based on a latest-updated iterative prediction model and response values for the training input data objects as indicated by the response features values of the training data for the GAMI-Tree model.

As shown by operation 1004 of FIG. 10, the apparatus 200 includes means, such as processor 202, memory 204, communications hardware 206, training circuitry 208, or the like, for generating tree fitting error measures. In particular, the training circuitry 208 generates a tree fitting error measure for each qualified input feature pair in the set of qualified input feature pairs. To do so, the training circuitry 208 may first, for each qualified input feature pair, generate a interaction-effect tree data object that is generated to predict the pseudo-response element using one input feature in the qualified input feature pair as the splitting feature and the second input feature pair in the qualified input feature pair as the modeling feature, and then generate the tree fitting error measure for the qualified input feature based on a distance measure between inferred predictions for training input data objects as generated based on the noted interaction-effect tree data object and response values for the training input data objects as indicated by the response features values of the training data for the GAMI-Tree model.

In some embodiments, performing operation 1002 comprises performing operations of the pseudocode segment 1102 of the interaction-effect gradient boosting routine pseudocode 1100 of FIG. 11. As depicted in FIG. 11, the pseudocode segment 1102 comprises fitting a tree to the pseudo-response element $z_{i,m}$—using each qualified input feature pair $(x_j, x_k)$, determining a SSE measurement while using the interaction-effect derivative loss element $H_{i,m-1}$ as the weights of the SSE measurement, and then using the optimal SSE measure for the optimal tree data object for the qualified input feature pair $(x_j, x_k)$ as the tree fitting error measure for the qualified input feature pair $(x_j, x_k)$.

As shown by operation 1006 of FIG. 10, the apparatus 200 includes means, such as processor 202, memory 204, communications hardware 206, training circuitry 208, or the like, for selecting an optimal input feature pair. In particular, the training circuitry 208 may select an optimal qualified input feature pair of the set of qualified input feature pairs (e.g., the set Q in the operational example of FIG. 11). In some embodiments, the training circuitry 208 selects the qualified input feature pair that has the minimal tree fitting error measure as the optimal qualified input feature pair.

In some embodiments, performing operation 1006 comprises performing operations of the pseudocode segment 1103 of the interaction-effect gradient boosting routine pseudocode 1100 of FIG. 11. As depicted in FIG. 11, the pseudocode segment 1103 comprises selecting the qualified input feature that minimizes the SSE measure as the optimal qualified input feature pair or j* and k*.

As shown by operation 1008 of FIG. 10, the apparatus 200 includes means, such as processor 202, memory 204, communications hardware 206, training circuitry 208, or the like, for generating a candidate iterative prediction model. In some embodiments, the training circuitry 208 generates a candidate iterative prediction model based on the latest-updated iterative prediction model and the interaction-effect tree data object for the optimal qualified input feature pair.

In some embodiments, performing operation 1008 comprises performing operations of the pseudocode segment 1104 of the interaction-effect gradient boosting routine pseudocode 1100 of FIG. 11. As depicted in FIG. 11, the pseudocode segment 1104 comprises generating the candidate iterative prediction model $g_m(x)$ based on the output of the addition of the latest-updated iterative prediction model $g_{m-1}(x)$ and the application of a learning rate hyperparameter $\lambda$ to the interaction-effect tree data object for the optimal qualified input feature pair j* and k*, i.e., to $T^2_m(x_j^*, x_k^*)$.

Figure 12:
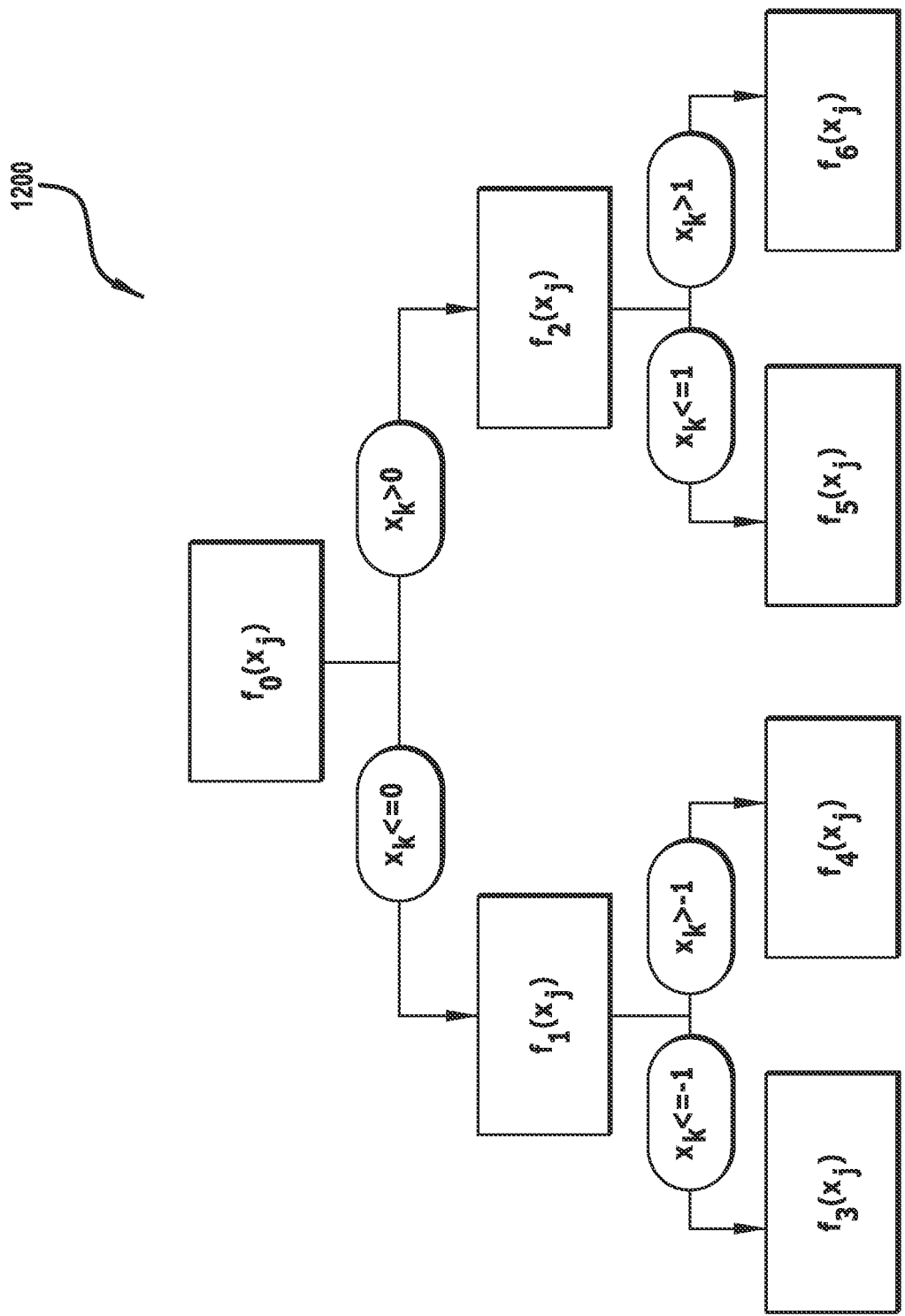
FIG. 12 provides an operational example of a interaction-effect tree data object in accordance with various embodiments of the present invention.

In some embodiments, a interaction-effect tree data object is a tree data object whose splits correspond to subranges of a particular splitting feature and whose nodes correspond to linear functions, where the inputs of each linear function include an input feature corresponding to a particular modeling feature. In some embodiments, each linear function of the interaction-effect tree data object is a function that generates a value that corresponds to a pseudo-response element for a particular input data object given a set of inputs for the particular input data object that comprise the modeling feature value for the particular input data object. For example, if the splitting feature for a interaction-effect tree data object is an age feature, and the modeling feature for the noted interaction-effect tree data object is a credit score feature, then branches of the interaction-effect tree data object may correspond to age splits, and the nodes of the interaction-effect tree data object may generate predicted pseudo-response element output values for prediction input data objects based on credit risk values associated with the prediction input data objects. An operational example of a interaction-effect tree data object 1200 that is associated with the splitting feature $x_k$ and the modeling feature $x_j$ is depicted in FIG. 12.

As shown by operation 1010 of FIG. 10, the apparatus 200 includes means, such as processor 202, memory 204, communications hardware 206, training circuitry 208, or the like, for generating a current validation loss measure for the candidate iterative prediction model.

In some embodiments, performing operation 1010 comprises performing operations of the pseudocode segment 1105 of the interaction-effect gradient boosting routine pseudocode 1100 of FIG. 11. As depicted in FIG. 11, the pseudocode segment 1105 comprises generating the current validation loss measure $L_m$. As depicted in FIG. 11, in some embodiments, the current validation loss measure for the candidate iterative prediction model is generated based on distance measure between inferred predictions for a selected sample of training input data objects as generated based on the candidate iterative prediction model and response values for the sampled training input data objects as indicated by the response features values of the training data for the GAMI-Tree model.

As shown by operation 1012 of FIG. 10, the apparatus 200 includes means, such as processor 202, memory 204, communications hardware 206, training circuitry 208, or the like, for determining whether the current validation loss measure satisfies a threshold. In particular, the training circuitry 208 determines whether the current validation loss measure satisfies (e.g., exceeds or is equal) a threshold validation loss measure that is determined based on (e.g., is equal to) a historical validation loss measure. In some embodiments, the historical validation loss measure is the validation loss measure for a candidate iterative predictive iteration model that was generated by a particular prior interaction-effect gradient boosting iteration and/or a mean of the validation loss measures for candidate iterative predictive iteration models that were generated by a set of particular prior interaction-effect gradient boosting iterations.

In some embodiments, performing operation 1012 comprises performing operations of the pseudocode segment 1106 of the interaction-effect gradient boosting routine pseudocode 1100 of FIG. 11. As depicted in FIG. 11, the pseudocode segment 1106 comprises determining whether there has been an improvement in the current validation loss measure across the last d iterations.

In an instance the current validation loss measure satisfies the threshold, the process proceeds to operation 1014. As shown by operation 1012, the apparatus 200 includes means, such as processor 202, memory 204, communications hardware 206, training circuitry 208, or the like, for updating the iterative prediction model based on the candidate iterative prediction model.

In an instance the current validation loss measure fails to satisfy the threshold, the process proceeds to operation 1016. As shown by operation 1012 of FIG. 10, the apparatus 200 includes means, such as processor 202, memory 204, communications hardware 206, training circuitry 208, or the like, for updating the iterative prediction model based on a historical iterative prediction model. In particular, in response to determining that the current validation loss measure fails to satisfy the threshold validation loss measure, the training circuitry 208 updates the iterative prediction model based on (e.g., to reflect) the historical iterative prediction model.

In some embodiments, performing operations 1014-1016 comprises performing operations of the pseudocode segment 1107 of the interaction-effect gradient boosting routine pseudocode 1100 of FIG. 11.

To elaborate more clearly on the operations described in FIG. 11 and the operations described above with reference to FIG. 10, consider that M is indicative of the maximum number of boosting iterations, $g_0(x)$ is the initial value of $g(x)$. For each interaction-effect gradient boosting iteration m, $1 \leq m \leq M$, a new model based candidate interaction-effect tree data object (multiplied by a learning rate hyperparameter A) is added to the current model $g_{m-1}(x)$. Following the approach in xgboost, a interaction-effect Taylor series expansion may be applied to the loss function at each iteration to get:

$$\ell(y, g_{m-1} + T_m^{(2)}) \approx \ell(y, g_{m-1}) + \frac{\delta \ell(y, g_{m-1})}{\delta g_{m-1}} T_m^{(2)} + \frac{1}{2} \frac{\delta^2 \ell(y, g_{m-1})}{\delta g_{m-1}^2} [T_m^{(2)}]^2$$

where $T_m^{(2)}$ is the interaction-effect interaction-effect tree data object.

For the i-th response, a main-effect derivative loss element $G_{i,m-1}$ and interaction-effect derivative loss element $H_{i,m-1}$ may be defined as:

$$G_{i,m-1} = \frac{\delta \ell(y_i, g_{m-1})}{\delta g_{m-1}}$$

and $$H_{i,m-1} = \frac{\delta^2 \ell(y_i, g_{m-1})}{\delta g_{m-1}^2}.$$

The total loss L may then be approximated as $$L \approx \frac{1}{n} \sum_{i=1}^{n} \ell(y_i, g_{m-1}(x_i)) + \frac{1}{n} \sum_{i=1}^{n} G_{i,m-1} T_m^{(2)}(x_i) + \frac{1}{2n} \sum_{i=1}^{n} H_{i,m-1} [T_m^{(2)}(x_i)]^2.$$

Here, $T_m^{(2)}(x_i)$ is the interaction-effect tree data object for the given i-th input. Minimizing the approximate loss is equivalent to solving a least square problem $$\min_{T_m} \sum_{i=1}^{n} H_{i,m-1} \left( T_m^{(2)}(x_i) + \frac{G_{i,m-1}}{H_{i,m-1}} \right)^2.$$

As described above, the pseudo-response element $z_{i,m}$ is defined as $$z_{i,m} = \frac{-G_{i,m-1}}{H_{i,m-1}}$$

and $H_{i,m-1}$ as the weights, allows the SSE to be expressed as
$$SSE(T_m^{(2)}) = \Sigma_{i=1}^{n} H_{i,m-1}(z_{i,m} - T_m^{(2)}(x_j, x_k))^2.$$

This process is repeated M times by fitting a next candidate prediction model iteration of the interaction-effect tree data object to the pseudo-response element $z_{i,m}$, and determining a loss validation measure. In an instance an iterative prediction model satisfies a threshold (e.g., performs better than a previous best historical validation loss measure), the training circuitry 208 updates the iterative prediction model to reflect the current candidate iterative prediction model. As such, the top performing candidate iterative prediction model is selected.

Returning now to FIG. 3, as shown by operation 302 of FIG. 3, the apparatus 200 includes means, such as processor 202, memory 204, communications hardware 206, training circuitry 208, or the like, for generating a GAMI-Tree model. In particular, the training circuitry 208 generates the GAMI-Tree model based on the updated iterative prediction model that is generated by a final interaction-effect gradient boosting iteration of a final model training iteration.

As described above, in some embodiments, the updated iterative prediction model generated by the final interaction-effect gradient boosting iteration of the final model training iteration may comprise contributions of all generated optimal main-effect tree data objects and interaction-effect tree data objects generated via various model training iterations, which makes this model a very powerful tool for performing predictive data analysis operations. Moreover, because the GAMI-Tree model is a tree-based model, the splitting logic of its corresponding trees provides a powerful tool for generating and providing explanatory metadata for predictive outputs that are generated using the noted GAMI-Tree model.

Figure 13:
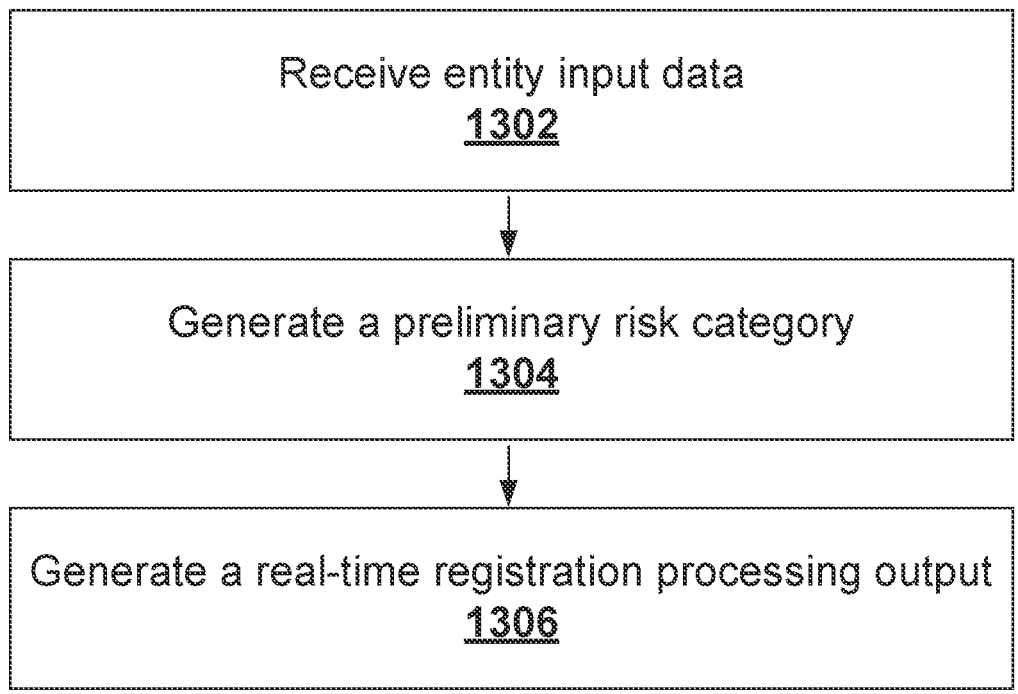
FIG. 13 is a flowchart diagram of an example process generating a real-time registration processing output for an entity, in accordance with various embodiments of the present invention.

Turning now to FIG. 13, an example process for generating a real-time registration processing output for an entity is shown. Via the various operations of the process depicted in FIG. 13, the prediction circuitry 210 can generate a real-time registration processing output for an entity using the generated and trained GAMI-Tree model. By using the GAMI-Tree model, which may be trained as described above with respect to the operations described in FIGS. 3-26, an entity may be accurately categorized in real-time such that an accurate real-time registration processing output may be generated for the entity, which may not have been achievable using conventional methods. These feats are achievable due to the use of improved base learners used in the GAMI-Tree model, which capture interactions more accurately and the novel iterative training method described above, which allows for more accurate convergence as well as an orthogonalization method to ensure the interactions and main effects are hierarchically orthogonal.

As shown by operation 1302 of FIG. 13, the apparatus 200 includes means, such as processor 202, memory 204, communications hardware 206, prediction circuitry 210, or the like, for receiving entity input data. Entity input data may describe data relating to a particular entity, such as an individual, company, and/or the like. The entity input data may also correspond to a particular requested action. By way of example, entity input data may indicate an individual would like to apply for a mortgage and the entity input data may include various values for various input features relating to the individual such as his/her credit score, income, requested loan value, delinquency indicators, requested loan length, and/or the like.

As shown by operation 1304 of FIG. 13, the apparatus 200 includes means, such as processor 202, memory 204, communications hardware 206, prediction circuitry 210, or the like, for generating a preliminary risk category for the entity described by the entity input data. In particular, the prediction circuitry 210 may be configured to access a trained GAMI-Tree model, such as by querying an associated storage (e.g., memory 204 or another storage device) for the GAMI-Tree model. The GAMI-Tree model may be trained according to the operations described above with respect to FIGS. 3, 5, 8, and 10. As such, the GAMI-Tree model may be configured to output a preliminary risk category for the entity described by the entity input data and, in some embodiments, may further be configured to output the top contributing features (e.g., as described by the entity input data) such that the top features that led to the determined preliminary risk category generated for the entity is explained and therefore, the GAMI-Tree model is interpretable.

In particular, prediction circuitry 210 may be input the entity input data to the GAMI-Tree model, which may be configured to process the entity input data and generate a preliminary risk category for the entity. A preliminary risk category may be indicative of an inferred risk associated with performing the requested action for the entity. A preliminary risk category may include a high-risk preliminary category, a medium-risk preliminary category, and a low-risk preliminary category, for example. By way of continuing example, an individual with a low credit score and high loan to value (ltv) amount may be determined to correspond to a high preliminary risk category by the GAMI-Tree model. As another example, an individual with a high credit score and low loan to value (ltv) amount may be determined to correspond to a low preliminary risk category by the GAMI-Tree model.

As shown by operation 1306 of FIG. 13, the apparatus 200 includes means, such as processor 202, memory 204, communications hardware 206, prediction circuitry 210, or the like, for generating a real-time registration processing output. The prediction circuitry 210 may be configured to generate a real-time registration processing output based on the preliminary risk category generated for the entity. In particular, each preliminary risk category may be associated with a particular set of registration processing outputs which the prediction circuitry 210 may generate. The prediction circuitry 210 may then generate the set of registration processing outputs and provide the registration processing outputs to one or more user devices, such as a user device associated with an entity, a financial institution employee, or the like and may do so in substantially real-time.

By way of continuing example, a high preliminary risk category may be associated with a set of registration processing outputs which are configured to output a denial of the requested mortgage as well as the reasons why the mortgage was denied. The reasons why the mortgage was denied may be determined based on the GAMI-Tree output which indicates the top contributing features which led to the decision for the mortgage denial. As described above, the relative importance of features considered by the GAMI-Tree model when generating the preliminary risk category for the entity may inferred and the GAMI-Tree model may be configured to output these features. As such, the entity and one or more other end users (e.g., financial institution employees, government regulatory personnel, etc.) may view the output in substantially real-time and be informed of the reasons and causes for the denial.

By way of continuing example, a low preliminary risk category may be associated with a set of registration processing outputs which are configured to output an approval of the requested mortgage. In the instance the registration processing output includes an approval of a requested mortgage (e.g., or other requested action), the processing output may include a set of fields, forms, instructions, or the like for one or more users (e.g., the individual associated with the mortgage application, one or more financial institution employees, etc.) to complete.

FIGS. 3, 5, 8, 10, and 13 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

EXAMPLES

Example 1

As an illustrative example to depict the advantages of the GAMI-Tree model over other conventional models, several simulations were performed using the GAMI-Tree model, an xgboost model, a GAMI-Net, an EBM, and a non-iterative tree-based machine learning model. Here, the non-iterative tree-based machine learning model is just a single iteration/round of the GAMI-Tree model, to better showcase the benefit of iterating between a main-effect stage and an interaction stage (e.g., via the interaction-effect gradient boosting routine for the interaction effects fitting).

Four models were considered during the simulations as outlined below:

TABLE 1

Model Setup

Model 1 $g(x) = \Sigma_{j=1}^5 x_j + \Sigma_{j=6}^8 0.5x_j^2 + \Sigma_{j=9}^{10} x_j(x_j > 0) + \Sigma_{j=1}^{10} \Sigma_{k=j+1}^{10} 0.2 x_j x_k$ Model 2 $g(x) = \sum_{j=1}^{5} x_j + \sum_{j=6}^{8} 0.5 x_j^2 + \sum_{j=9}^{10} x_j(x_j > 0) + 0.25 x_1 x_2 +$
$0.25 x_1 x_3^2 + 0.25 x_4^2 x_5^2 + \exp\left(\frac{x_4 x_6}{3}\right) + x_5 x_6 (x_5 > 0)(x_6 > 0) +$
$\text{clip}(x_7 + x_8, -1, 0) + \text{clip}(x_7 x_9, -1, 1) + (x_8 > 0)(x_9 > 0)$ TABLE 1-continued Model Setup Where clip(x, a, b) is the cap and floor function where the value of x caps at value b and floors at a Model 3 $g(x) = \sum_{j=1}^{5} x_j + \sum_{j=6}^{8} 0.5 x_j^2 + \sum_{j=9}^{10} x_j(x_j > 0) +$
$0.25 x_1^2 x_2^2 + 2(x_3 - 0.5)_+ (x_4 - 0.5)_+ + 0.5 \sin(\pi x_5)$
$\sin(\pi x_6) + 0.5 \sin(\pi(x_7 + x_8))$ Model 4 $g(x) = \sum_{j=1}^{5} x_j + \sum_{j=6}^{8} 0.5 x_j^2 +$
$\sum_{j=9}^{10} x_j(x_j > 0) + x_1 x_2 + x_2 x_3 +$
$0.5 x_1 x_2 x_3 + x_4 x_5 + x_4 x_6 + x_5 x_6 + 0.5(x_4 > 0) x_5 x_6$ Here, model 1 contains a total of 45 interactions. For model 2, eight different forms of interactions are considered. For model 3, oscillating sine functions are included, which is difficult to capture by a 4-quadrant approximation used in FAST (e.g., as used in EBM). Model 4 contains two 3-way interactions, which are included to assess the performance of the GA2M models (e.g., as used in EBM and GAMI-Net). In practice, they will capture only the projection of 3-order interactions into one and two-dimensions.

For each model form, 20 features (e.g., $x_1$ through $x_{20}$) were simulated from multivariate Gaussian distribution with a mean of 0, variance 1, and equal correlation ρ. Only the first 10 features (e.g., $x_1$ through $x_{10}$) were used in the model and the reset are not part of the model, although they will be relevant when the equal correlation ρ is greater than 0 (e.g., redundant features). Then 10 additional features (e.g., $x_{21}$ through $x_{30}$) were simulated and independent of the first 20 features (e.g., irrelevant features). These 10 additional features were also simulated from multivariate Gaussian distribution with a mean of 0, variance 1, and equal correlation ρ. As such, 30 features were simulated in total. To avoid potential outliers in x from being too influential, all features were truncated to be within the interval [−2.5, 2.5].

The response was simulated as y=g(x)+ϵ, where ϵ~N(0, $0.5^2$) for the continuous case and as Bernoulli(p(x)) for the binary case, where $$p(x) = \frac{e^{\beta_0 + g(x)}}{1 + e^{\beta_0 + g(x)}}$$

and the intercept $\beta_0$ was chosen to have balanced classes. Two correlation levels ρ equal to 0 and ρ equal to 0.5 were considered. For each model form and correlation level, data sets were simulated using two different sample sizes (e.g., 50 thousand and 500 thousand). Each dataset was divided into training, validation, and testing sets with 50%, 25%, and 25% sample sizes, respectively. Additionally, the tuning setting are outlined below.

TABLE 2

Model tuning settings

| Model | Tuning setting |
|---|---|
| EBM | Tuned max_bins, max_interaction_bins and learning rate and fix the number of interaction pairs to be 45 for Model 1 and 10 for the other models. Random search was used with a total number of 12 trials |

TABLE 2-continued

Model tuning settings

| Model | Tuning setting |
|---|---|
| GAMI-Tree | Default settings were used as described in example 3 with the only exception being the set npairs as 45 (instead of default 10) for Model 1. |
| Xgboost | Tuned maximum depth and learning rate using grid search and used early stopping for the number of boosting rounds. |
| GAMI-Net | A subnet architecture of 5 layers, each with 40 neurons was used. Number of epochs is set as 200, learning rate is set as 0.0001, batch size is set as 1000, number of interactions is 45 for Model 1 and 10 for the other models, and clarity penalty is set as 0.1. |

The training set and validation set were used to train and tune four models as outlined below in table 3 (e.g., the xgboost model, EBM, GAMI-Net, and GAMI-Tree model). Table 3 further depicts the evaluated predictive performance on the test set.

TABLE 3

Training and testing summary of mean squared error

| | | | xgboost | | GAMI-Net | | EBM | | GAMI-Tree | | GAMI-Tree-1 | |
|---|---|---|---|---|---|---|---|---|---|---|---|---|
| | N | $\rho$ | Train | Test | Train | Test | Train | Test | Train | Test | Train | Test |
| Model 1 | 50K | 0 | 0.170 | 0.480 | 0.244 | 0.279 | 0.187 | 0.318 | 0.234 | 0.288 | 0.236 | 0.287 |
| Model 1 | 50K | 0.5 | 0.346 | 0.629 | 0.244 | 0.287 | 0.604 | 0.900 | 0.243 | 0.317 | 0.502 | 0.609 |
| Model 1 | 500K | 0 | 0.276 | 0.344 | 0.252 | 0.258 | 0.237 | 0.263 | 0.252 | 0.260 | 0.254 | 0.261 |
| Model 1 | 500K | 0.5 | 0.359 | 0.486 | 0.256 | 0.261 | 0.629 | 0.694 | 0.259 | 0.269 | 0.543 | 0.563 |
| Model 2 | 50K | 0 | 0.275 | 0.399 | 0.252 | 0.263 | 0.232 | 0.294 | 0.244 | 0.270 | 0.251 | 0.270 |
| Model 2 | 50K | 0.5 | 0.250 | 0.442 | 0.304 | 0.325 | 0.329 | 0.419 | 0.244 | 0.274 | 0.329 | 0.346 |
| Model 2 | 500K | 0 | 0.270 | 0.303 | 0.253 | 0.255 | 0.250 | 0.260 | 0.256 | 0.257 | 0.257 | 0.258 |
| Model 2 | 500K | 0.5 | 0.313 | 0.346 | 0.305 | 0.308 | 0.339 | 0.354 | 0.256 | 0.259 | 0.332 | 0.335 |
| Model 3 | 50K | 0 | 0.270 | 0.441 | 0.432 | 0.455 | 0.225 | 0.314 | 0.259 | 0.277 | 0.261 | 0.277 |
| Model 3 | 50K | 0.5 | 0.293 | 0.445 | 0.447 | 0.467 | 0.410 | 0.501 | 0.255 | 0.283 | 0.268 | 0.289 |
| Model 3 | 500K | 0 | 0.257 | 0.307 | 0.254 | 0.255 | 0.247 | 0.262 | 0.258 | 0.259 | 0.258 | 0.259 |
| Model 3 | 500K | 0.5 | 0.275 | 0.321 | 0.442 | 0.443 | 0.444 | 0.457 | 0.269 | 0.270 | 0.279 | 0.280 |
| Model 4 | 50K | 0 | 0.303 | 0.479 | 0.548 | 0.582 | 0.552 | 0.690 | 0.527 | 0.614 | 0.560 | 0.632 |
| Model 4 | 50K | 0.5 | 0.251 | 0.581 | 0.338 | 0.369 | 0.757 | 1.030 | 0.312 | 0.384 | 0.681 | 0.788 |
| Model 4 | 500K | 0 | 0.294 | 0.321 | 0.548 | 0.555 | 0.538 | 0.571 | 0.548 | 0.560 | 0.556 | 0.566 |
| Model 4 | 500K | 0.5 | 0.319 | 0.384 | 0.332 | 0.334 | 0.722 | 0.768 | 0.328 | 0.337 | 0.684 | 0.700 |

As depicted above, table 3 shows the training and testing mean-squared error (MSE) for all models. From the results, several conclusions may be reached. A first conclusion shows that the GAMI-Tree outperforms xgboost for all cases except for Model 4 when $\rho$ equals 0. This is not surprising because Model 4 has 3-way interactions which are not captured entirely by GA2M models. However, when correlation increases, the 3-way interaction can be better approximated by lower order effects (e.g., in the extreme case when the correlation is 1, it becomes a main effect), and GAMI-Tree outperforms xgboost.

As another conclusion, GAMI-Tree and GAMI-Tree-1 are similar for uncorrelated case, but GAMI-Tree significantly outperforms GAMI-Tree-1 for correlated case except for Model 3, and they both outperform EBM in all cases. This shows for correlated case, the iterative training used in GAMI-Tree helps in model performance.

As another conclusion, GAMI-Tree has similar performance as GAMI-Net in most cases, except for Model 1 with a sample size of 50K, $\rho$ equals 0.5 and Model 2 where $\rho$ equals 0.5, and Model 3. For the first case, GAMI-Net has 10% smaller MSE. This is likely due to neural networks being better at capturing such linear interaction effects and are smoother. As sample size increases to 500K, this advantage becomes marginal. For Model 2 where $\rho$ equals 0.5 and Model 3, the GAMI-Tree outperforms GAMI-Net. This is because the FAST interaction filtering method (e.g., used in both EBM and GAMI-Net) misses some true interactions terms.

As yet another conclusion, GAMI-Net has smaller training and testing MSE gap than all other models. This is known effect in the literature as neural networks are smooth models and overfit less. Among the others, GAMI-Tree overfits less than EBM and xgboost.

The comparisons show that GAMI-Net and GAMI-Tree are comparable except when the FAST interaction filtering misses some interactions. Both models are better than EBM. Xgboost is better only in the three-way interaction case since the other models cannot capture the higher-order term.

Next, the interpretation results among the GA2M models are compared. Starting with the main effect comparison, the 10 true main effect features (e.g., $x_1$ through $x_{10}$) in the model are used. All algorithms capture these 10 features as the 10 most important main features. For the other redundant or irrelevant features, GAMI-Tree and GAMI-Net do the best job in assigning low important to those features for two reasons.

First, in the round-robin training method used in EBM, all features will be used regardless of whether they are truly important or not. However, GAMI-Tree selects only the best feature to model in each iteration, and it stops if model performance stops improving. This means the non-model features will only be used few times in GAMI-Tree. In GAMI-Net, a pruning step is implemented, which keeps only the top k most important terms. Therefore, most non-model features have exactly zero importance.

Second, when the features have correlation, the main-effect stage is more prone to assign importance to correlated, non-model features. However, the iterative training in GAMI-Tree can reverse the false main effects captured in the first round, leading to close-to-zero importance for such redundant features. GAMI-Net has a fine-tune stage where all main-effects and interactions are retrained simultaneously. This has the same effect as iterative training employed in GAMI-Tree.

Figure 14A:
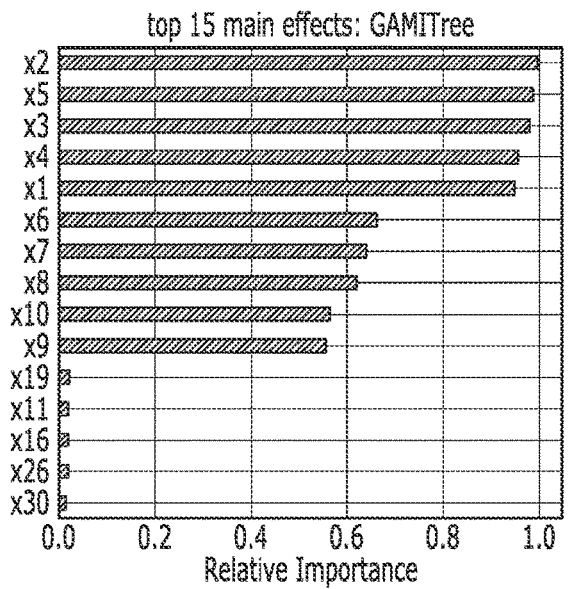
FIGS. 14A, 14B, and 14C provide operational examples of the main-effect importance plots for model 4 with population size of 50K and ρ equal to 0 as detailed in example 1.
Figure 14B:
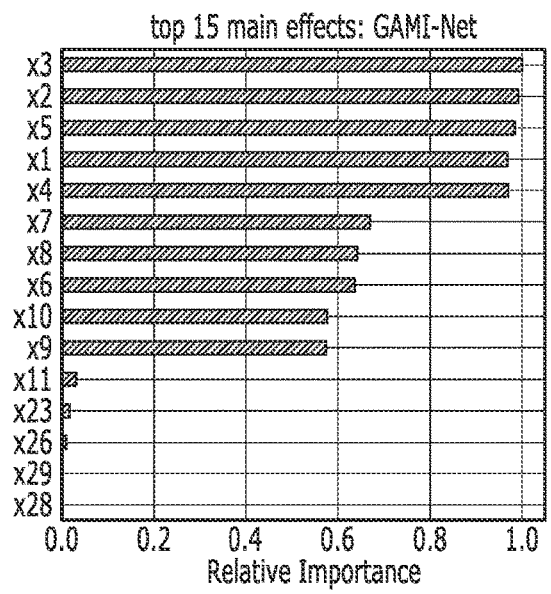
Figure 14C:
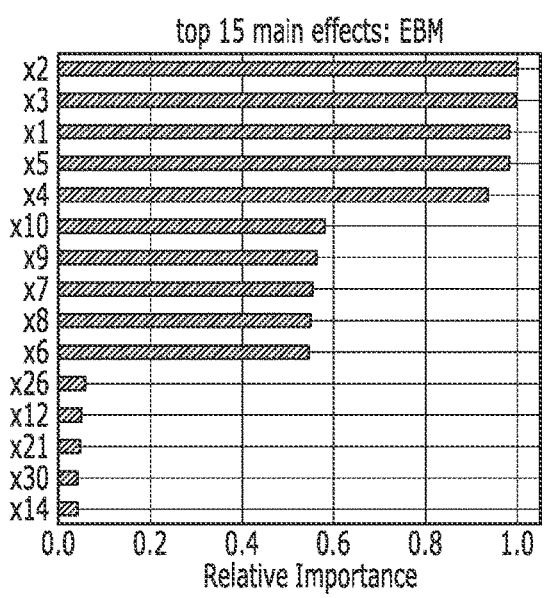
Figure 15A:
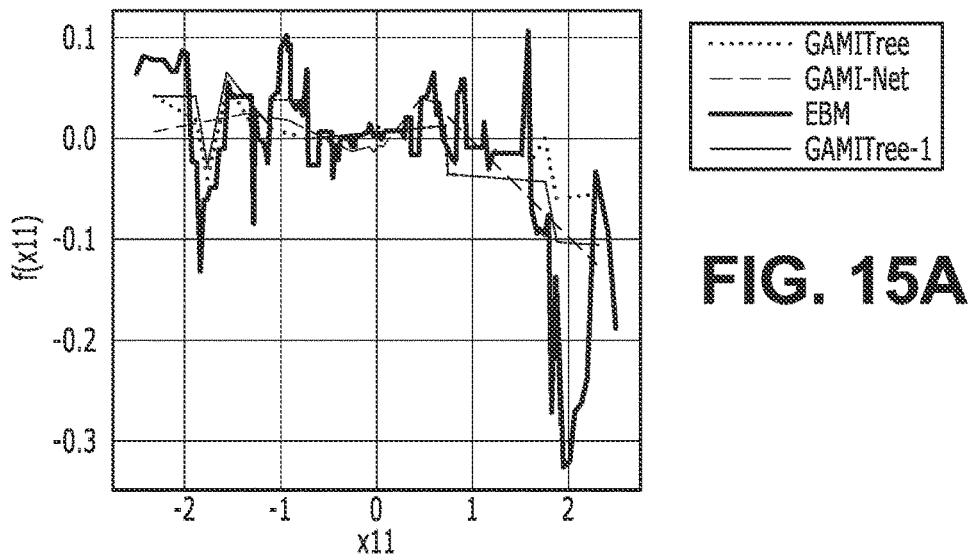
FIGS. 15A, 15B, and 15C provide operational examples of the main-effect plots for non-model features for model 4 with population size of 50K and ρ equal to 0 as detailed in example 1.
Figure 15B:
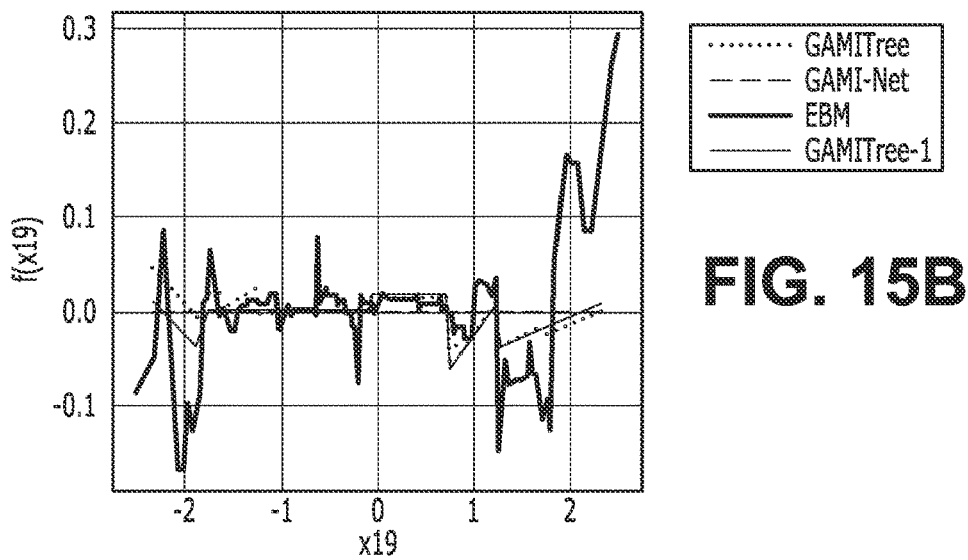
Figure 15C:
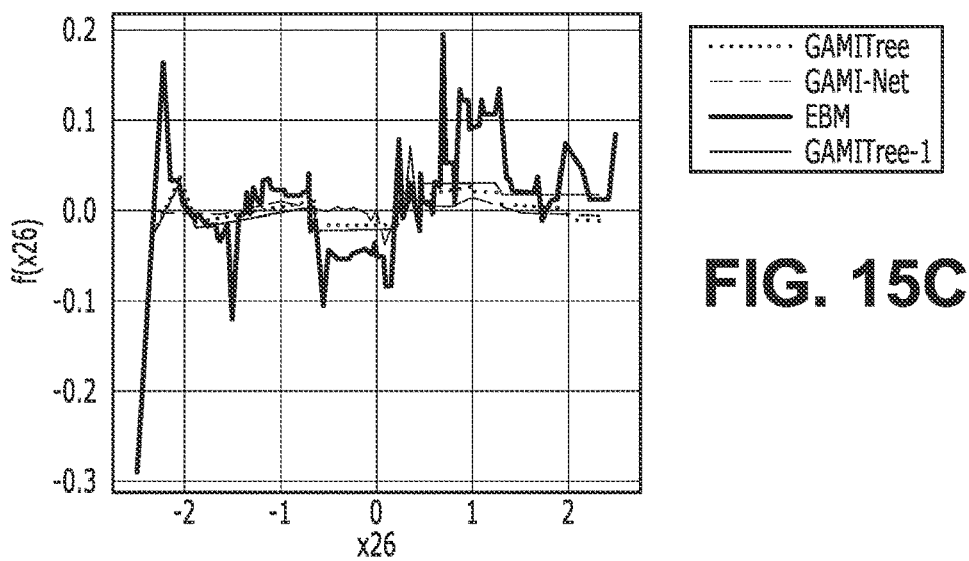

To demonstrate the first point, consider Model 4 with a sample size of 50K and $\rho$ equal to 0. Since correlation is zero, all features except $x_1$ through $x_{10}$ are irrelevant and should receive close to zero importance score. However, as depicted in FIGS. 14A-14C, it is shown that EBM assigns relatively higher importance to those irrelevant features. This is confirmed by the plot of the main effects for the top irrelevant features in FIGS. 15A-15C. Here, EBM is shown to have a larger range than all other methods. Similar behavior has been observed for other models as well.

Figure 16A:
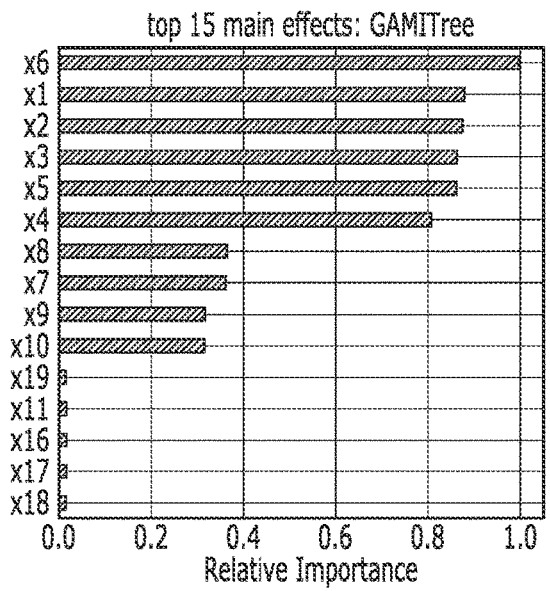
FIGS. 16A, 16B, 16C provide operational examples of the main-effect importance plots for model 4 with population size of 50K and ρ equal to 0.5 as detailed in example 1.
Figure 16B:
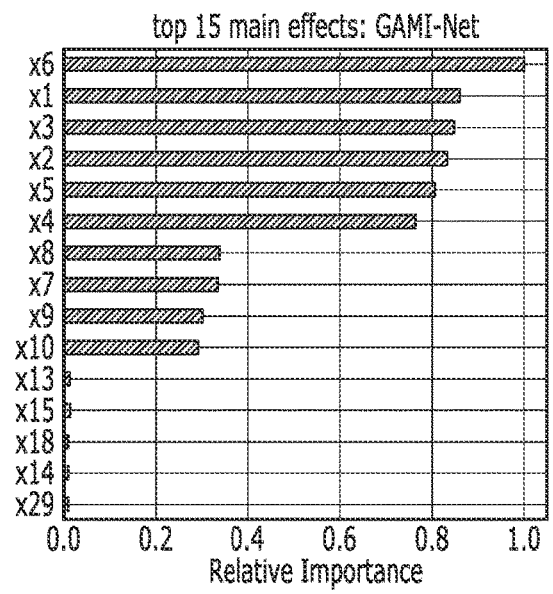
Figure 16C:
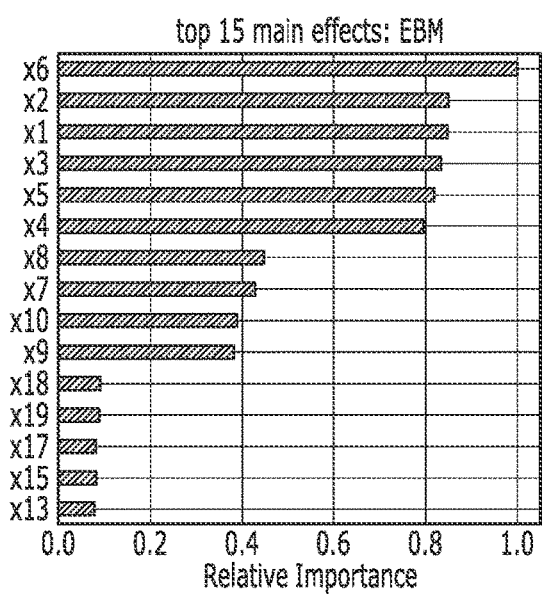
Figure 17A:
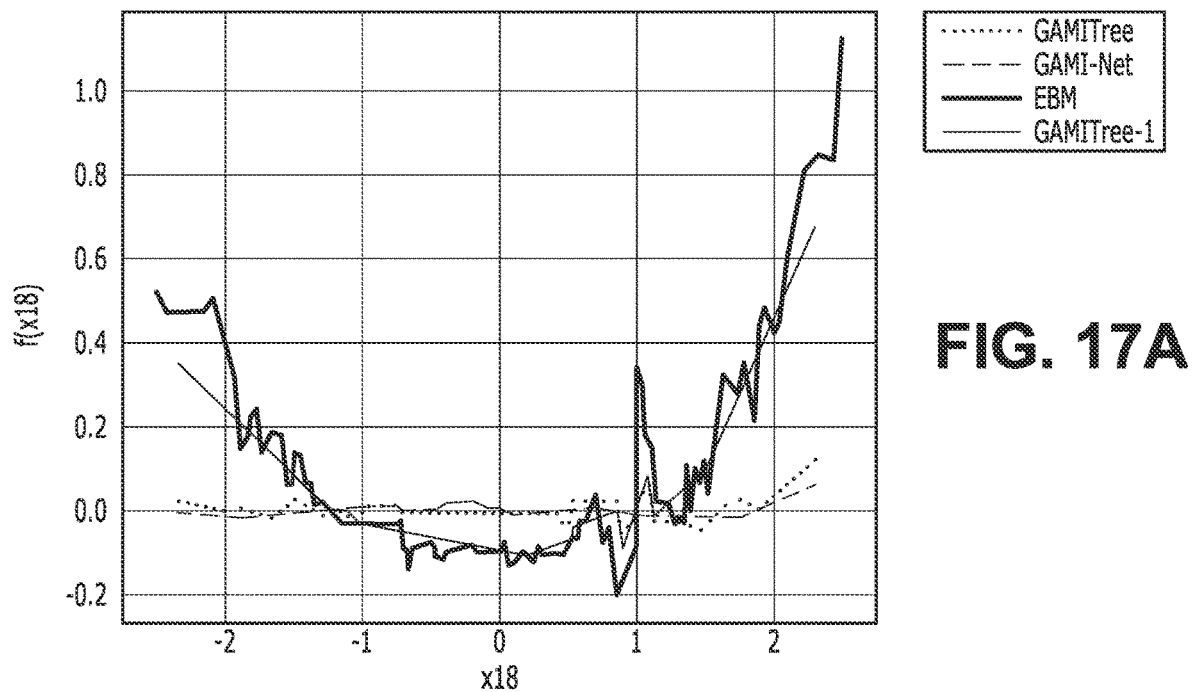
FIGS. 17A and 17B provide operational examples of the main-effect plots for non-model features for model 4 with population size of 50K and ρ equal to 0.5 as detailed in example 1.
Figure 17B:
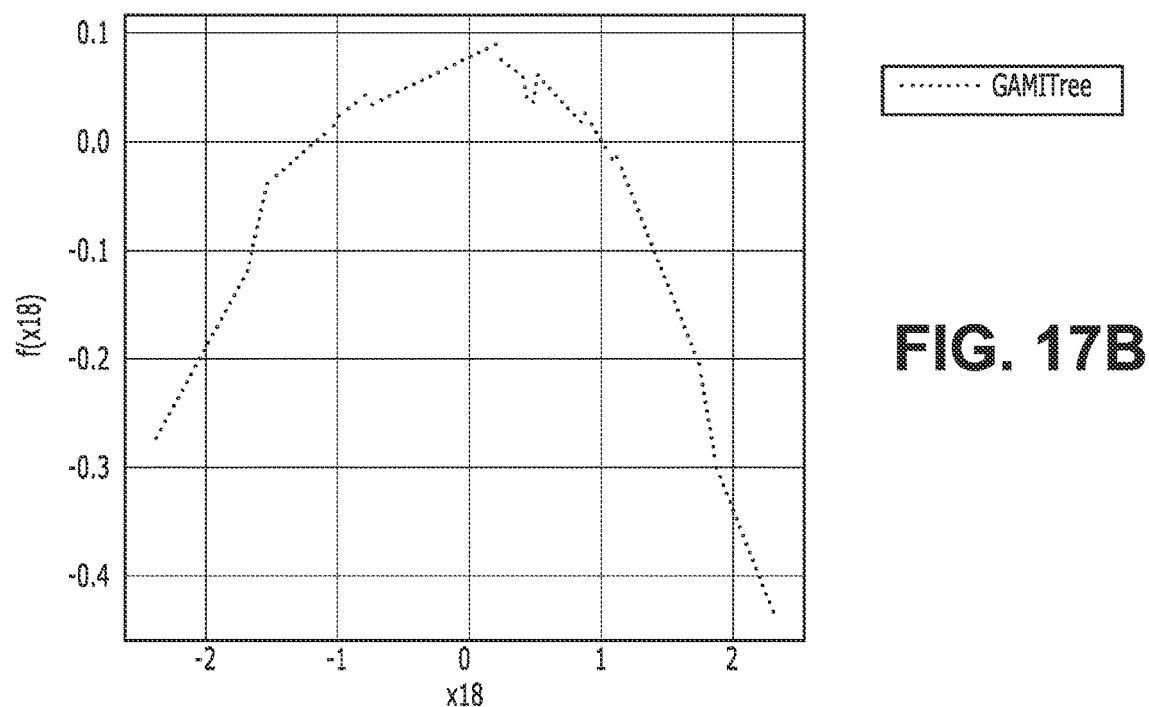

To show the second point, consider again Model 4 with 50K but now ρ equal to 0.5. EBM assigns non-negligible importance to redundant features ($x_{11}$ through $x_{20}$), as shown in FIGS. 16A-16C. A similar result is observed for GAMI-Tree-1 (not shown here). However, by iterating, GAMI-Tree effectively reduces the importance of these redundant features to close to zero. This is supported by the plot of the main effects of $x_{18}$ as shown in the plot in FIG. 17A. Here, the fake quadratic effect is captured by EBM and GAMI-Tree-1. However, at the second round in GAMI-Tree, referred to as GAMI-Tree-2, the main effects of $x_{18}$ (FIG. 17B) is the opposite of the main effect captured in the first round. When adding them together, it eliminates the fake main effect of $x_{18}$. Similar behavior has been observed for $x_{19}$. For GAMI-Net, the fine-tune stage assigns close to zero importance to these features.

Figure 18A:
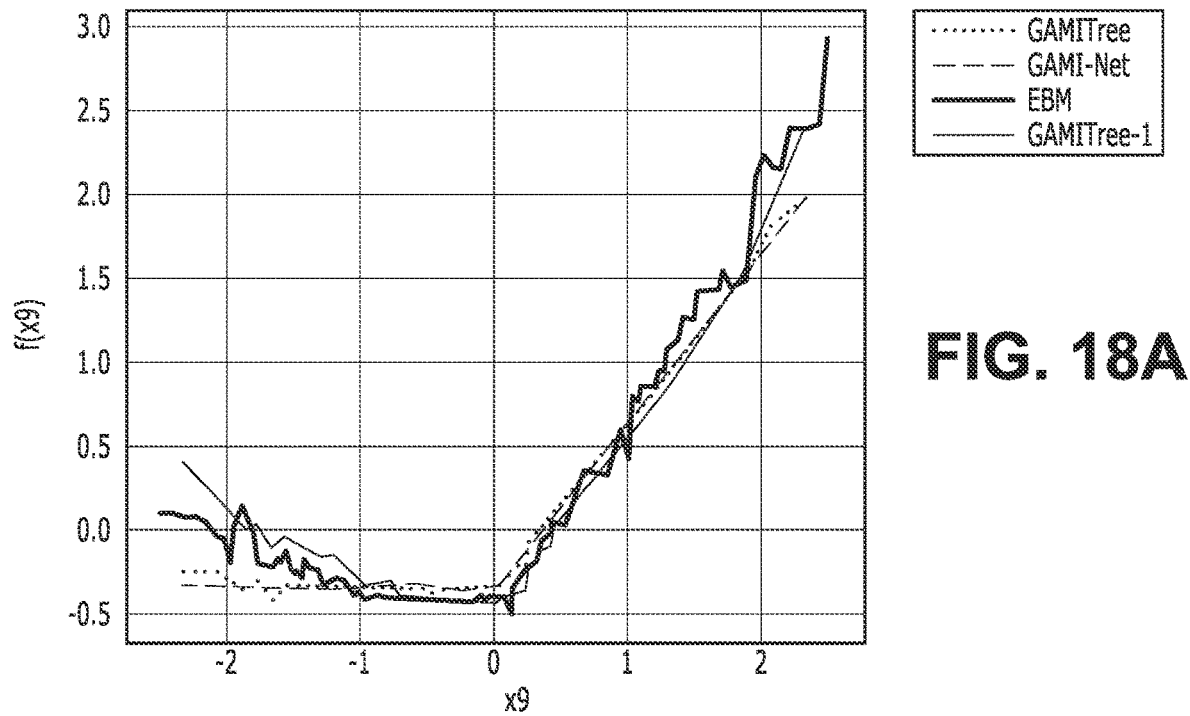
FIGS. 18A and 18B provide operational examples of the main-effect plots for features $x_9$ and $x_{10}$ for non-model features for model 4 with population size of 50K and 500K and ρ equal to 0.5 as detailed in example 1.
Figure 18B:
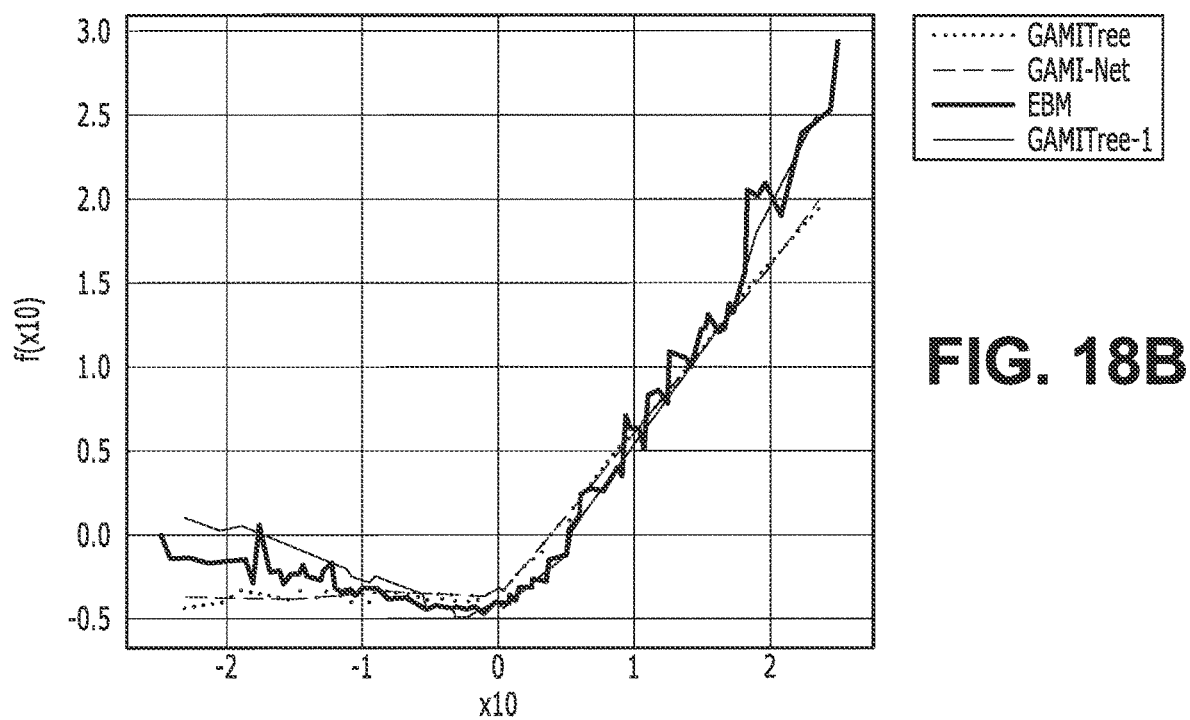
Figure 19A:
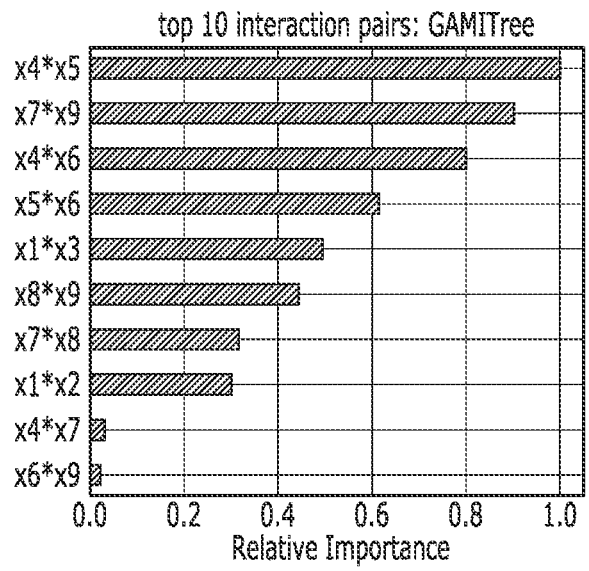
FIGS. 19A, 19B, and 19C provide operational examples of the interaction importance plots for model 2 with population size of 50K and ρ equal to 0.5 as detailed in example 1.
Figure 19B:
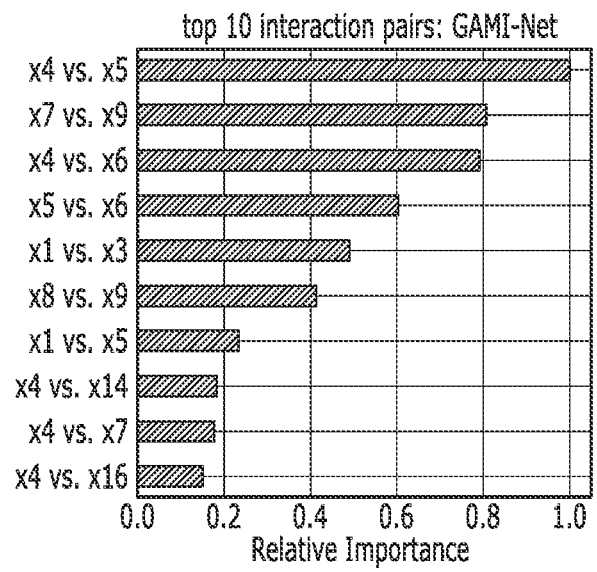
Figure 19C:
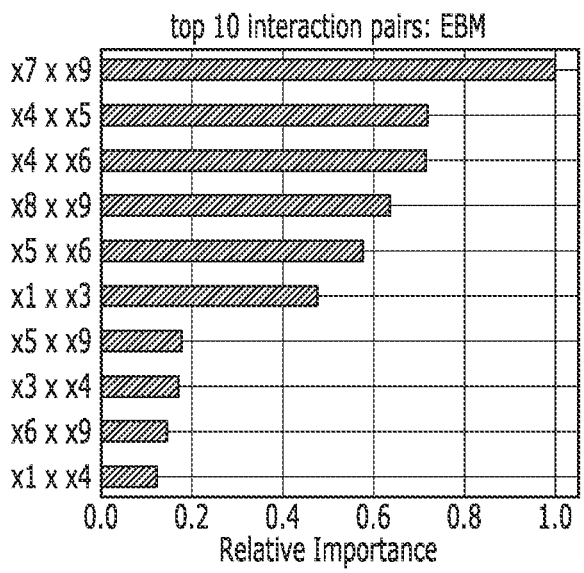
Figure 20A:
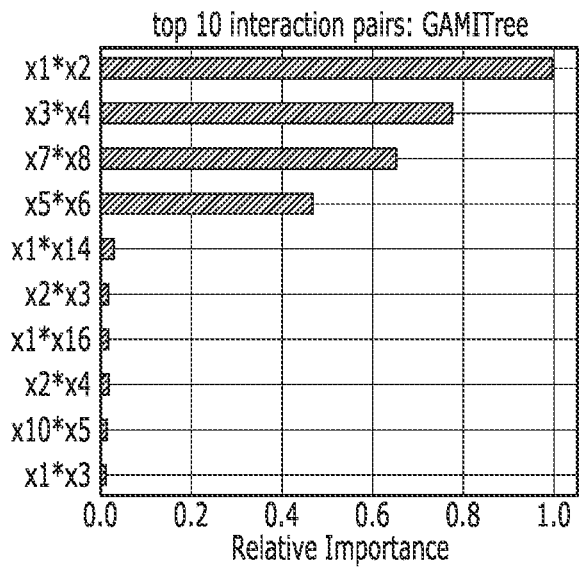
FIGS. 20A, 20B, and 20C provide operational examples of the interaction importance plots for model 3 with population size of 50K and ρ equal to 0.5 as detailed in example 1.
Figure 20B:
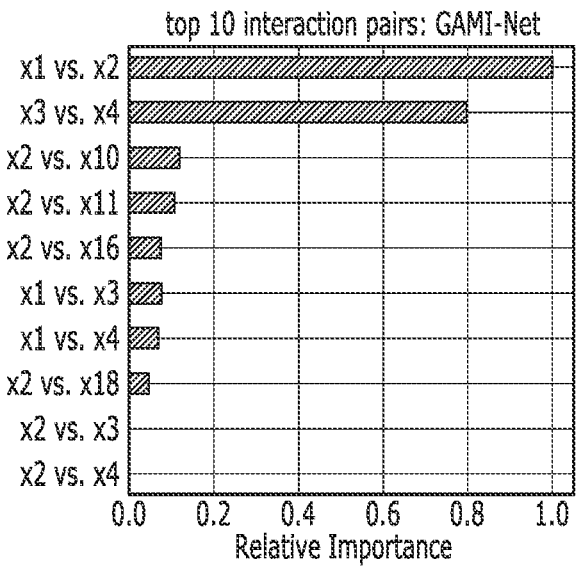
Figure 20C:
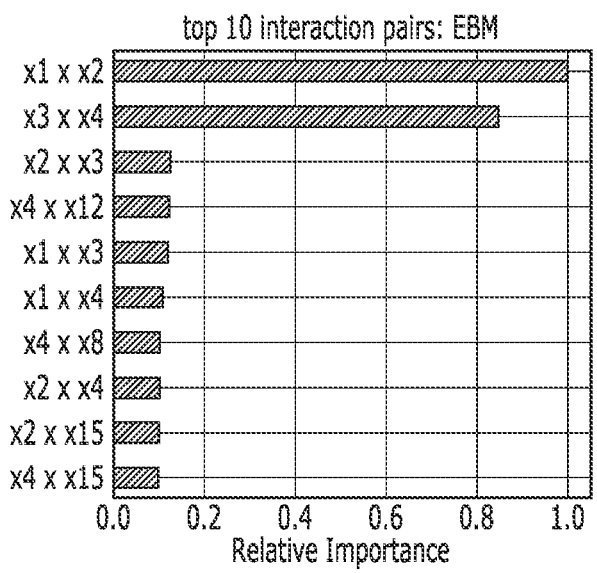

For the true model features, the main effects from GAMI-Tree, GAMI-Net and EBM are very close for the ρ equal to 0 case, except EBM is "wigglier" due to its piecewise constant nature and GAMI-Net is smooth. For the ρ equal to 0.5 case, the iterative training in GAMI-Tree and fine-tune stage in GAMI-Net lead to more accurate results. Again, consider Model 4 with 50K and ρ equal to 0.5 scenario and focus on $x_9$ and $x_{10}$. In this case, features $x_9$ and $x_{10}$ are purely additive since interactions only exist between $x_1$ through $x_6$. So, the true main effect is the function $x_j$ ($x_j$>0), j=0, 10. FIGS. 18A-18B show the main effects from GAMI-Tree, GAMI-Net, EBM and GAMI-Tree-1. FIGS. 18A-18B illustrate that both EBM and GAMI-Tree-1 show some uptick pattern in the negative region, whereas GAMI-Tree and GAMI-Net is close to the true form which is flat in the negative region. Similar pattern is observed for the larger sample size 500K data. Therefore, GAMI-Net and GAMI-Tree give more accurate characterization of the main effects, with no distortion for the true model features and negligible effect for the non-model features (as seen previously).

Now consider model interpretation related with two-way interactions. First, it is investigated whether each method captured all the true interaction pairs. For Models 1 and 4, all true interaction pairs are captured as the top ones by all models.

For Model 2, ρ equal to 0, all eight true interaction pairs are captured as the top eight. However, for ρ equal to 0.5, EBM and GAMI-Net miss two true interaction pairs in their top 10 list: ($0.25x_1x_2$ and clip($x_7+x_8$, −1, 0), for both 50K and 500K sample sizes. For example, see FIGS. 19A-19C which depicts this for the 50K case. This is due to the correlation among features which causes the "pure interaction" effect (after removing main-effects) for these two less-important interactions to be weaker and harder to identify, and some "surrogate interactions" (interactions that are not in the true model but mimicking the true interaction pairs due to feature correlation) for the six strong ones could rank higher during interaction filtering. For GAMI-Tree, its first round (GAMI-Tree-1) also suffers from this surrogate interaction issue and misses the above two interactions. However, its second-round redoes the interaction filtering. Because interactions for the first six pairs have already been accounted for in the first round, the surrogate interaction pairs are no longer significant, and it is easy to identify the missed interactions. As a result, the second round accurately picked up the two missed interaction as the two most important interaction pairs, and GAMI-Tree was able to capture all eight true interaction pairs and list them as top eight correctly.

For Model 3, ρ equal to 0.5, EBM and GAMI-Net both miss the two sine function related interactions, $x_5$-$x_6$ and $x_7$-$x_8$, whereas GAMI-Tree captures all four true interactions. For example, see FIGS. 20A-20C which depicts this for the 50K data case. This is because the 4-quadrant model used in FAST algorithm cannot capture the highly nonlinear sine function well, so it misses out on these two interactions. On the other hand, the interaction tree we used in GAMI-Tree interaction filtering can capture this well.

For Model 3, 50K, ρ equal to 0, GAMI-Net misses the two sine function interaction due to the limitation of FAST algorithm mentioned earlier, resulting in a worse model performance.

Finally, the true two-way interaction effects captured by all methods are similar.

The results from the binary case were qualitatively similar to the continuous case, but were found to be noisier and less significant. In the binary case, the interaction patterns estimated by all algorithms are noisier and less accurate compared to continuous response case. This is due to the smaller signal-to-noise ratio for binary response. However, with a larger sample size of 500K, the model improves and the patterns become closer to the truth. In particular, it was observed that the GAMI-Tree is closer to truth than EBM or GAMI-Net.

Example 2

One particular application of the GAMI-Tree model is in the application of residential mortgage accounts. In particular, for a dataset dealing with residential mortgage accounts, a response feature value of a "troubled" loan indicator may be assigned a value of 1 if the loan is in trouble state and 0 otherwise (e.g., one-hot encoded). The term "trouble" is defined as any of the following events: bankruptcy, short sale, 180 or more days of delinquency in payments, etc. The goal for this simulation is to predict if a loan will be in trouble at a future prediction time based on account information from the current time (called snapshot time) and macro-economic information at the prediction time. The time interval between prediction time and current time is called prediction horizon.

In general, there are over 50 predictors, including macro-economic features (e.g., unemployment rate, house price index, and so on), static loan characteristic features at the origination time (e.g., fixed 15/30 year loan, arm loan, balloon loan, etc), and dynamic loan characteristic features (e.g., snapshot fico, snapshot delinquency status, forecasted loan-to-value ratio, etc). For model interpretation purpose, we removed some features which are highly correlated, and used 44 of them to fit the models discussed herein. The important features are listed in Table 4.

TABLE 4

Features and description for Example 2

| Feature | Definition |
| --- | --- |
| horizon | prediction horizon (difference between prediction time and snapshot time) in quarters |
| snap_fico | credit score (FICO score) at snapshot time |
| orig_fico | credit score (FICO score) at loan origination |
| snap_ltv | loan to value (ltv) ratio at snapshot time |
| fcast_ltv | loan to value (ltv) ratio forecasted at prediction time |
| orig_ltv | loan to value ratio at origination |
| orig_cltv | combined ltv at origination |
| snap_early_delq_ind | early delinquency (no min payments for a few months) indicator: 1 means loan has early delinquency status at snapshot time; 0 means loan is current or has late delinquency status. 7.7% observations are early delinquent. |
| snap_late_delq_ind | late delinquency indicator (loan is delinquent for longer time, close to default) indicator: 1 means loan has late delinquency status at snapshot time; 0 means loan is current or has early delinquency status. Only 0.2% observations are late delinquent. |
| pred_loan_age | age of loan (in months) at prediction time |
| snap_gross_bal | gross loan balance at snapshot time |
| orig_loan_amt | total loan amount at origination time |
| pred_spread | spread (difference between note rate and market mortgage rate) at prediction time |
| orig_spread | spread at origination time |
| orig_arm_ind | Indicator: 1 if loan is adjustable-rate mortgage (ARM); 0 otherwise |
| pred_mod_ind | modification indicator: 1 means prediction time before 2007Q2 (financial crisis); 0 if after |
| pred_unemp_rate | unemployment rate at prediction time |
| pred_hpi | house price index (hpi) at prediction time |
| orig_hpi | hpi at origination time |
| pred_home_sales | home sales data at prediction time |
| pred_rgdp | real GDP at prediction time |
| pred_totpersinc_yy | total personal income growth (from year before prediction to prediction time) |

A subset of 1 million observations were selected from the original dataset for one of the portfolio segments. The data was split into 50% training, 25% validation and 25% testing. Again, four algorithms: xgboost, GAMI-Net, GAMI-Tree, and EBM were fitted. The same tuning/training settings described in table 2 were used here. The training and testing area under the curve (AUC) for all models are listed in table 5.

TABLE 5

Training and testing AUC

| | xgboost | GAMI-Tree | GAMI-Net | GAMI-Tree-1 | EBM |
| --- | --- | --- | --- | --- | --- |
| train_AUC | 0.906 | 0.869 | 0.849 | 0.861 | 0.865 |
| train_logloss | 0.0415 | 0.0451 | 0.0467 | 0.0460 | 0.0455 |
| test_AUC | 0.857 | 0.858 | 0.851 | 0.855 | 0.855 |
| test_logloss | 0.0451 | 0.0451 | 0.0457 | 0.0455 | 0.0454 |

As shown in table 5, the performance of xgboost, GAMI-Tree and EBM are all PG-6T comparable, with GAMI-Tree being the best. GAMI-Net is slightly worse. There are slight improvements from GAMI-Tree-1 to GAMI-Tree.

Figure 21A:
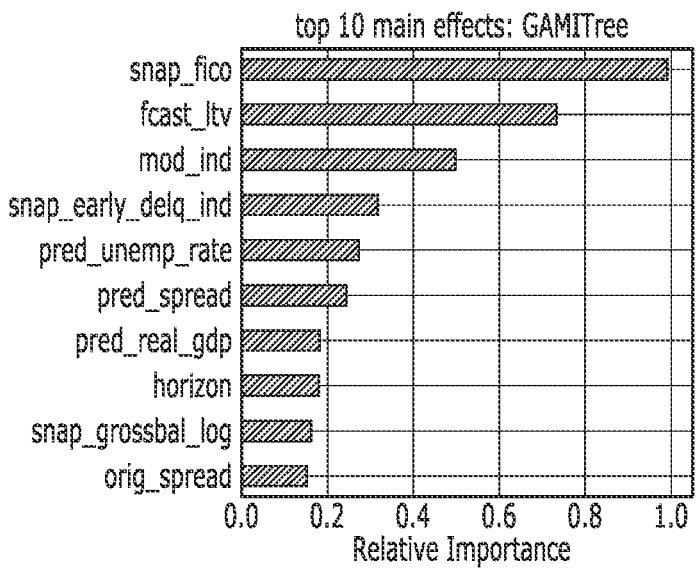
FIGS. 21A, 21B, and 21C provide operational examples of the main-effect importance plots for home lending data as detailed in example 2.
Figure 21B:
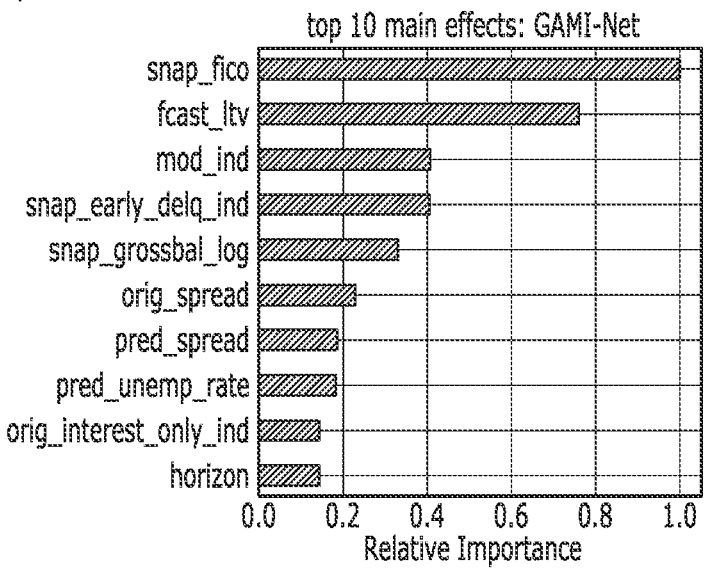
Figure 21C:
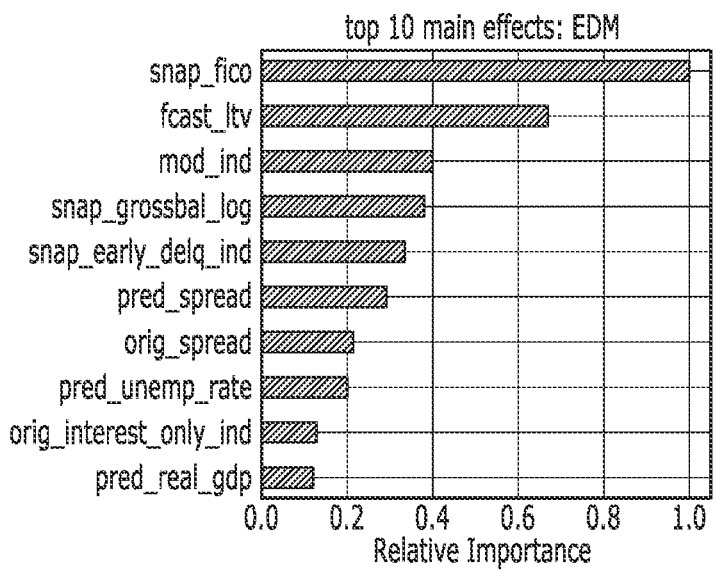
Figure 22A:
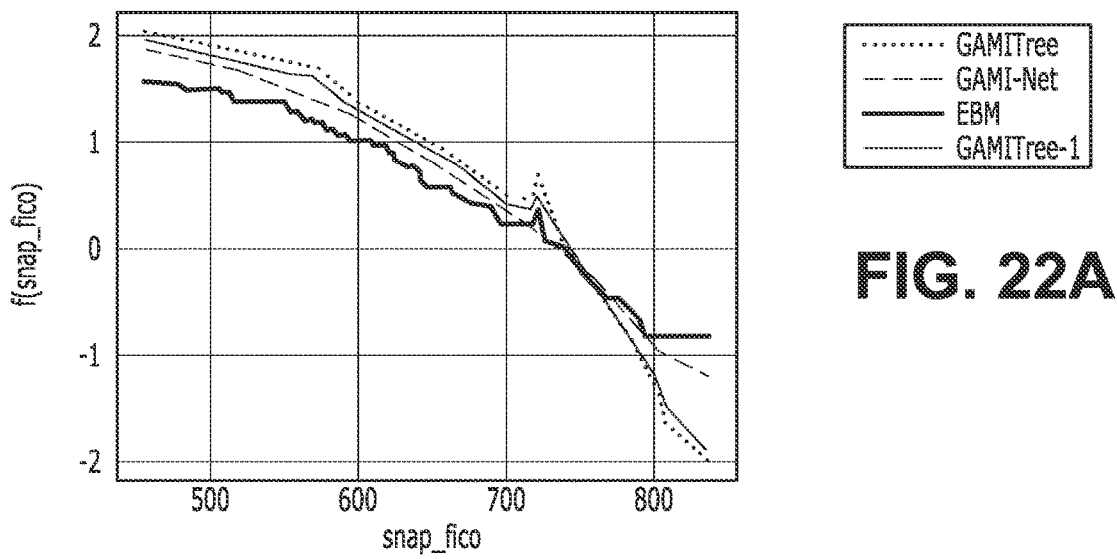
FIGS. 22A, 22B, 22C, 22D, 22E, 22F, 22G, 22H, and 22I provide operational examples of the main-effect plots for home lending data as detailed in example 2.
Figure 22B:
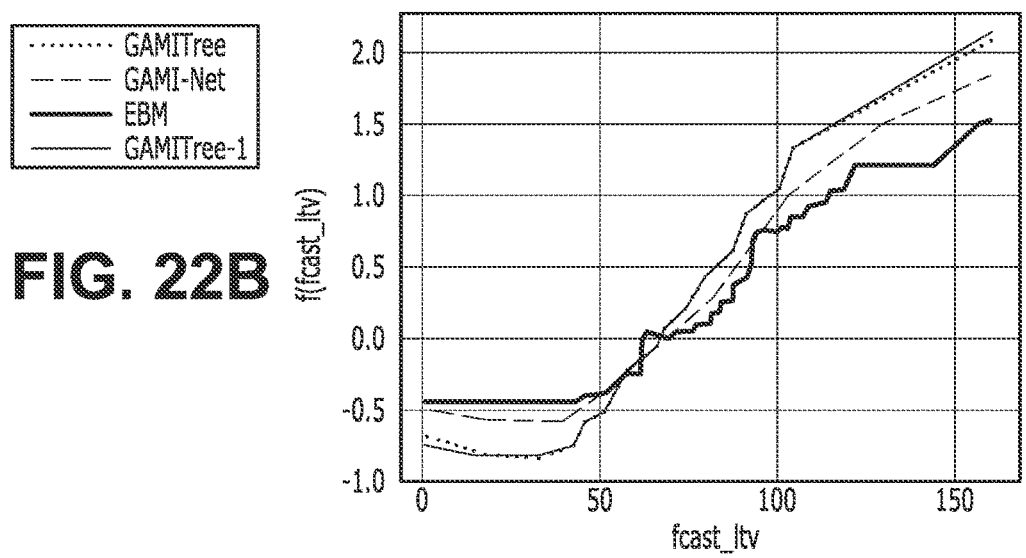
Figure 22C:
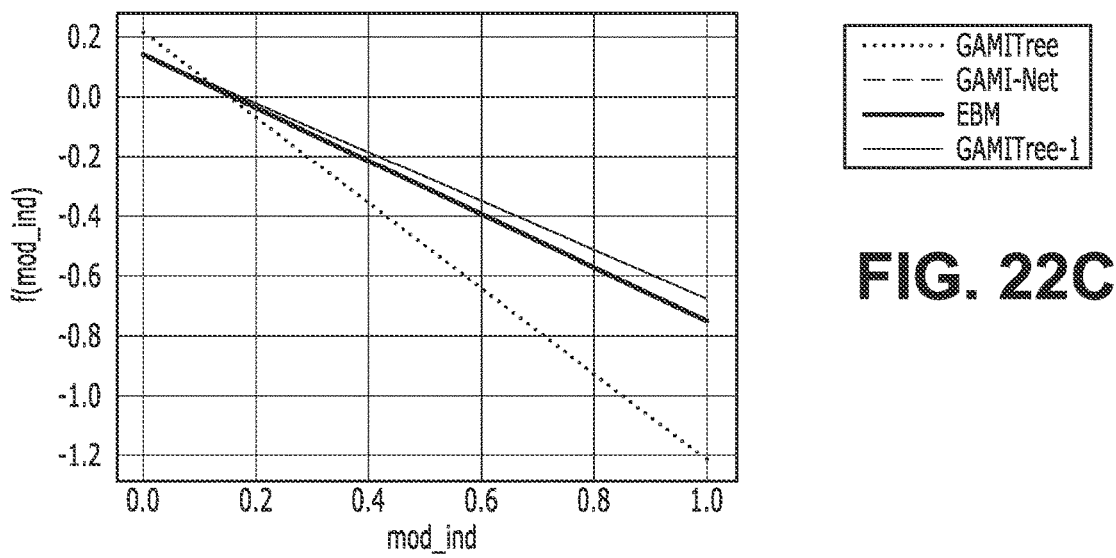
Figure 22D:
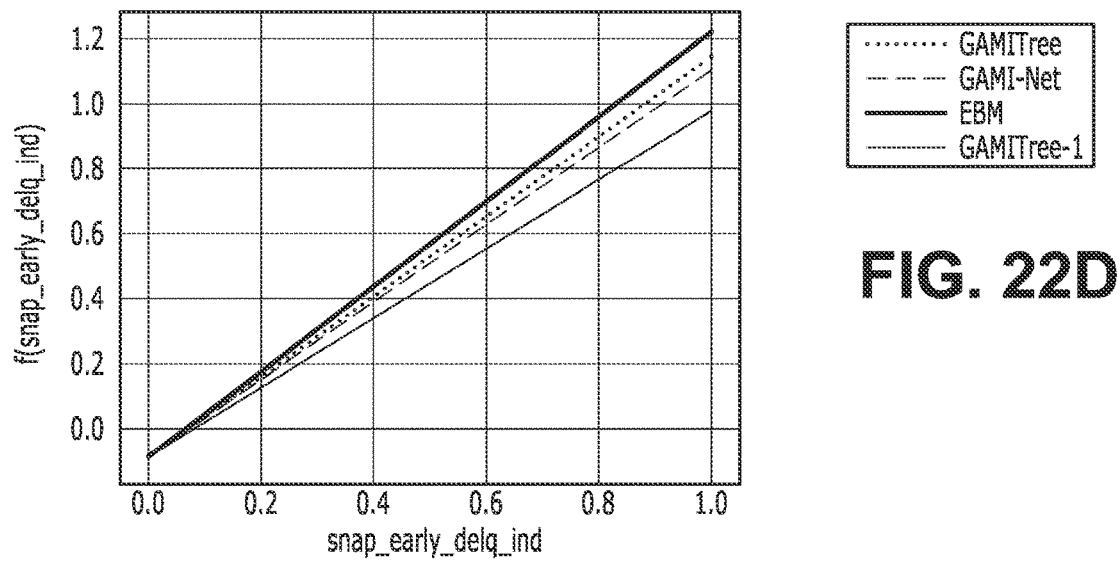
Figure 22E:
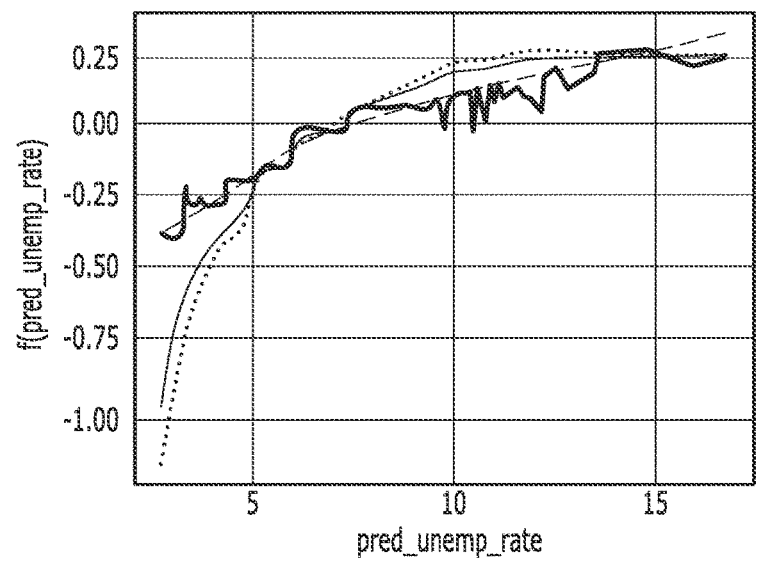
Figure 22F:
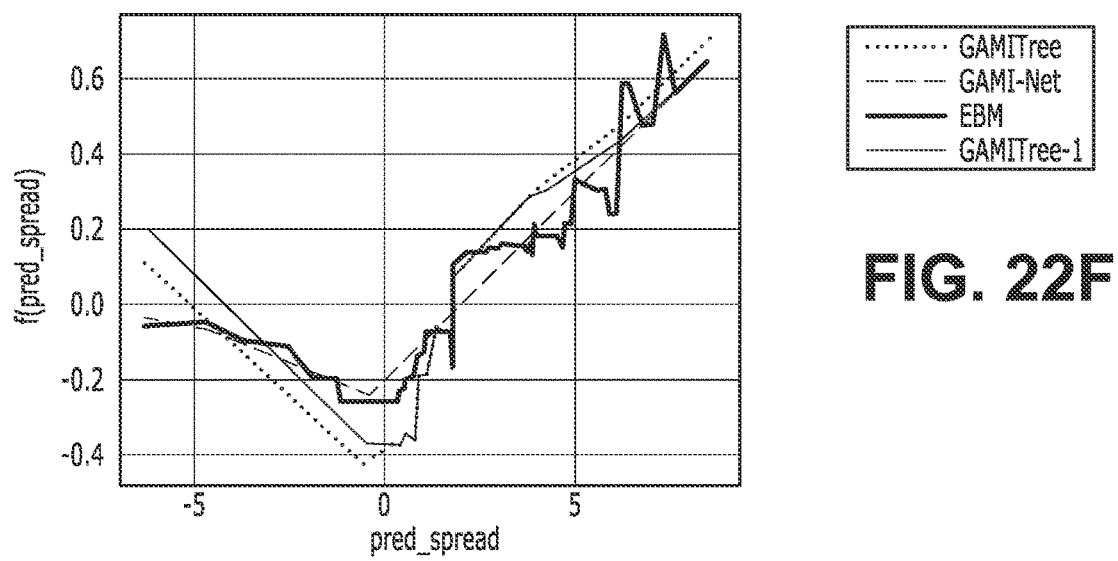
Figure 22G:
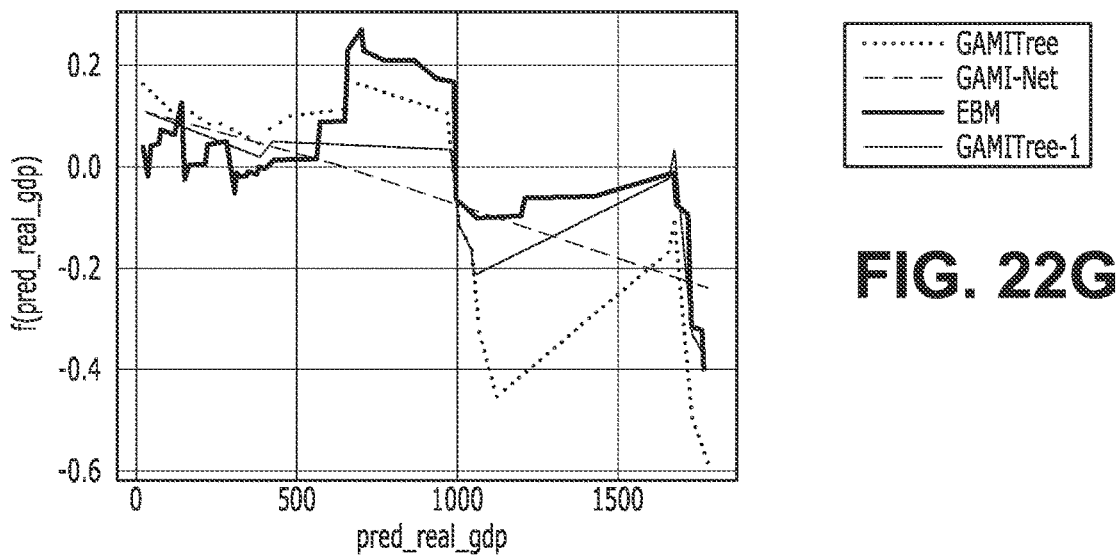
Figure 22H:
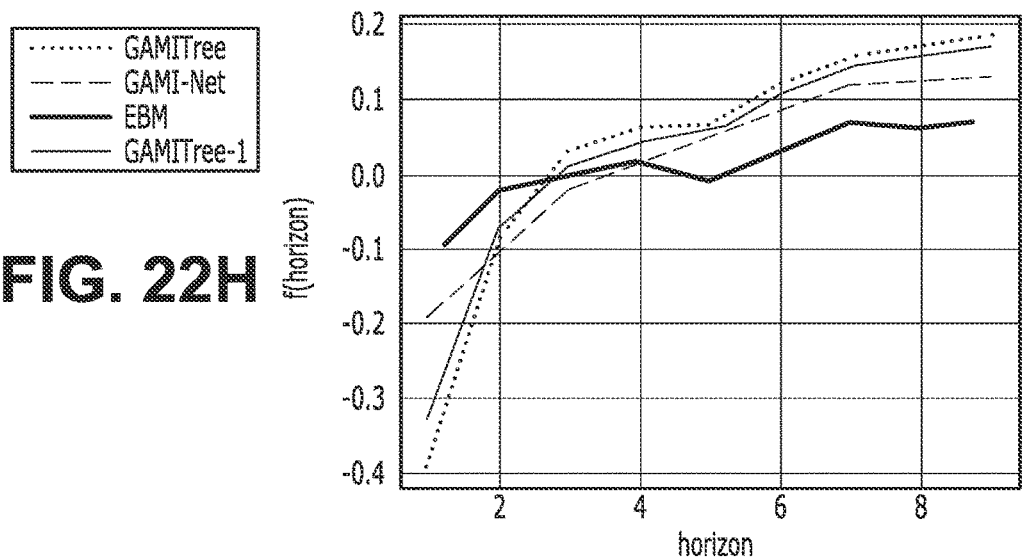
Figure 22I:
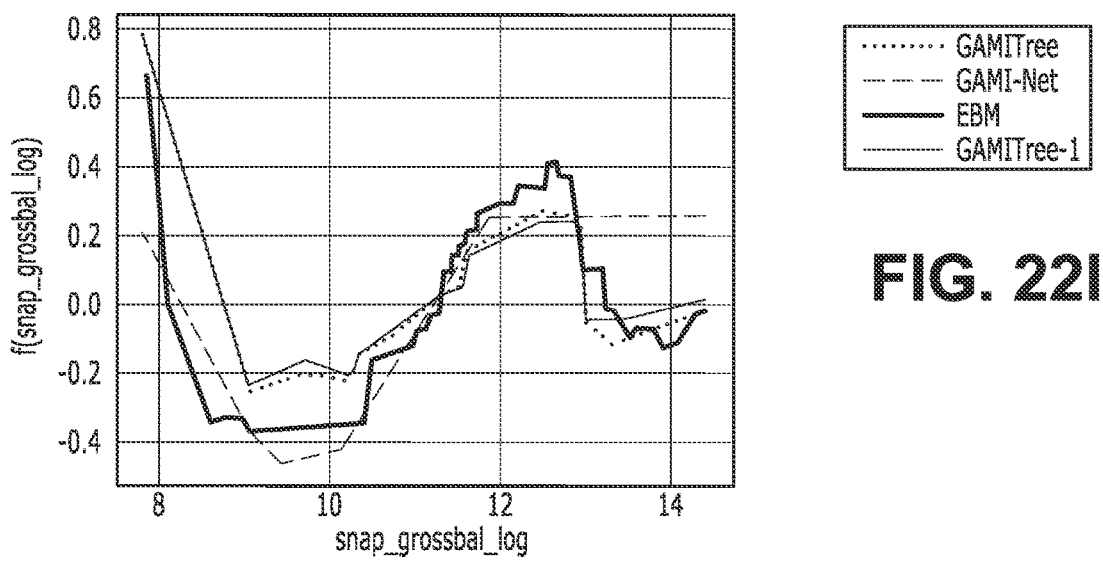

FIGS. 21A-21C shows the importance ranking for the top 10 main effects. The rankings among all models are close with some small differences. For example, GAMI-Tree ranks horizon as 7th important main effect, whereas GAMI-Net ranks it as 10th and EBM does not rank it as one of the top 10 main effects; on the other hand, EBM/GAMI-Net ranks interest only indicator as the 9th important main effect, whereas GAMI-Tree does not rank it as one of the top 10 main effects. Comparing GAMI-Net and EBM, they are very consistent except the 10th feature is different and some slight change in the ranking.

FIGS. 22A-22I show the main effect plot for all models for the top 9 features in GAMI-Tree. GAMI-Tree and GAMI-Tree1 are very close and both show stronger main effects for a few features, including snapshot fico, forecasted ltv, unemployment rate and horizon. Some of the differences can be explained by the purification step we use in GAMI-Tree, which is discussed in greater detailed below.

Figure 23A:
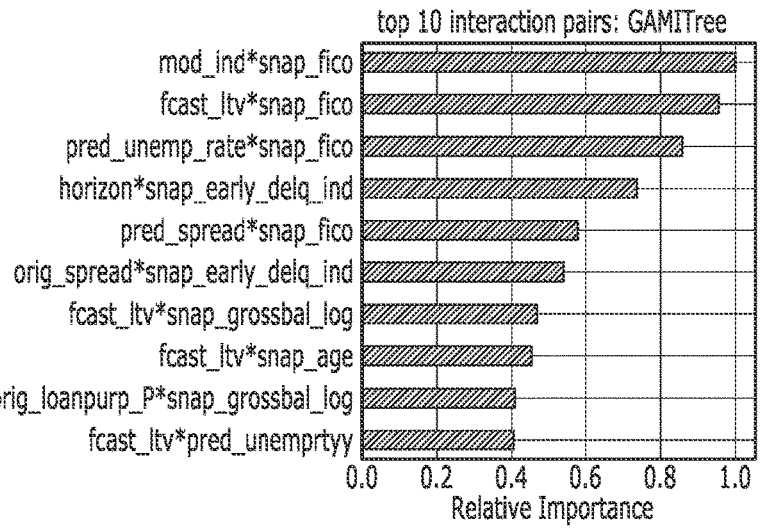
FIGS. 23A, 23B, and 23C provide operational examples of the interaction importance plots for home lending data as detailed in example 2.
Figure 23B:
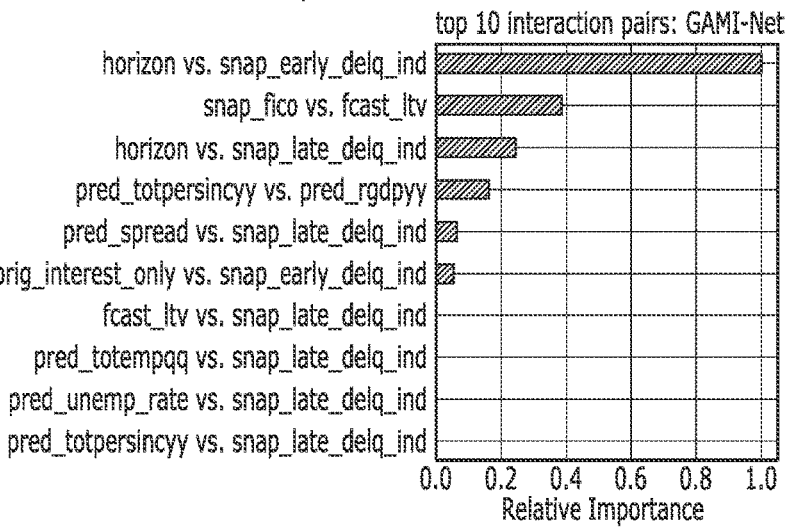
Figure 23C:
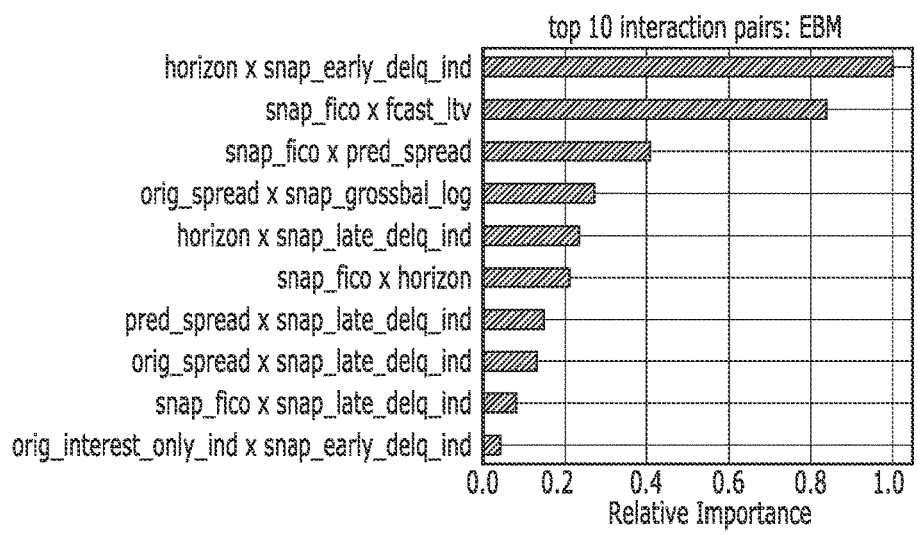

The top 10 interactions from GAMI-Tree, GAMI-Net and EBM are shown in FIGS. 23A-23C. The top four interactions from GAMI-Tree are: mod_ind and fico, ltv and fico, unemployment rate and fico, horizon and early delinquency indicator. Those interactions make sense from the subject-matter perspective and have been seen in other studies. EBM did not have the unemployment rate vs fico interaction and mod_ind vs fico interaction. On the other hand, EBM captures multiple pairs of interactions related with late delinquency indicator, most importantly, the interaction among horizon and late delinquency indicator. While this feature pair indeed has interaction, late delinquency is a very rare event (only 0.2% observations in total), and GAMI-Tree does not rank it as top 10. For GAMI-Net, the top 10 interactions filtered by FAST algorithm again has a lot of late delinquency indicator related interactions, but the fine tune step pruned 4 of them, keeping a total of 6 interactions. The top 2 interactions are ltv and fico, horizon and early delinquency indicator, which are high ranking interactions in all algorithms; however, it does not have unemployment rate and fico, or spread and fico interactions. Increasing the number of interactions in filtering step allows it to capture those interaction pairs, and have better model performance.

FIGS. 24A-24H shows the top three of the common interaction pairs from GAMI-Tree and EBM, two of which are also top two in GAMI-Net. The patterns look very similar with some differences. For example, for the interaction between horizon and early delinquency indicator, GAMI-Tree shows that the effect of horizon is almost flat when the loan is not in early delinquency state, whereas EBM and GAMI-Net show an increasing trend. Recall that in FIGS. 22A-22I, the main-effect of horizon is flatter for EBM and GAMI-Net compared to GAMI-Tree, we can see that the difference is due to how the main-effect and interactions are decomposed in each model. Particularly, the interaction effect from EBM and GAMI-Net still has some main effect on the horizon feature, this results in flatter trend for horizon in the main-effect plot. GAMI-Tree uses a post-hoc orthogonalization step to make sure interactions do not contain any main-effects, whereas EBM and GAMI-Net (uses a clarity penalty) does not guarantee this.

Figure 25A:
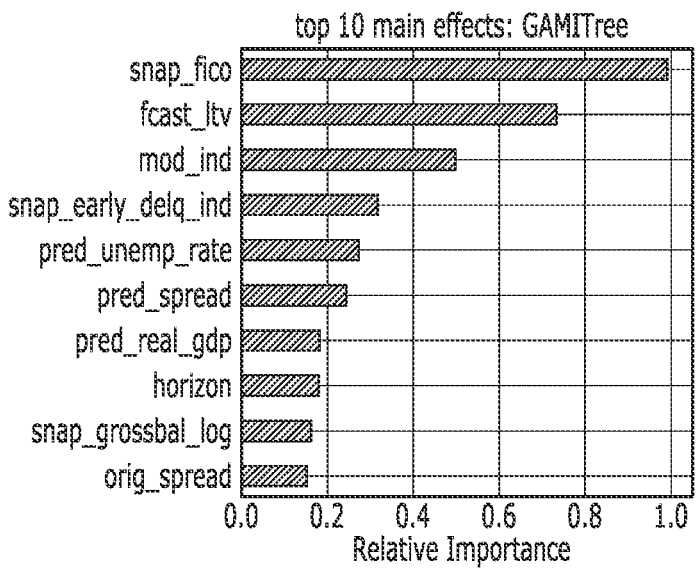
FIGS. 25A, 25B, and 25C provide operational examples of the main-effect importance plots for home lending data for purified GAMI-Tree (left), unpurified GAMI-Tree (middle), and EBM (right) as detailed in example 2.
Figure 25B:
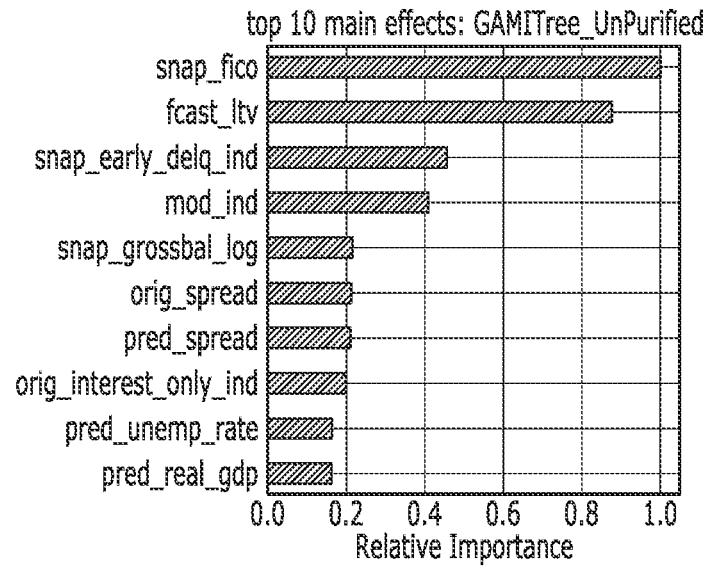
Figure 25C:
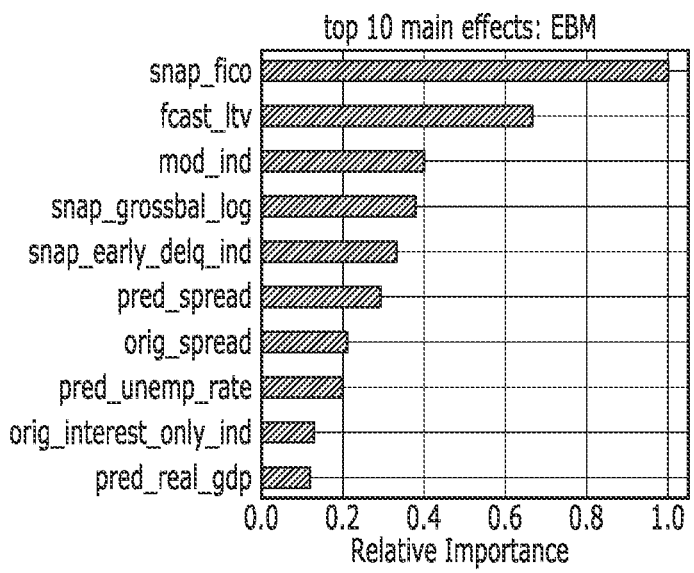
Figure 26A:
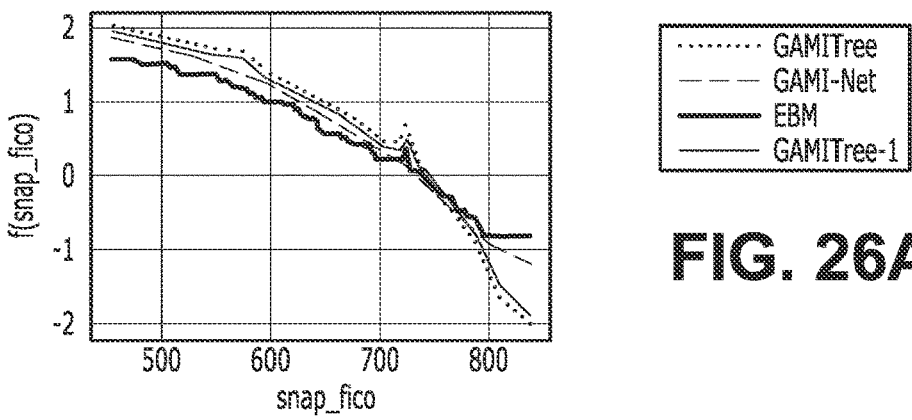
FIGS. 26A, 26B, 26C, 26D, 26E, 26F, 26G, 26H provide operational examples of the main-effect plots for home lending data for purified GAMI-Tree (left) and unpurified GAMI-Tree (right) as detailed in example 2.
Figure 26B:
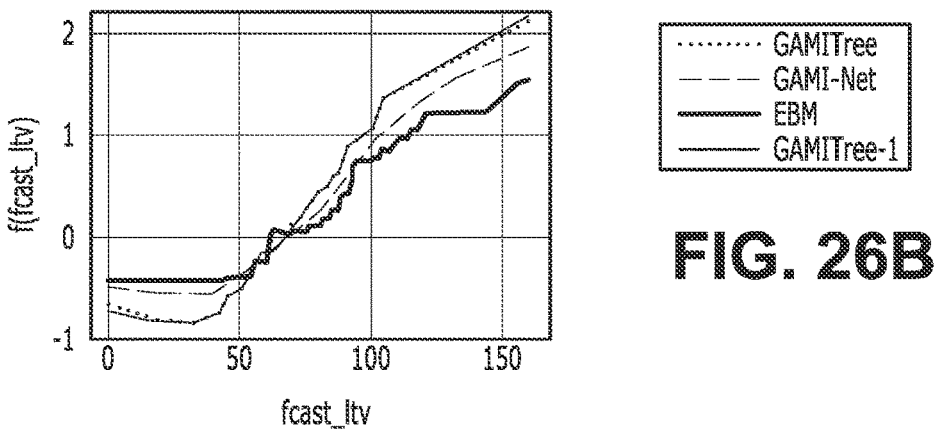
Figure 26C:
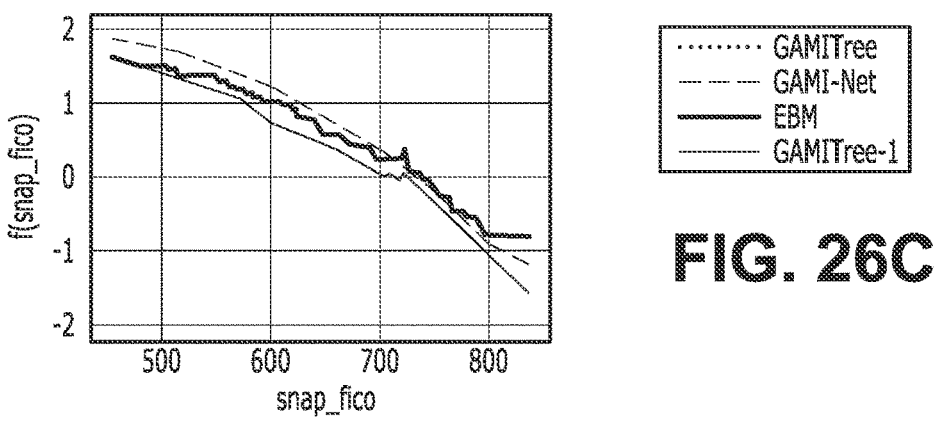
Figure 26D:
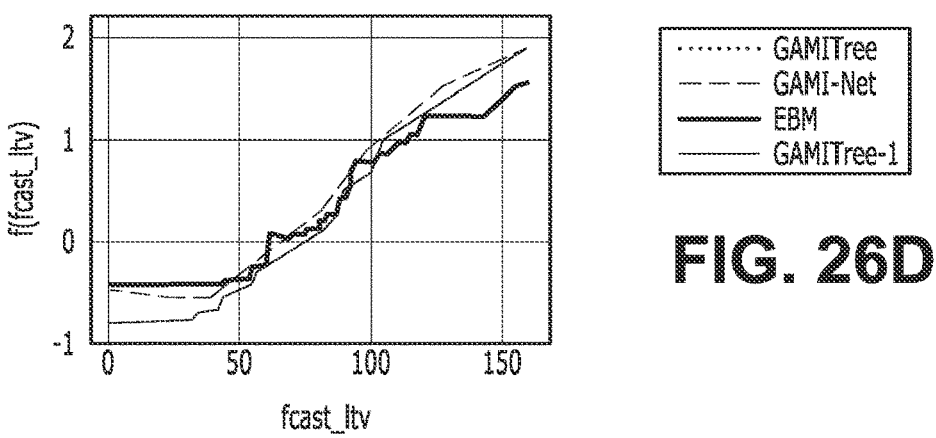
Figure 26E:
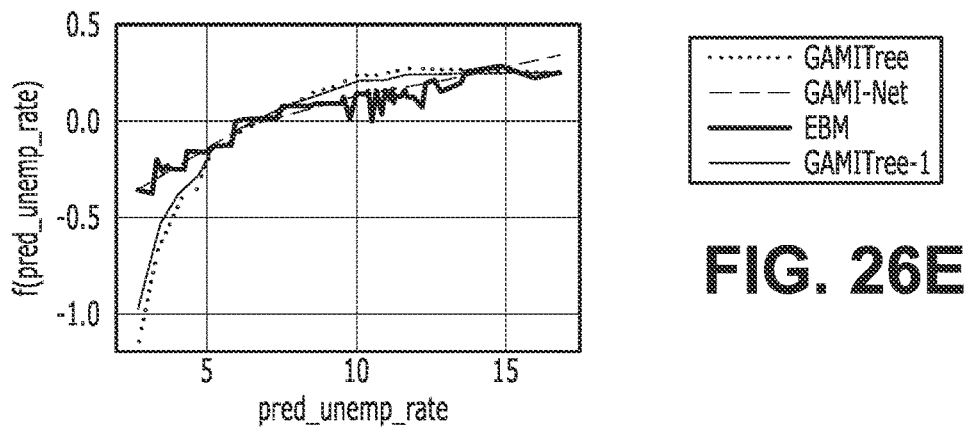
Figure 26F:
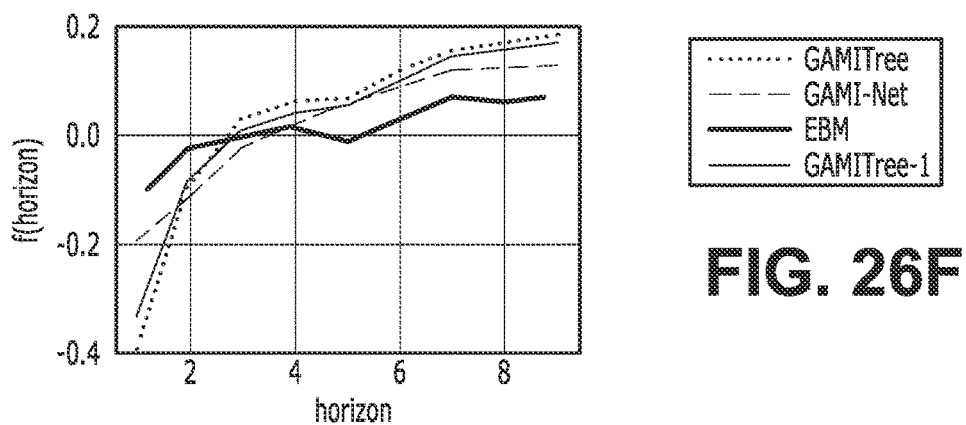
Figure 26G:
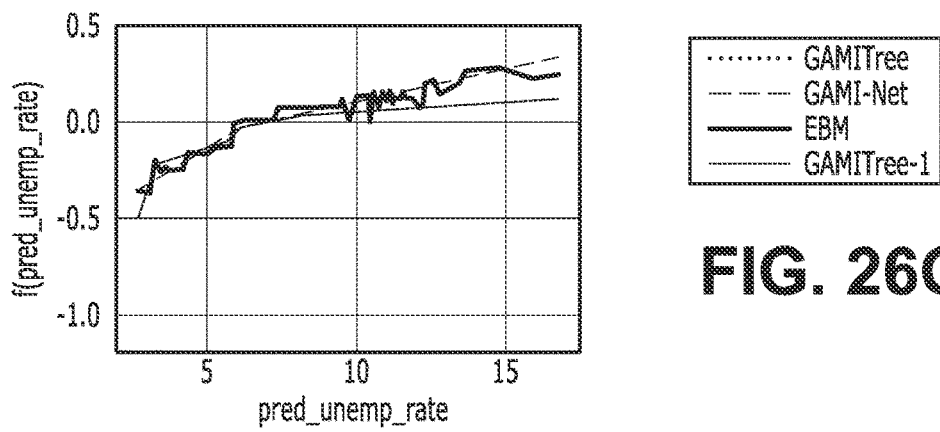
Figure 26H:
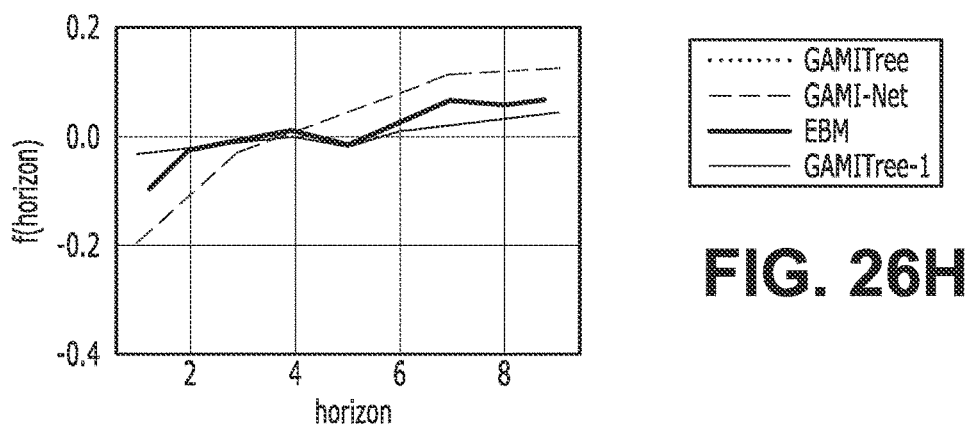

To further demonstrate the difference orthogonalization has made, FIGS. 25A-25C show the main effects importance for GAMI-Tree with and without orthogonalization. FIGS. 25A-25C show that the top 10 features of unpurified GAMI-Tree are same as EBM (with slight change in ranking), and neither contains horizon feature. In addition, the main-effect plots are more similar among EBM and unpurified GAMI-Tree, as shown in FIGS. 26A-26H. In particular, the main-effect of horizon becomes small for unpurified GAMI-Tree. This indicates that the main-effect of horizon we see from (purified) GAMI-Tree comes from orthogonalization Example 3

As described above, the GAMI-Tree may be associated with several hyperparameters that may be tuned automatically. Table 6 depicts the various hyperparameters and the default values used.

TABLE 6

Hyperparameter values

| Hyperparameter | Description | Default Value | Notes |
|---|---|---|---|
| M | number of maximum boosting iterations | 1000 | Only need to set a large value and early stopping internally to find the best number of iterations |
| max_depth | number of maximum boosting iterations | 2 for continuous response features; 1 for binary response features | Shallower trees are preferred in boosting framework, as it has less overfitting issue compared to deeper trees. However, this will lead to more boosting iterations. |
| λ | learning rate | 0.2; Can be set to >0.1 if dataset is noisy | Small learning rate is preferred in boosting framework, but it requires more boosting iterations to converge |
| nknots | number of linear B-spline transformation knots | 5 with 5 quantile knows (0, 25, 50, 75, and 100 percentiles) | This gives more flexibility to the tree to capture complicated interaction patterns, but the number of knots needs to be small, so it does not overfit |
| R | number of required iterations | 5 | Usually the number of early stopping iterations ($M_{main\_stop}$ or $M_{int\_stop}$) in later round is small, so additional rounds does not add too much computational burden. |
| npairs q | number of qualified input feature pairs | 10 | Smaller values can be used without worrying about missing interactions since missed interactions in one round can be picked up in the next round. |
| alpha | L2 regularization parameter when fitting linear/spline regression models in each tree node | Default grid of penalty parameters from exp(−8) to exp(0). The best one is selected by GCV criterion. | Sometimes the chosen penalty is not strong enough, so the algorithm includes a direct way to control overfitting using max_coef below. |
| max_coef | maximum allowed coefficient value when fitting ridge regression models in each tree node | 1 | This will drop small L2 penalty parameters which produce normalized coefficient larger than max_coef, and choose only the best penalty from the remaining ones. Here normalized coefficient is defined by coefficient value times its standard deviation. |

Example 4

Constructing model-based tree is known to be computationally expensive, because many linear models need to be fitted and evaluated in order to determine the best tree split. What is worse, GAMI-Tree requires fitting hundreds or even thousands of model-based trees in the boosting process. To address the computation obstacle, an efficient implementation is made which reduces the computation by reusing intermediate results and utilizes high performance computational tools like multi-processing and Cython to speed it up.

First, to fit each model-based tree (either the main-effect tree or interaction-effect tree), we use the efficient algorithm. Briefly, the splitting variable is binned and calculate the gram matrices, $X^T X$, $X^T z$, for each bin as intermediate results. Then in each tree node, only the bins which fall into that node are needed and summed over the corresponding binned gram matrices to obtain the gram matrix, instead of computing it from scratch. This reduces the computation cost tremendously when sample size n is large since the most computation cost is in calculating the gram matrices (n>>p). Moreover, only the pseudo-response z changes while the predictors stay fixed from iteration to iteration, so we can reuse the gram matrices for $X^T X$ and only updating the gram matrices for $X^T z$. This is fast because z is one-dimensional.

In addition, high performance computational tools are used to speed it up. The gram calculation, loss evaluation function, prediction function and solver for the ridge regression are all written in Numba or Cython, which is compiled into C code and has the speed of C. These functions are further parallelized by joblib and openmp. So, the final algorithm is highly optimized and parallelized.

Table 7 shows the timing for fitting a GAMI-Tree model to a simulated binary response data with n equal to a population size of 100 thousand (100K), one million (1M), and 10 million (10M) observations and p equal to 50 features. The data is divided into 70% training and 30% validation, and a GAMI-Tree model with a particular hyperparameter configuration (max_depth=2, ntrees=100, npairs=10, nknots=6, nrounds=1) is fitted to obtain the timing. Since the timing of GAMI-Tree model varies depending on how many rounds and number of trees are fitted, it is useful to show the time for each tree iteration.

Table 7 shows the average time per tree in main-effect stage and interaction stage, time for interaction filtering and total fitting and prediction time. For small data with 100K observations, it is very fast, takes less than 0.1 seconds to fit one tree. For medium data with 1M rows, it takes 0.1-0.2 seconds to fit one tree. For large data with 10M rows, it takes less than 0.7 seconds to fit one tree for nthreads=20 and less than 1.2 seconds for nthreads=10. Regarding interaction filtering, it takes only 2 second to filter all 2500 pairs of variables for the 100K data, 6-9 seconds for the 1M data and 52-75 seconds for the entire 10M data. Oftentimes, a 1M subsample to filter interactions is sufficient (since the interaction model is only a two-variable model), but even with the entire 10M data, the filter speed is still acceptable. In terms of total fitting time, for the largest 10M data, a typical GAMI-Tree with a few hundred trees for both main-effect stage and interaction stage can be done around 10 minutes. The prediction speed is even faster, taking less than 10 seconds for the 10M data.

TABLE 7

Computational times for a GAMI-Tree model

| n | p | nthreads | main-stage (seconds/tree) | int-filter (seconds) | Int-stage (seconds/tree) | Total fit (seconds) | Prediction (seconds) |
|---|---|---|---|---|---|---|---|
| 100K | 50 | 10 | 0.08 | 2.2 | 0.06 | 18 | 0.15 |
| 100K | 50 | 20 | 0.08 | 2.0 | 0.06 | 18 | 0.22 |
| 1M | 50 | 10 | 0.18 | 9.0 | 0.12 | 44 | 1.0 |
| 1M | 50 | 20 | 0.15 | 6.0 | 0.1 | 36 | 1.1 |
| 10M | 50 | 10 | 1.20 | 75 | 0.82 | 312 | 9.5 |
| 10M | 50 | 20 | 0.70 | 52 | 0.53 | 224 | 6.5 |

Example 5

As another illustrative example to depict the advantages of the GAMI-Tree model over other conventional models, a public data hosted on UCI machine learning repository is used for xgboost, GAMI-Net, GAMI-Tree, GAMI-Tree-1, and EBM models. It has around 17,000 hourly bike rental counts from 2011 to 2012, with corresponding time (by hour), weather and season information. The goal is to predict hourly bike rental counts. Log counts are used as response and the following 11 variables as predictors: yr (year, 1 if 2012 and 0 if 2011); mnth (month=1 to 12); hr (hour=0 to 23); holiday (1 if yes and 0 otherwise); weekday (0=sunday to 6=saturday); workingday (1 if working and 0 if weekend or holiday); season (1: winter; 2: spring, 3: summer, 4: fall); weathersit (1: clear, 2: misty+cloudy; 3: light snow; 4: heavy rain); temp (normalized to be within 0 and 1); hum (humidity) and windspeed. There are some identifiability issues here as working day is completely determined by holiday and weekday.

The data was split into 50% training, 25% validation and 25% testing, and the following algorithms were fit: xgboost, GAMI-Net, GAMI-Tree and EBM. The same tuning/training settings as in example 1 are used. The training and testing MSE for all models are listed in Table 8. xgboost is the best, GAMI-Tree is second, followed by EBM and GAMI-Net. There are also some improvements from GAMI-Tree-1 to GAMI-Tree.

TABLE 8

Train and testing MSE for bike sharing data

| | xgboost | GAMI-Net | GAMI-Tree | GAMI-Tree-1 | EBM |
|---|---|---|---|---|---|
| train_mse | 0.055 | 0.132 | 0.108 | 0.121 | 0.116 |
| test_mse | 0.099 | 0.119 | 0.103 | 0.111 | 0.107 |

The data was split into 50% training, 25% validation and 25% testing, and the following algorithms were fit: xgboost, GAMI-Net, GAMI-Tree and EBM. The same tuning/training settings as in example 1 are used. The training and testing MSE for all models are listed in Table 8. xgboost is the best, GAMI-Tree is second, followed by EBM and GAMI-Net. There are also some improvements from GAMI-Tree-1 to GAMI-Tree.

Figure 27A:
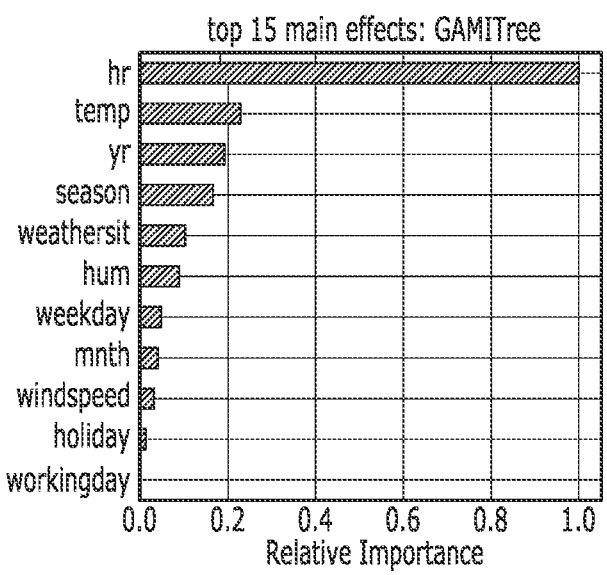
FIGS. 27A, 27B, and 27C provide operational examples of depicting a ranking of importance of main effects as detailed in example 5.
Figure 27B:
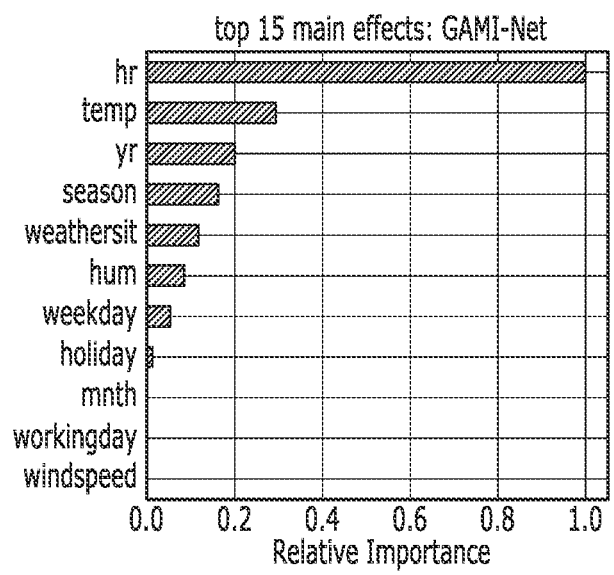
Figure 27C:
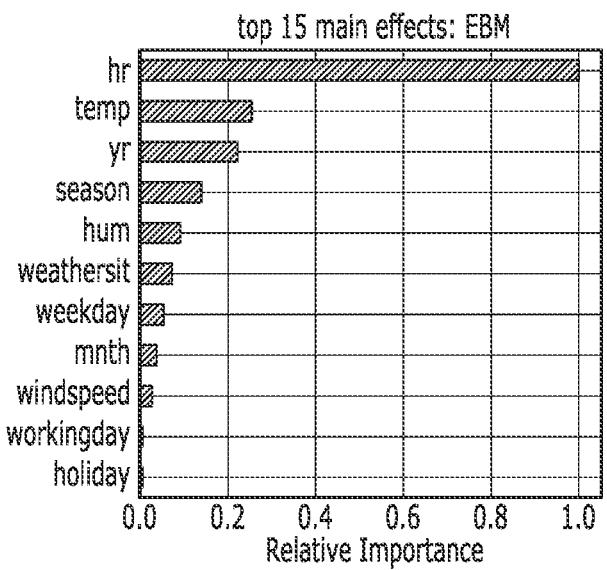
Figure 28A:
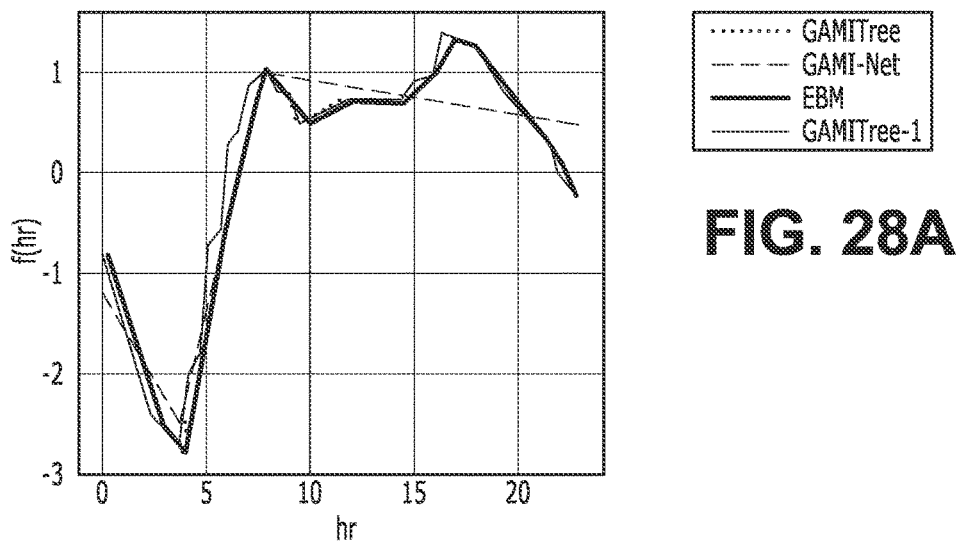
FIGS. 28A, 28B, 28C, 28D, 28E, 28F, 28G, 28H, 28I, 28J, and 28K provide operational examples of a main effect plot for EBM, GAMI-Net, and GAMI-Tree as detailed in example 5.
Figure 28B:
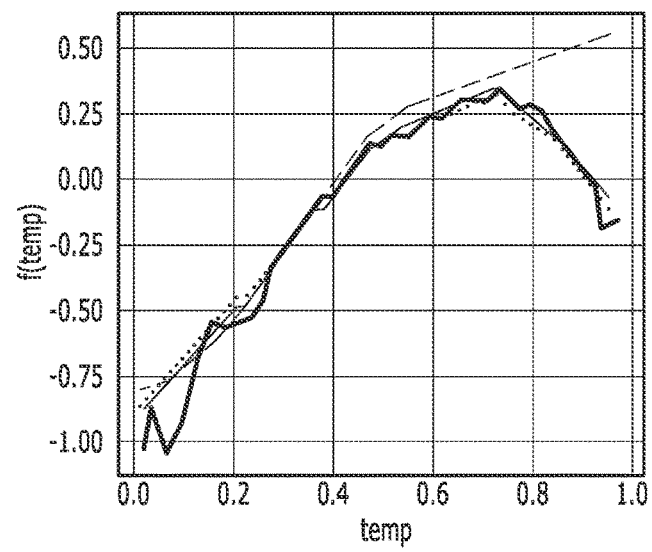
Figure 28C:
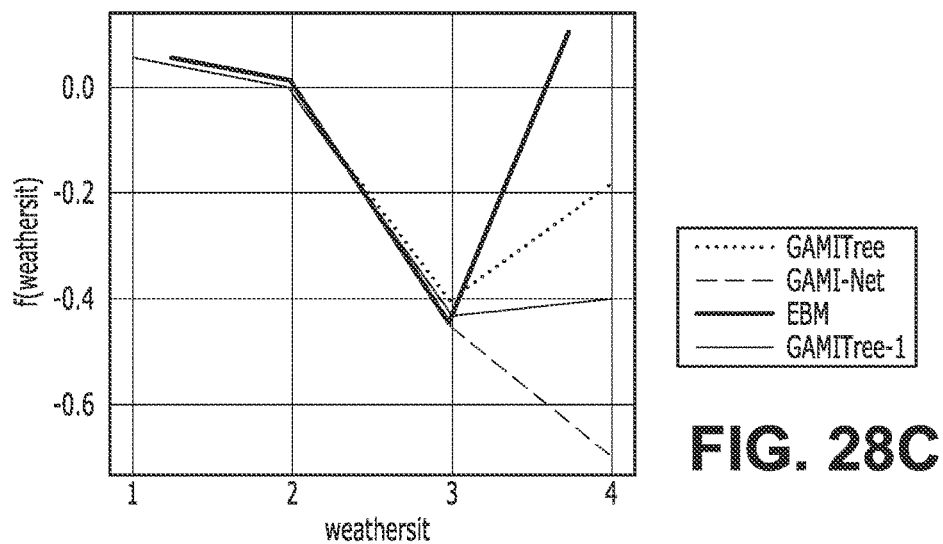
Figure 28D:
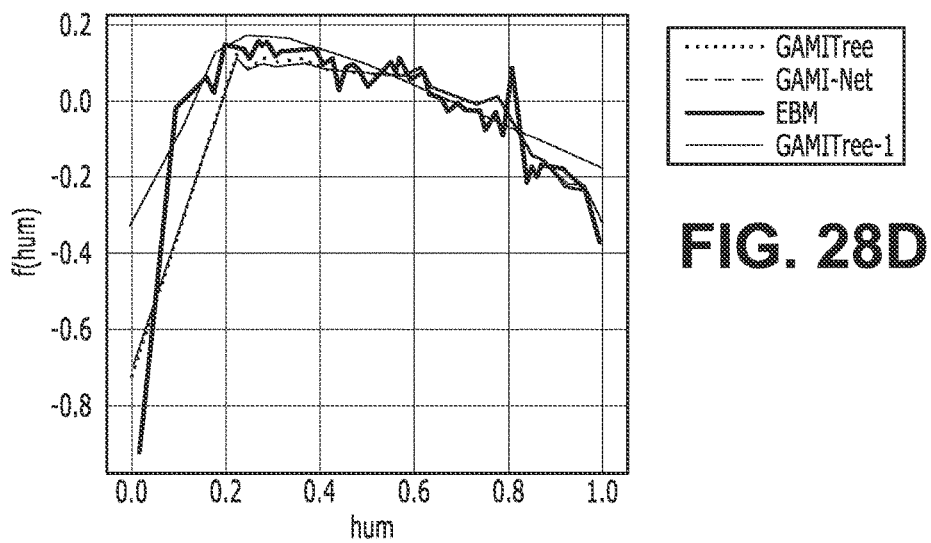
Figure 28E:
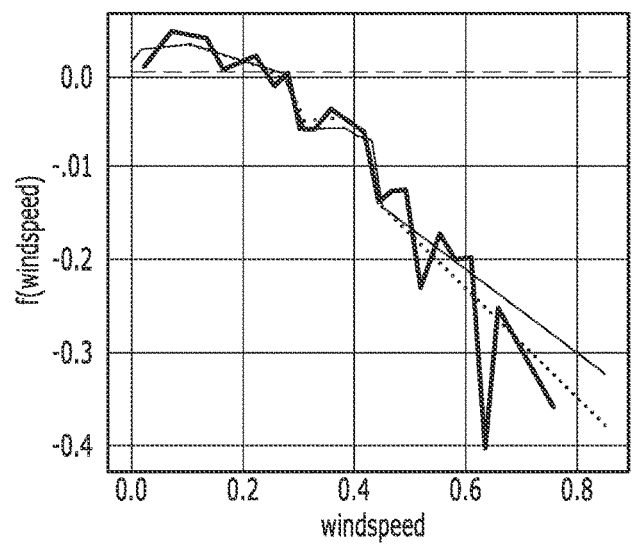
Figure 28F:
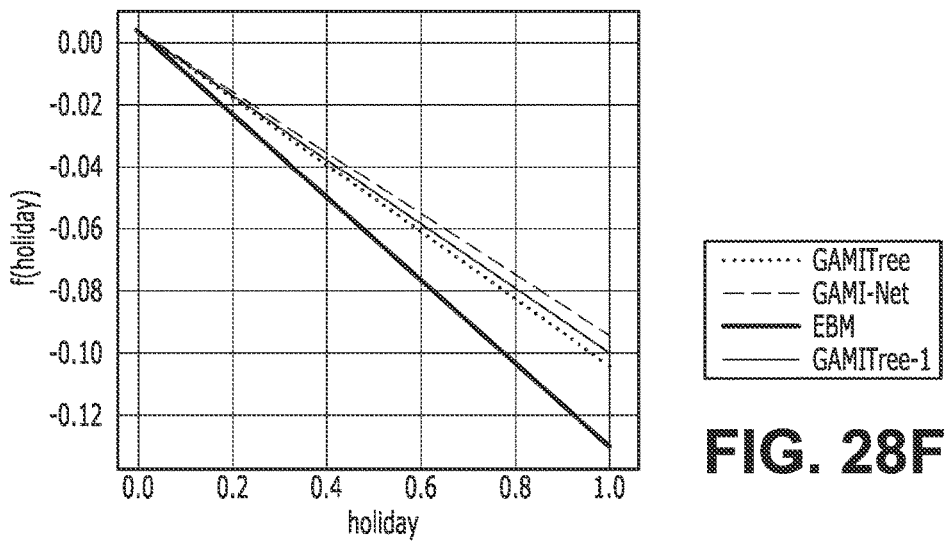
Figure 28G:
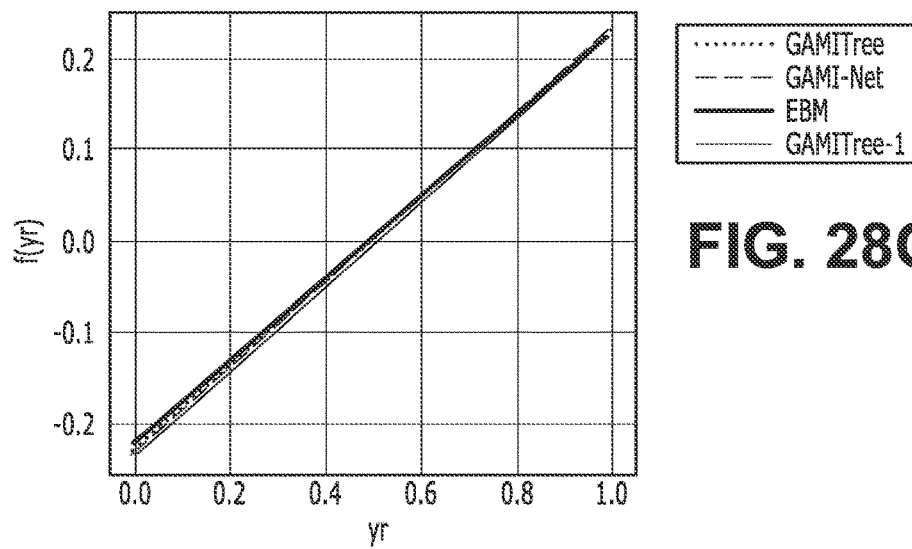
Figure 28H:
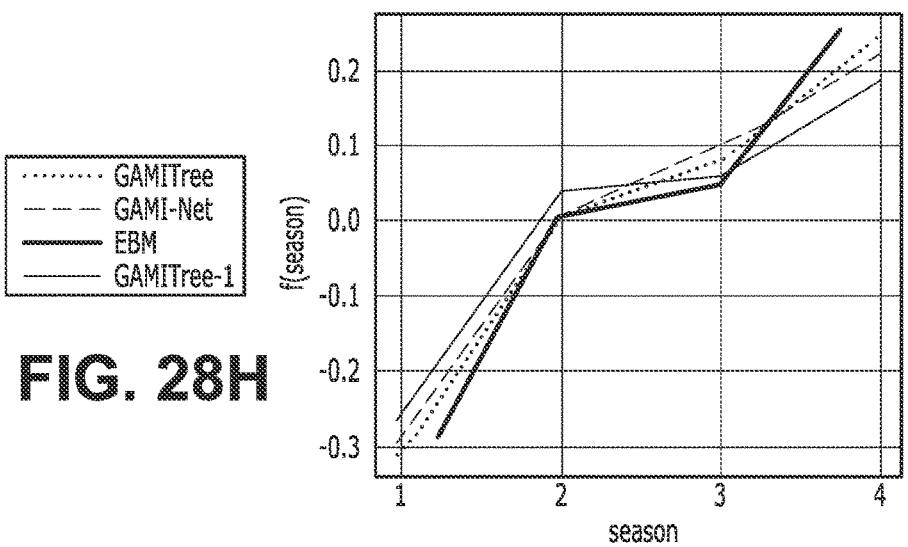
Figure 28I:
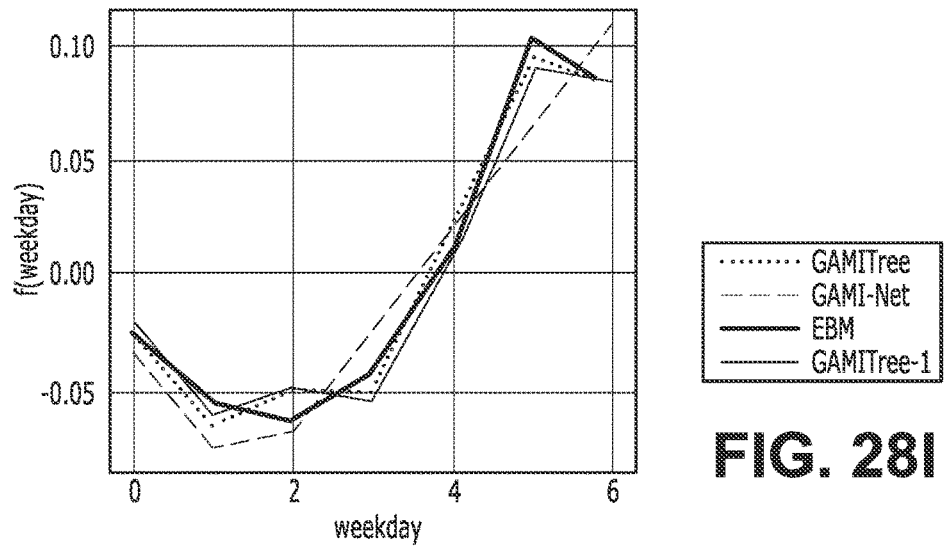
Figure 28J:
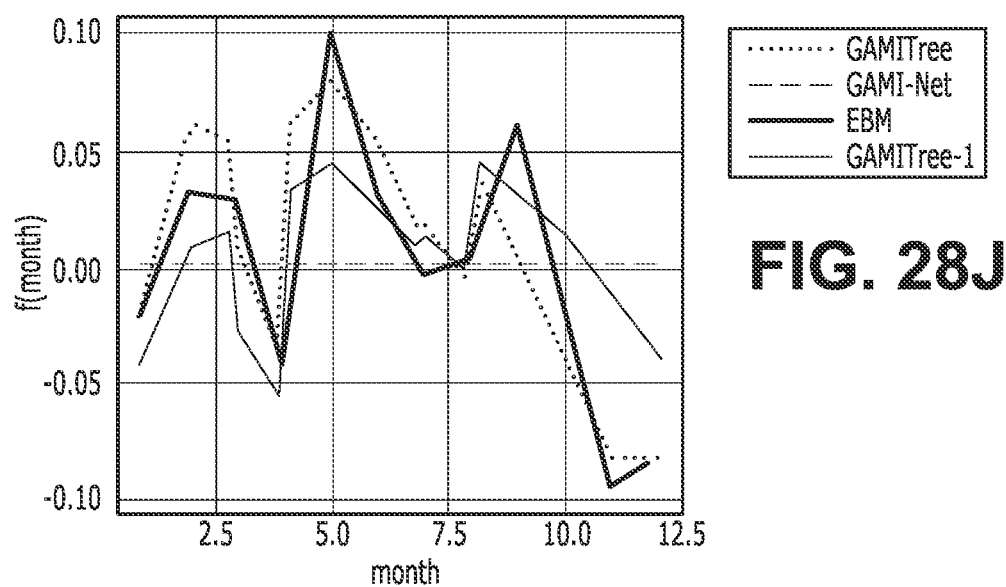
Figure 28K:
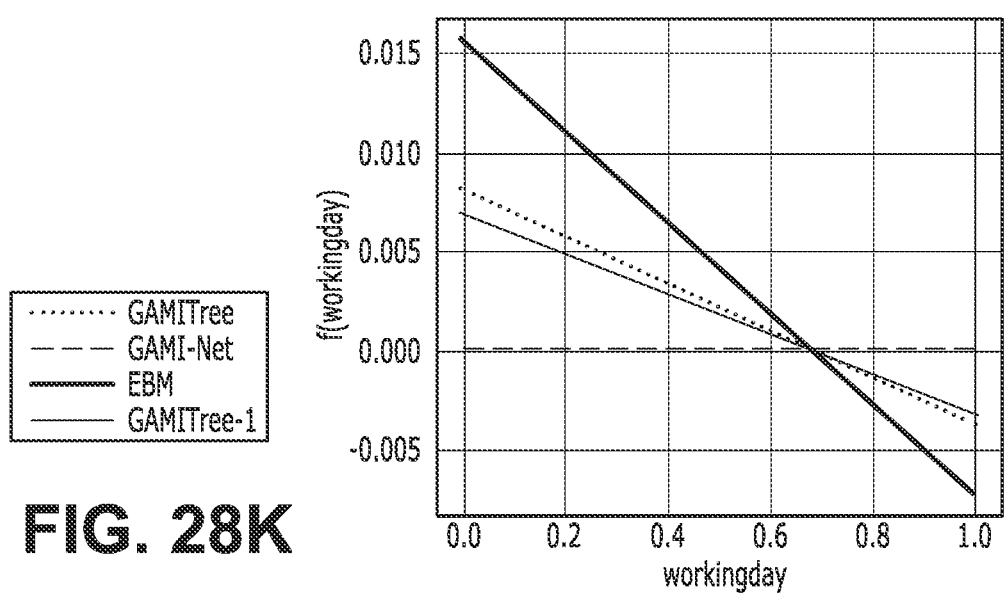

FIGS. 27A-27C show the importance ranking for the 11 main effects. All algorithms yield similar rankings with some slight change of orders. For GAMI-NET, the bottom three variables have exactly zero importance. This is due to the pruning step mentioned above.

FIGS. 28A-28K show the main effect plot for EBM, GAMI-Net and GAMI-Tree. These plots show the models overlap well, particularly EBM and GAMI-Tree. The biggest difference seems to come from weathersit variable, at value 4=heavy rain. However, only 3 out of the total of 17379 records have this value, so this is unreliable. GAMI-Net does not show the double peaks for the hour variable, but it shows double peaks in the interaction effect in FIGS. 30A-30H. So this is due to how main-effects and interactions are decomposed in GAMI-Net. Finally, the main-effect plots of mnth, windspeed and workingday are flat for GAMI-NET, which is consistent with their importance scores.

Figure 29A:
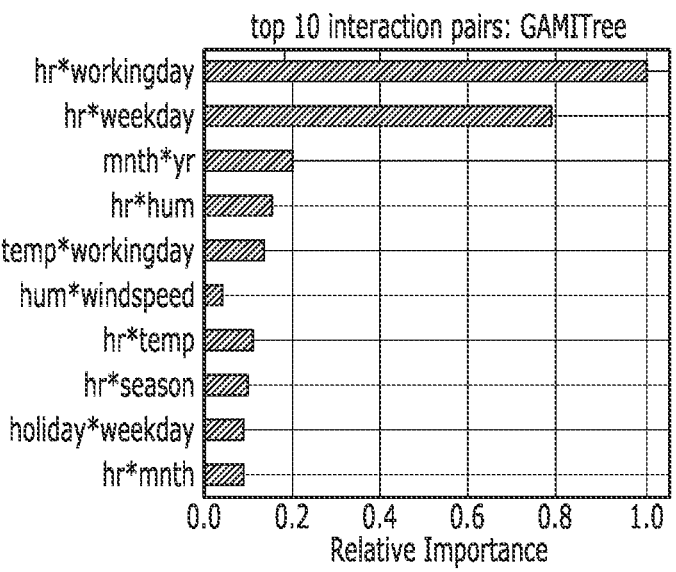
FIGS. 29A, 29B, and 29C provide operational examples illustrating the top ten interactions from GAMI-Tree, GAMI-Net, and EBM as detailed in example 5.
Figure 29B:
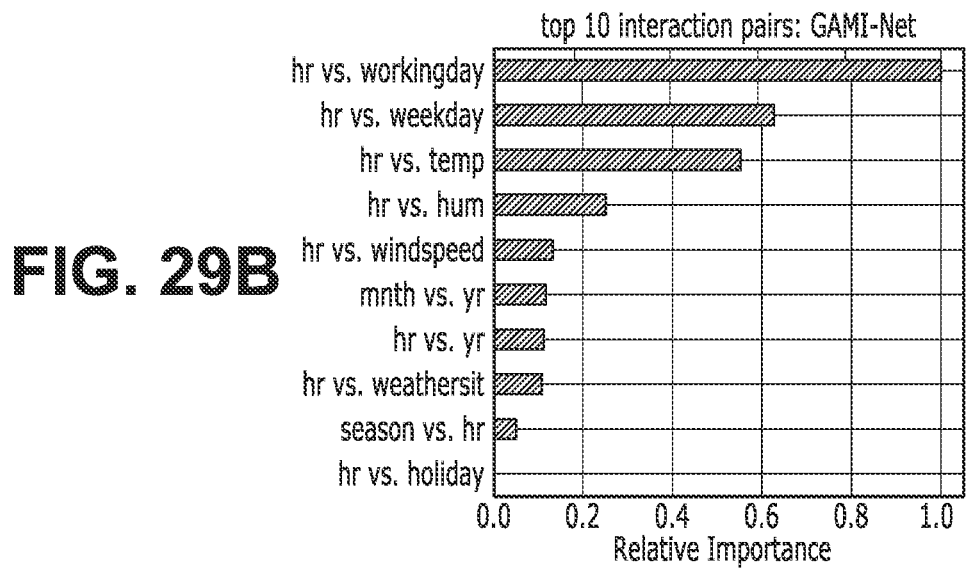
Figure 29C:
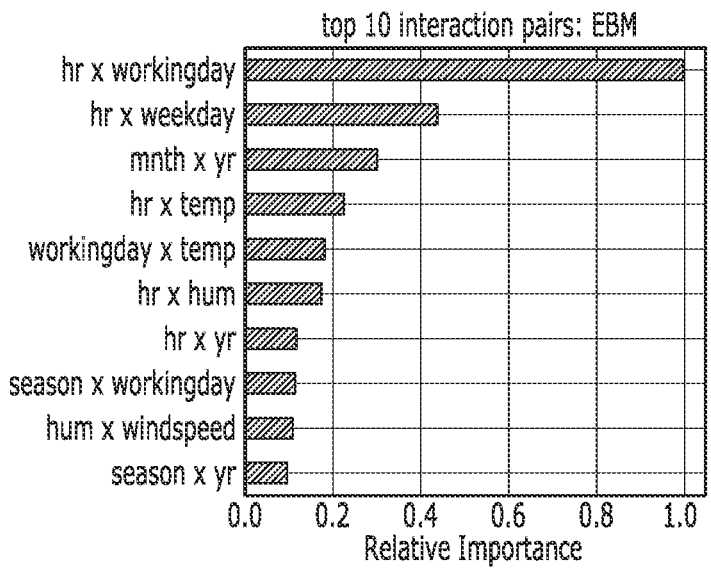
Figure 30A:
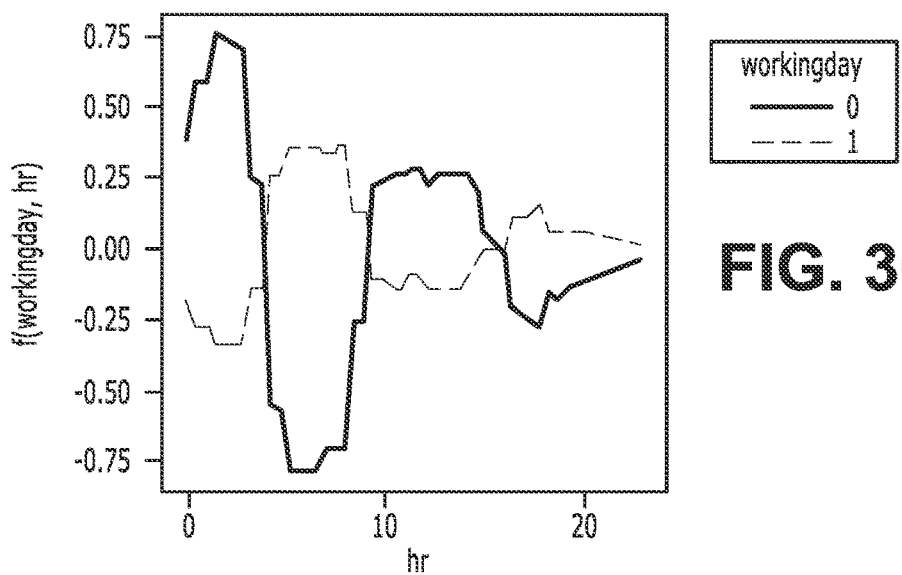
FIGS. 30A, 30B, 30C, 30D, 30E, 30F, 30G, and 30H provide operational examples illustrating the top three interactions from GAMI-Tree and EBM and the top two interactions from GAMI-Net as detailed in example 5.
Figure 30B:
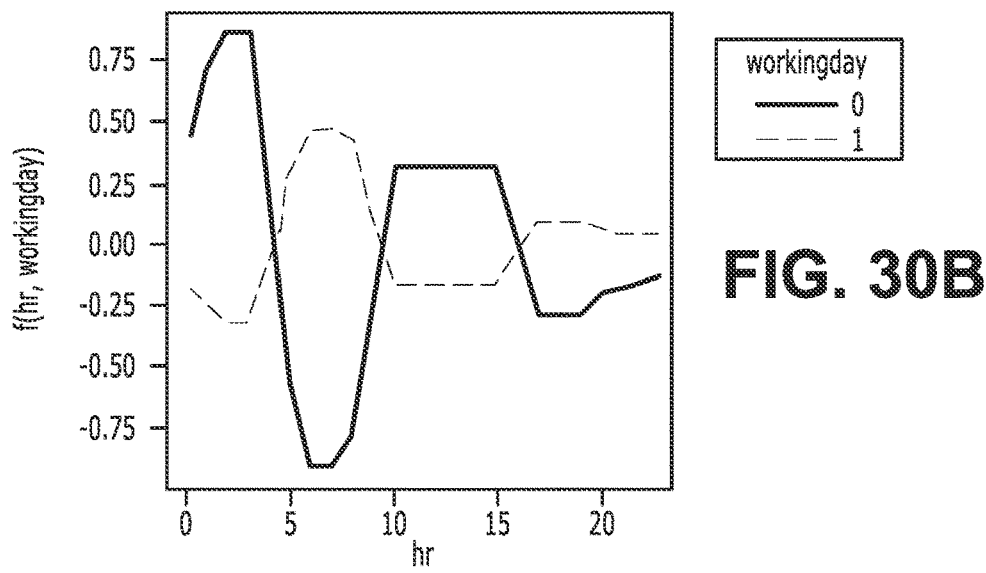
Figure 30C:
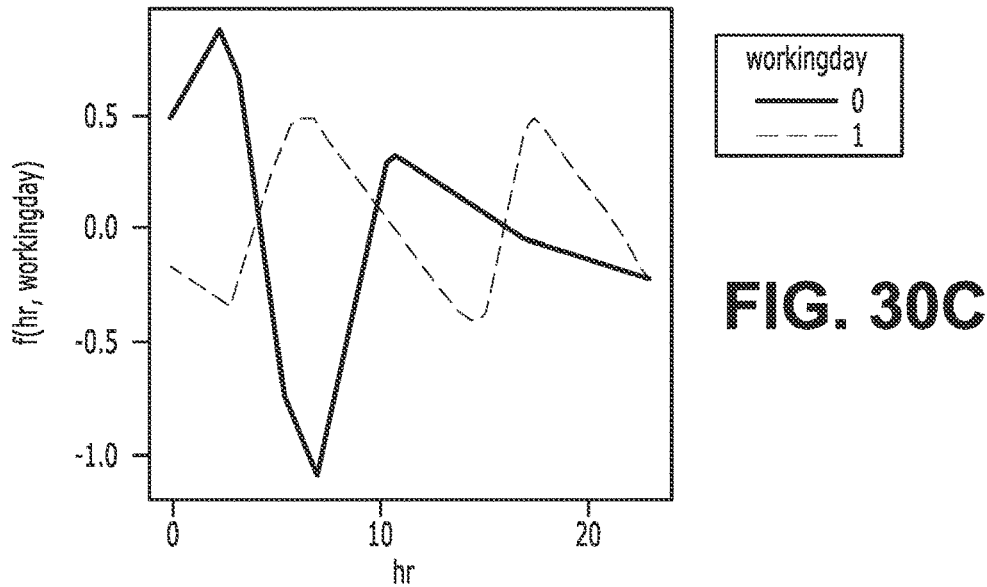
Figure 30D:
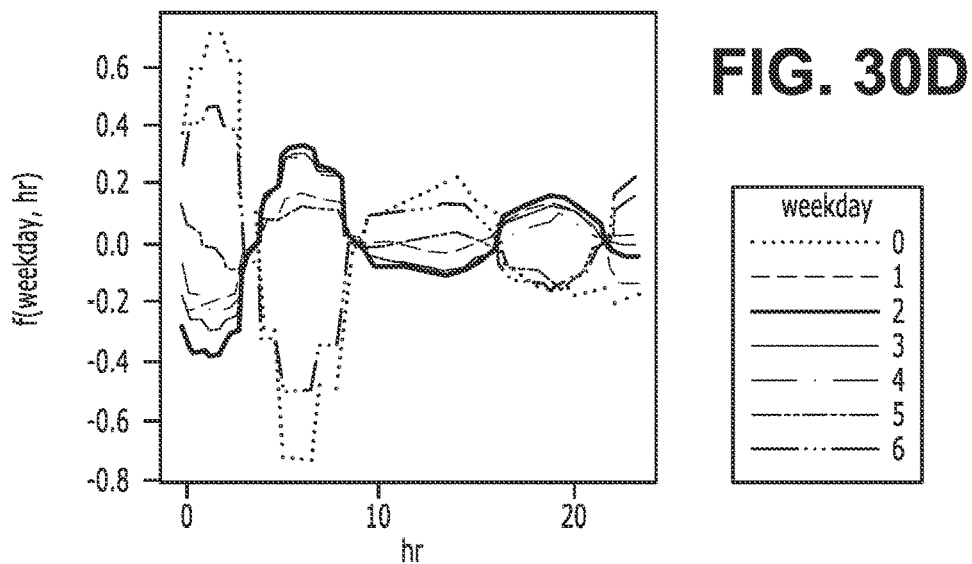
Figure 30E:
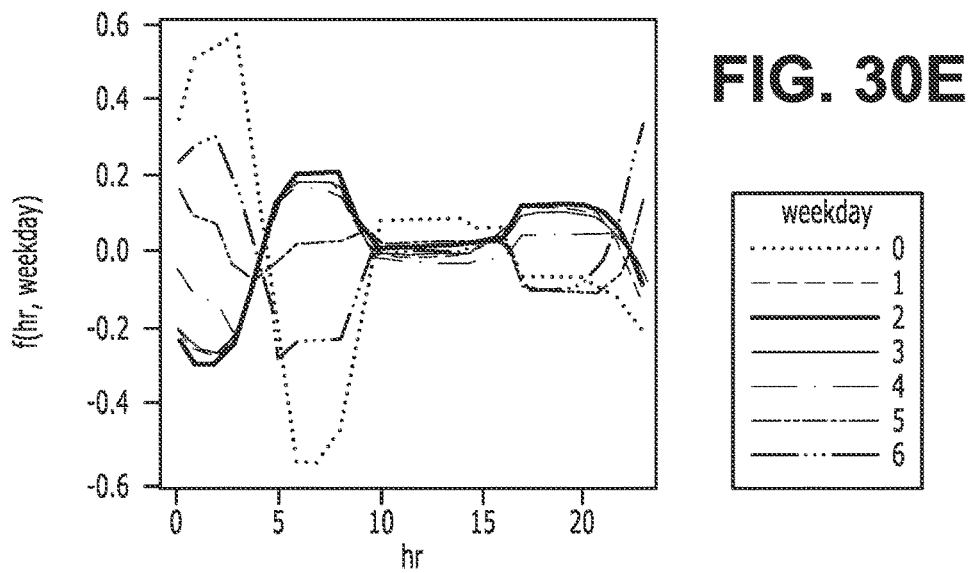
Figure 30F:
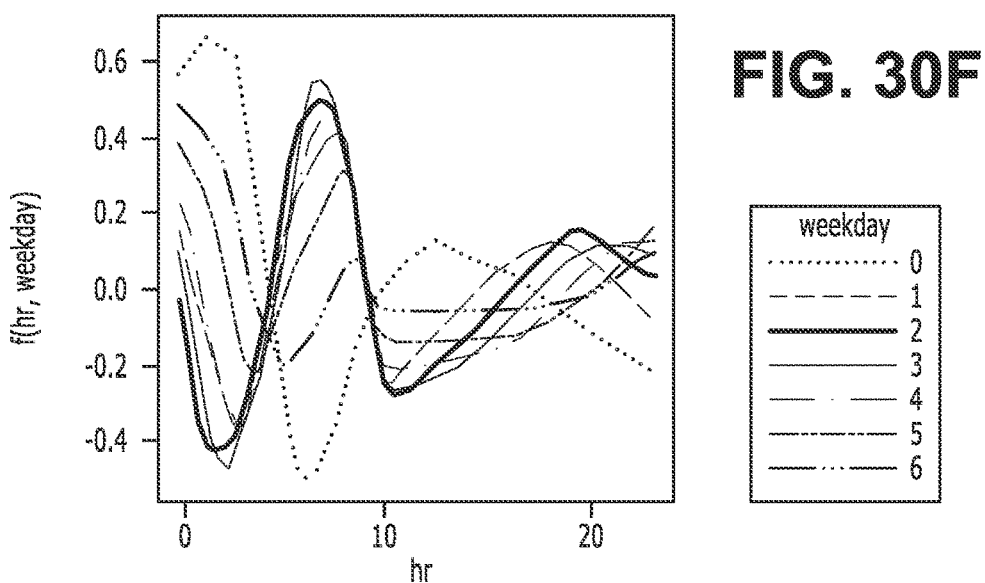
Figure 30G:
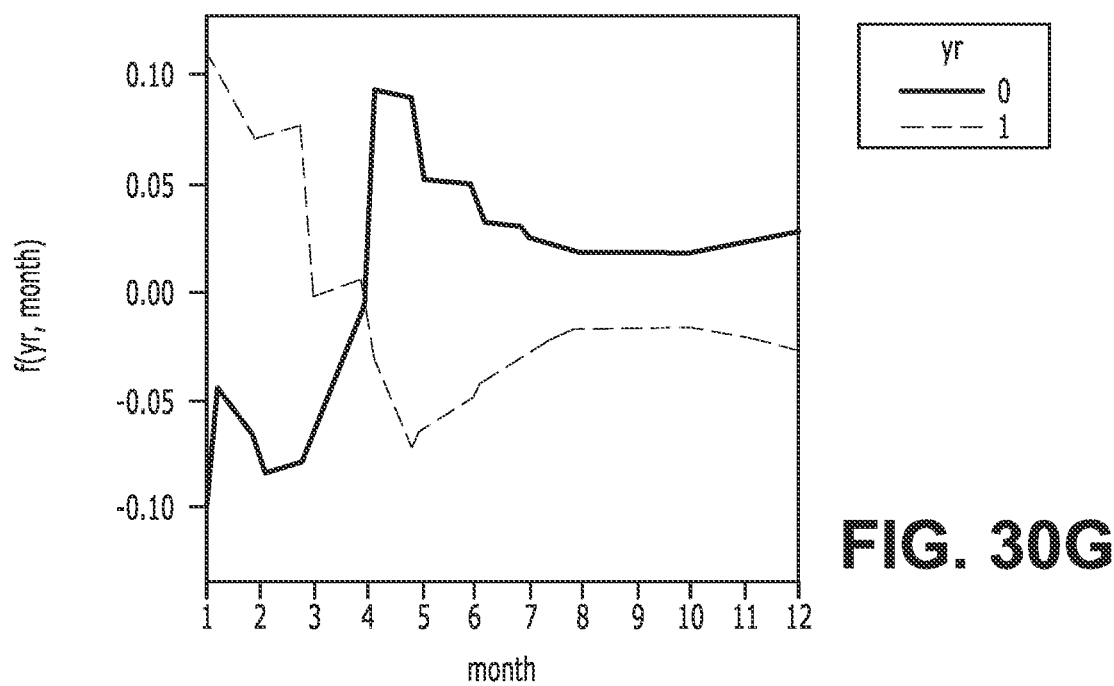
Figure 30H:
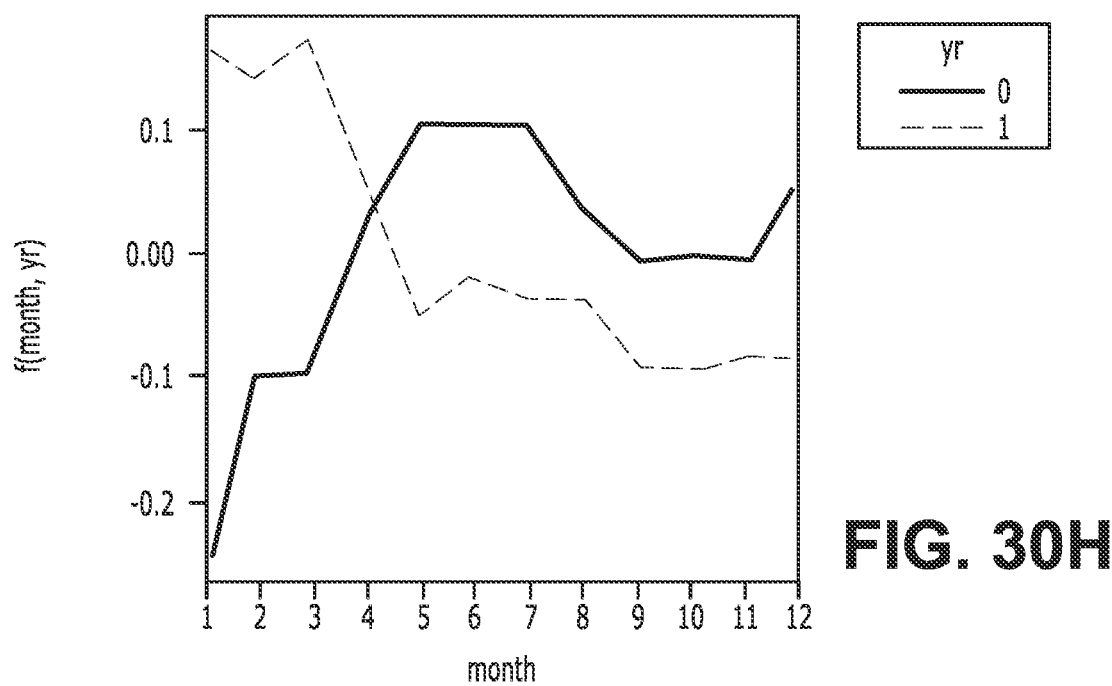
Figure 31A:
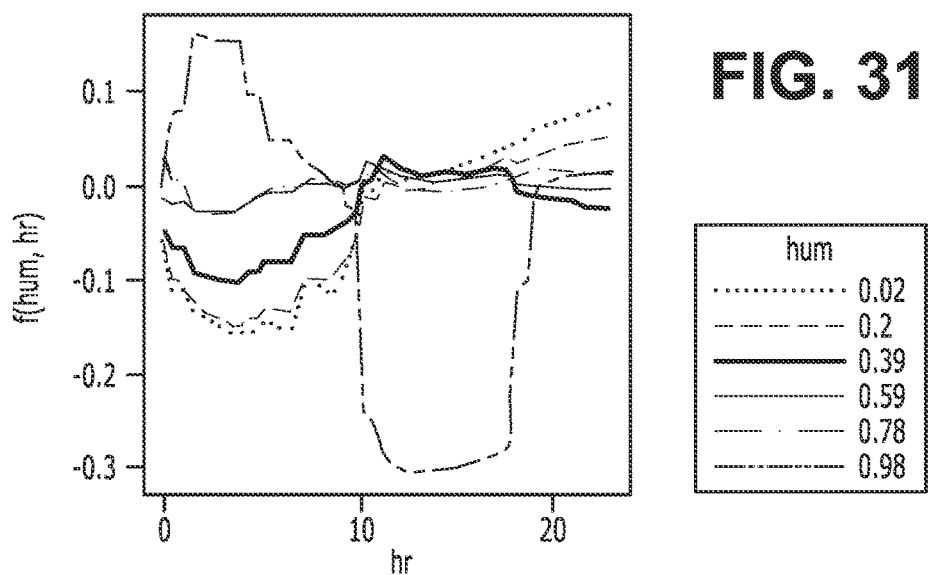
FIGS. 31A, 31B, 31C, 31D, 31E, and 31F provide operational examples illustrating the top interaction pairs from GAMI-Tree, EBM, and GAMI-Net as detailed in example 5.
Figure 31B:
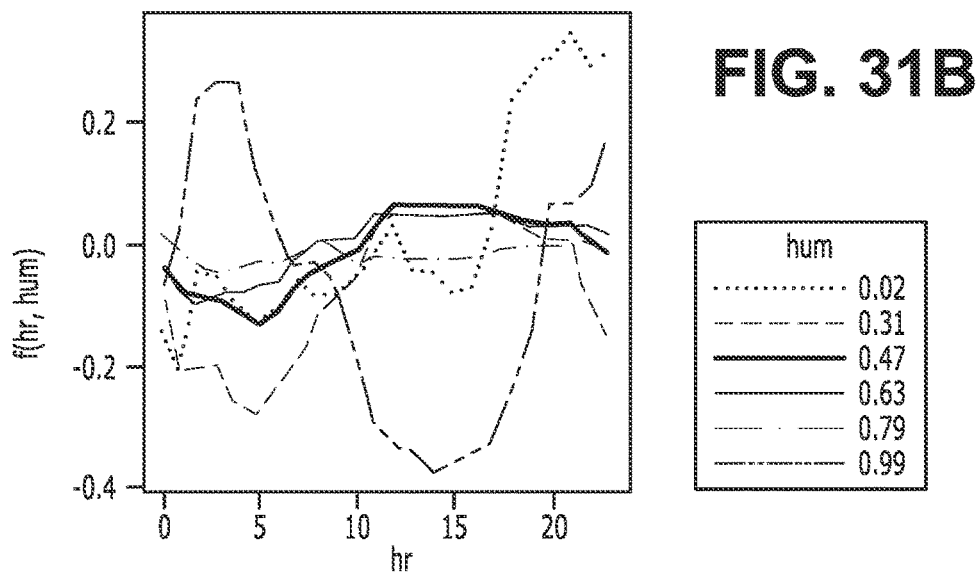
Figure 31C:
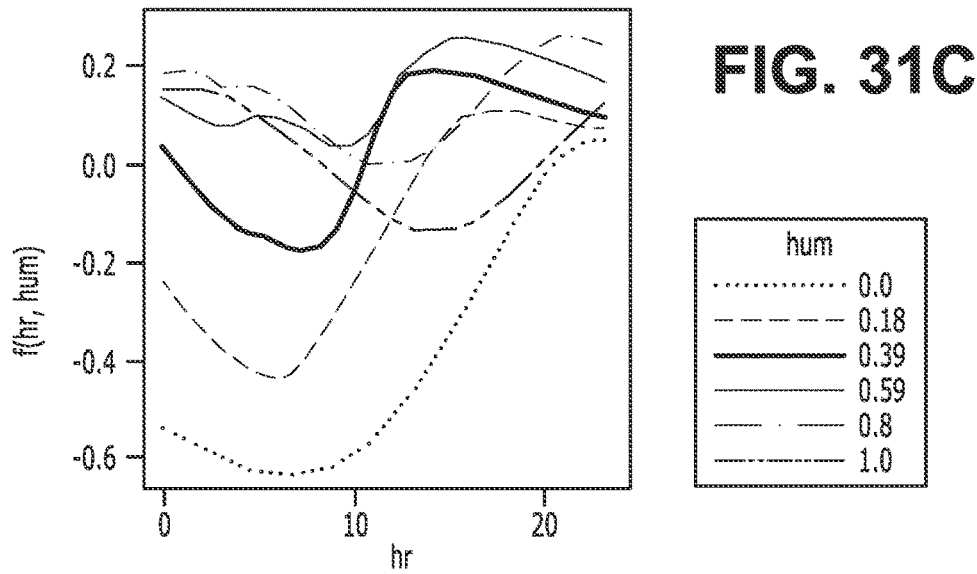
Figure 31D:
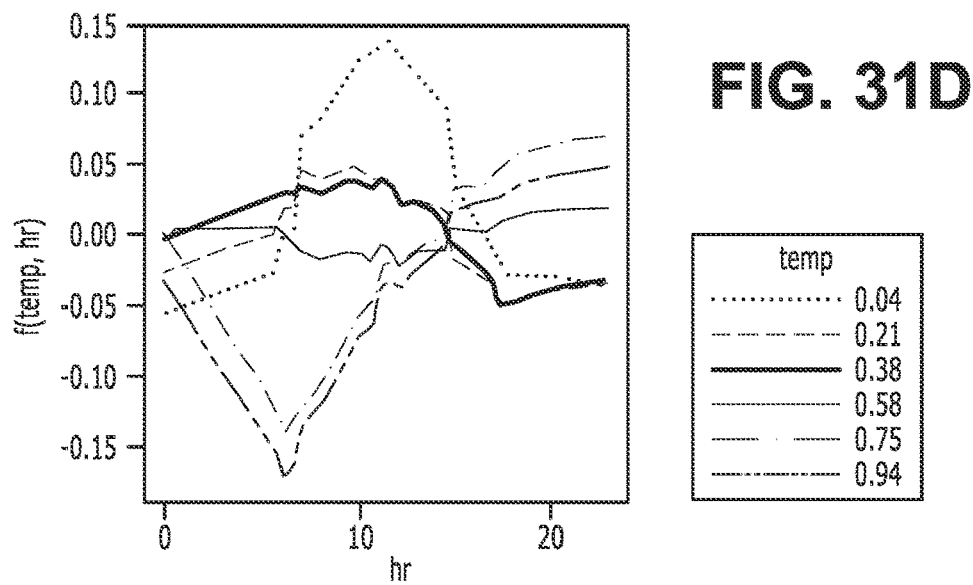
Figure 31E:
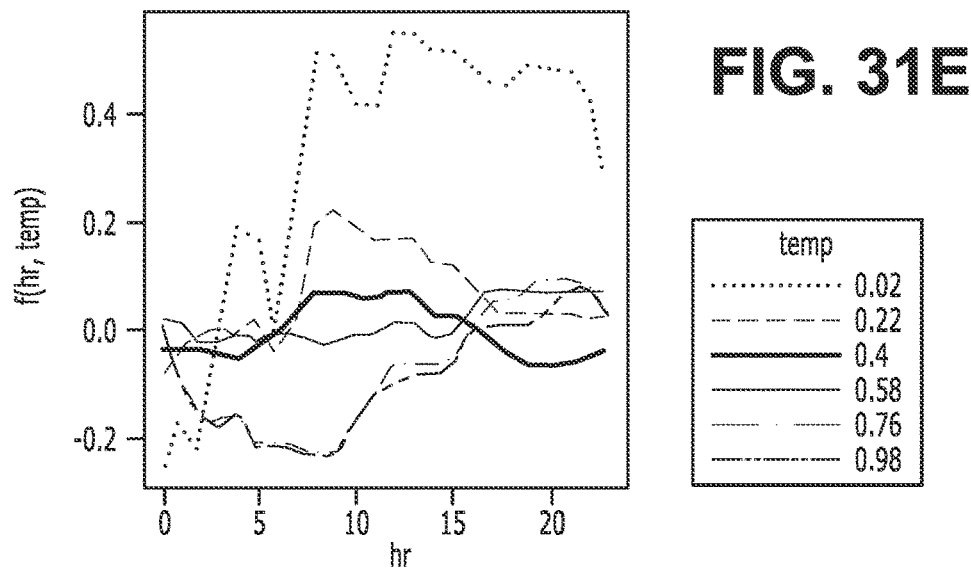
Figure 31F:
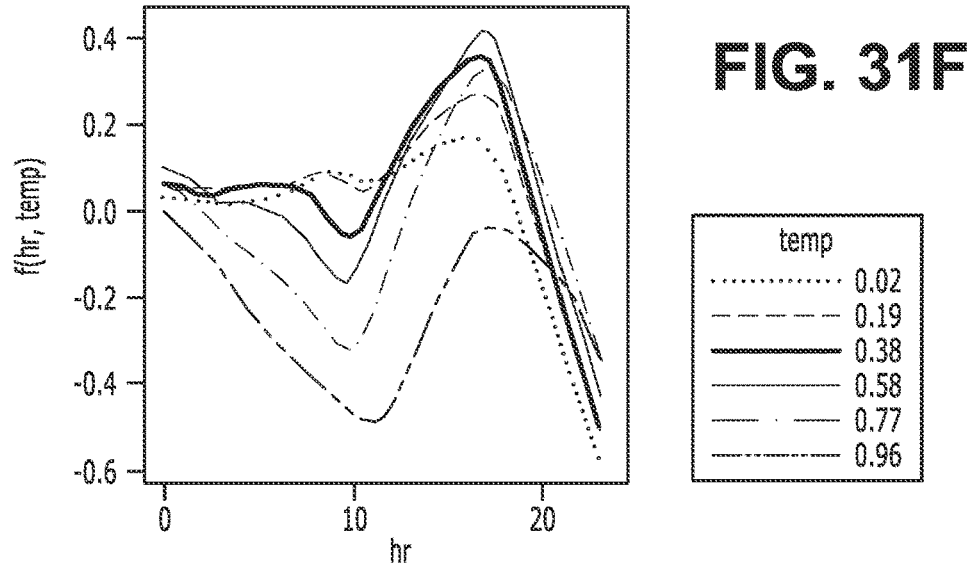

The top ten interactions from GAMI-Tree, GAMI-Net, and EBM are shown in FIGS. 29A-29C. The top two pairs identified by all three are the same. In fact, GAMI-Tree and EBM have the same top three. There are differences for the weaker interactions. For example, GAMI-Net does not have yr-mnth interaction. EBM ranks hr-temp interaction as 4th while GAMI-Tree ranks it as $7^{th}$. On the other hand, GAMI-Tree ranks hr-hum as the $4^{th}$ but EBM ranks it as $6^{th}$.

FIGS. 30A-30H show the top 3 interactions from GAMI-Tree, EBM and the top 2 interactions from GAMI-Net. The patterns among EBM and GAMI-Tree look very similar. Since workingday=1 is highly correlated with weekday being 1 to 5 (except some holidays), the first two interaction pairs are very similar. They both indicate that, on non-working days, bike rentals peak between 10 am to 16 pm, whereas for working days, bike rentals peak in the morning and afternoon during rush hours. There are some changes in the monthly patterns for the two different years, but the effect is much weaker compared to the first two interaction pairs. GAMI-Net shows similar pattern for hr and workingday/weekday interaction, except the afternoon peak for hour on working days is more obvious. This is related what was found in FIGS. 28A-28K, where the main effect plot for hour misses the afternoon peak. So the three methods can have some differences due to how main-effects and interactions are decomposed.

FIGS. 31A-31F show the interaction of hr-hum and hr-temp, the $4^{th}$ pair from GAMI-Tree and EBM, respectively, as well as the third and fourth pair from GAMI-Net. The interaction for hr-hum is similar among GAMI-Tree and EBM. Most of this interaction is related with high humidity, where it reduces bike rental between 10 am-18 pm and increases it after midnight2 (compared to the 'average behavior' captured in the main-effects). However, GAMI-Net shows a quite different pattern. The interaction for hr-temp is weak for GAMI-Tree and EBM, but quite strong for GAMI-Net. Aside from when temp is really low (below 0.05, which accounts for only less than 0.2% of data), EBM and GAMI-Tree have similar patterns. They both show bike rentals increase when temperature is moderate: 8 am-12 pm when it is cool and 6 pm to midnight when it is hot. GAMI-Net assigns a high importance for this pair of interaction, and the pattern does not agree well with GAMI-Tree or EBM. There are two possible reasons for these: correlation impact, or how the effects are decomposed into main effect and interactions.

Conclusion

As described above, example embodiments provide methods and apparatuses that enable improved interpretability of machine learning models. In particular, the GAMI-Tree model may be an inherently-interpretable model that uses effective methodology and fast algorithms to estimate main-effects (e.g., individual feature contributions) and two-way interactions (e.g., interactions between features) nonparametrically. As shown in the examples section, GAMI-Tree performs comparably or better than EBM and GAMI-Net in terms of predictive performance and is able to identify the interactions more accurately. This is due to several novel features including (i) the use of improved base learners for estimating non-linear main effects and interactions of features, (ii) a new interaction filtering method which captures feature interactions more accurately, (iii) a new iterative training method which converges to more accurate models, and (iv) an orthogonalization method to make sure interactions and main effects are hierarchically orthogonal. Thus, the generated GAMI-Tree may be useful in terms of model performance and model interpretation.

Additionally, once GAMI-Tree is trained, it may be used for one or more predictive operations. For example, in some embodiments, the trained GAMI-Tree may be used to predict a preliminary risk category for an entity associated with entity input data processed by the GAMI-Tree. As such, a real-time registration processing output may be determined for the entity based on the generated preliminary risk category such that the entity may proceed with a registration process in substantially real-time that may not have been possible otherwise.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for training a generalized additive model with structured interaction (GAMI)-Tree model, the method comprising:
   prior to performing a required number of model training iterations, initializing, by training circuitry, an iterative prediction model;
   performing, by the training circuitry, a required number of model training iterations, wherein each current model training iteration of the required number of model training iterations comprises:
      performing, by the training circuitry, a required number of main-effect gradient boosting iterations of a main-effect gradient boosting routine based on the iterative prediction model, wherein each main-effect gradient boosting iteration is configured to: (i) determine an optimal input feature of a plurality of input features, (ii) generate a main-effect tree data object based on the optimal input feature, and (iii) update the iterative prediction model based on the main-effect tree data object,
      generating, by the training circuitry, a plurality of qualified input feature pairs of a group of defined input feature pairs, wherein each defined input feature pair comprises a first input feature from the plurality of input features and a second input feature from the plurality of input features, and
      performing, by the training circuitry, a required number of interaction-effect gradient boosting iterations of a interaction-effect gradient boosting routine based on the main- effect tree data object, wherein each interaction-effect gradient boosting iteration is configured to: (i) determine an optimal qualified input feature pair of the plurality of qualified input feature pairs, (ii) generate an interaction-effect tree data object based on the optimal qualified input feature pair, and (iii) update the iterative prediction model based on the interaction-effect tree data object; and
   generating, by the training circuitry, the GAMI-Tree model based on the iterative prediction model generated by a final interaction-effect gradient boosting iteration of a final model training iteration.

2. The method of claim 1, wherein the required number of model training iterations is defined by a model training iteration count hyperparameter.

3. The method of claim 1, where performing each main-effect gradient boosting iteration of the current model training iteration comprises:
   generating, by the training circuitry, a pseudo-response element based on a main-effect derivative loss element and a interaction-effect derivative loss element, wherein the main-effect derivative loss element and the interaction-effect derivative loss element are generated based on an underlying loss model that is generated based on: (i) one or more inferred predictions for one or more training input data objects as generated using the iterative prediction model, and (ii) one or more response values for the one or more training input data objects;

for each input feature, generating, by the training circuitry, a tree fitting error measure of a main-effect tree data object that is generated to predict the pseudo-response element using the input feature as a splitting feature;

selecting, by the training circuitry, the optimal input feature as the input feature that minimizes the tree fitting error measure;

generating, by the training circuitry, a candidate iterative prediction model based on the iterative prediction model and the main-effect tree data object for the optimal input feature; and updating, by the training circuitry, the iterative prediction model based on the candidate iterative prediction model.

4. The method of claim 3, where performing each main-effect gradient boosting iteration of the current model training iteration further comprises:

determining, by the training circuitry, whether a current validation loss measure for the candidate iterative prediction model satisfies a threshold validation loss measure determined based on a historical validation loss measure for a historical iterative prediction model, and determining, by the training circuitry, the iterative prediction model based on whether the current validation loss measure satisfies the threshold validation loss measure.

5. The method of claim 4, wherein performing each main-effect gradient boosting iteration of the current model training iteration further comprises:

in response to determining that the current validation loss measure satisfies the threshold validation loss measure, updating, by the training circuitry, the iterative prediction model based on the candidate iterative prediction model.

6. The method of claim 4, wherein performing each main-effect gradient boosting iteration of the current model training iteration further comprises:

in response to determining that the current validation loss measure does not satisfy the threshold validation loss measure, updating, by the training circuitry, the iterative prediction model based on the historical iterative prediction model.

7. The method of claim 1, where performing each interaction-effect gradient boosting iteration of the current model training iteration comprises:

generating, by the training circuitry, a pseudo-response element based on a main-effect derivative loss element and a interaction-effect derivative loss element, wherein the main-effect derivative loss element and the interaction-effect derivative loss element are generated based on an underlying loss model that is generated based on: (i) one or more inferred predictions for one or more training input data objects as generated using the iterative prediction model, and (ii) one or more response values for the one or more training input data objects;

for each qualified input feature pair, generating, by the training circuitry, a tree fitting error measure of a interaction-effect tree data object that is generated to predict the pseudo-response element using one input feature in the qualified input feature pair as a splitting feature;

selecting, by the training circuitry, the optimal qualified input feature pair as the qualified input feature pair that minimizes the tree fitting error measure;

generating, by the training circuitry, a candidate iterative prediction model based on the iterative prediction model and the interaction-effect tree data object for the qualified optimal input feature pair; and updating, by the training circuitry, the iterative prediction model based on the candidate iterative prediction model.

8. The method of claim 7, where performing each interaction-effect gradient boosting iteration of the current model training iteration further comprises:

determining, by the training circuitry, whether a current validation loss measure for the candidate iterative prediction model satisfies a threshold validation loss measure determined based on a historical validation loss measure for a historical iterative prediction model, and determining, by the training circuitry, the iterative prediction model based on whether the current validation loss measure satisfies the threshold validation loss measure.

9. The method of claim 8, wherein performing each interaction-effect gradient boosting iteration of the current model training iteration further comprises:

in response to determining that the current validation loss measure satisfies the threshold validation loss measure, updating, by the training circuitry, the iterative prediction model based on the candidate iterative prediction model.

10. The method of claim 9, wherein performing each interaction-effect gradient boosting iteration of the current model training iteration further comprises:

in response to determining that the current validation loss measure does not satisfy the threshold validation loss measure, updating, by the training circuitry, the iterative prediction model based on the historical iterative prediction model.

11. The method of claim 1, wherein generating the plurality of qualified input feature pairs during the current model training iteration further comprises:

for each defined input feature pair:
generating, by the training circuitry, a first split-constrained tree data object that is associated with a first input feature in the defined input feature pair as a modeling feature and a second input feature in the defined input feature pair as a splitting feature, generating, by the training circuitry, a second split-constrained tree data object that is associated with the second input feature in the defined input feature pair as the modeling feature and the first input feature in the defined input feature pair as the splitting feature, and generating, by the training circuitry, a feature pair error measure based on a lesser of: (i) a first tree-wise error measure for the first split-constrained tree data object, and (ii) a second tree-wise error measure for the second split-constrained tree data object; and selecting, by the training circuitry, the plurality of qualified input feature pairs based on each feature pair error measure.

12. The method of claim 1, wherein the GAMI-Tree model is configured to generate an interaction input feature summary for a received input request, wherein (i) the received input request describes one or more input features and corresponding input feature values and (ii) the interaction input feature summary describes at least one of (a) a relative ranking of input features based on a respective one or more main-effect tree data objects associated with the respective input feature or (b) a relative ranking of an input feature pair based on a respective interaction-effect tree data object associated with the respective input feature pair.

13. The method of claim 1, further comprising:
receiving, by communications hardware, entity input data; and
generating, by prediction circuitry, a preliminary risk category for an entity described by the entity input data based on the entity input data.

14. The method of claim 13, further comprising:
generating, by the prediction circuitry, a registration processing output based on the preliminary risk category generated for the entity.

15. An apparatus for training a generalized additive model with structured interaction (GAMI)-Tree model, the apparatus comprising training circuitry configured to:
prior to performing a required number of model training iterations, initialize an iterative prediction model;
perform a required number of model training iterations, wherein the training circuitry is configured to perform each current model training iteration of the required number of model training iterations by:
performing a required number of main-effect gradient boosting iterations of a main-effect gradient boosting routine based on the iterative prediction model, wherein each main-effect gradient boosting iteration is configured to: (i) determine an optimal input feature of a plurality of input features, (ii) generate a main-effect tree data object based on the optimal input feature, and (iii) update the iterative prediction model based on the main-effect tree data object, p2
generating a plurality of qualified input feature pairs of a group of defined input feature pair, wherein each defined input feature pair comprises a first input feature from the plurality of input features and a second input feature from the plurality of input features, and
performing a required number of interaction-effect gradient boosting iterations of a interaction-effect gradient boosting routine based on the main-effect tree data object, wherein each interaction-effect gradient boosting iteration is configured to: (i) determine an optimal qualified input feature pair of the plurality of qualified input feature pairs, (ii) generate an interaction-effect tree data object based on the optimal qualified input feature pair, and (iii) update the iterative prediction model based on the interaction-effect tree data object; and
generate the GAMI-Tree model based on the iterative prediction model generated by a final interaction-effect gradient boosting iteration of a final model training iteration.

16. The apparatus of claim 15, wherein the required number of model training iterations is defined by a model training iteration count hyperparameter.

17. The apparatus of claim 15, wherein the training circuitry is further configured to:
generate a pseudo-response element based on a main-effect derivative loss element and a interaction-effect derivative loss element, wherein the main-effect derivative loss element and the interaction-effect derivative loss element are generated based on an underlying loss model that is generated based on: (i) one or more inferred predictions for one or more training input data objects as generated using the iterative prediction model, and (ii) one or more response values for the one or more training input data objects;
for each input feature, generate a tree fitting error measure of a main-effect tree data object that is generated to predict the pseudo-response element using the input feature as a splitting feature;
select the optimal input feature as the input feature that minimizes the tree fitting error measure;
generate a candidate iterative prediction model based on the iterative prediction model and the main-effect tree data object for the optimal input feature; and
update the iterative prediction model based on the candidate iterative prediction model.

18. The apparatus of claim 17, wherein the training circuitry is further configured to:
determine whether a current validation loss measure for the candidate iterative prediction model satisfies a threshold validation loss measure determined based on a historical validation loss measure for a historical iterative prediction model; and
determine the iterative prediction model based on whether the current validation loss measure satisfies the threshold validation loss measure.

19. The apparatus of claim 18, wherein the training circuitry is further configured to:
in response to determining that the current validation loss measure satisfies the threshold validation loss measure, update the iterative prediction model based on the candidate iterative prediction model.

20. A computer program product for training a generalized additive model with structured interaction (GAMI)-Tree model, the computer program product comprising at least one non-transitory computer-readable storage medium storing software instructions that, when executed, cause an apparatus to:
prior to performing a required number of model training iterations, initialize an iterative prediction model;
perform a required number of model training iterations, wherein each current model training iteration of the required number of model training iterations comprises:
performing a required number of main-effect gradient boosting iterations of a main-effect gradient boosting routine based on the iterative prediction model, wherein each main-effect gradient boosting iteration is configured to: (i) determine an optimal input feature of a plurality of input features, (ii) generate a main-effect tree data object based on the optimal input feature, and (iii) update the iterative prediction model based on the main-effect tree data object,
generating a plurality of qualified input feature pairs of a group of defined input feature pair, wherein each defined input feature pair comprises a first input feature from the plurality of input features and a second input feature from the plurality of input features, and
performing a required number of interaction-effect gradient boosting iterations of a interaction-effect gradient boosting routine based on the main-effect tree data object, wherein each interaction-effect gradient boosting iteration is configured to: (i) determine an optimal qualified input feature pair of the plurality of qualified input feature pairs, (ii) generate an interaction-effect tree data object based on the optimal qualified input feature pair, and (iii) update the iterative prediction model based on the interaction-effect tree data object; and generate the GAMI-Tree model based on the iterative prediction model generated by a final interaction-effect gradient boosting iteration of a final model training iteration.

\* \* \* \* \*